US 11,287,625 B2

(12) United States Patent
Fujikake et al.

(10) Patent No.: US 11,287,625 B2
(45) Date of Patent: Mar. 29, 2022

(54) MICROSCOPE AND OBSERVATION METHOD

(71) Applicant: NIKON CORPORATION, Tokyo (JP)

(72) Inventors: Yosuke Fujikake, Tokyo (JP); Yuki Terui, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 127 days.

(21) Appl. No.: 16/816,704

(22) Filed: Mar. 12, 2020

(65) Prior Publication Data

US 2020/0241271 A1 Jul. 30, 2020

Related U.S. Application Data

(63) Continuation of application No. PCT/JP2017/032817, filed on Sep. 12, 2017.

(51) Int. Cl.
*G02B 21/00* (2006.01)

(52) U.S. Cl.
CPC ....... *G02B 21/0056* (2013.01); *G02B 21/008* (2013.01); *G02B 21/0032* (2013.01); *G02B 21/0068* (2013.01); *G02B 21/0076* (2013.01)

(58) Field of Classification Search
CPC ............ G02B 21/0056; G02B 21/0032; G02B 21/0068; G02B 21/0076; G02B 21/008
See application file for complete search history.

(56) References Cited

U.S. PATENT DOCUMENTS

| 6,282,020 | B1 * | 8/2001 | Ogino | ............... | G02B 21/0032 |
| | | | | | 359/368 |
| 6,369,375 | B1 | 4/2002 | Ishiwata | | |

| 2006/0291712 | A1 | 12/2006 | Popescu et al. |
| 2008/0192337 | A1 | 8/2008 | Osawa et al. |
| 2009/0296205 | A1 | 12/2009 | Ouchi |
| 2011/0194175 | A1 | 8/2011 | Dougherty et al. |
| 2013/0250144 | A1 | 9/2013 | Takayama |
| 2013/0286179 | A1 | 10/2013 | Markle et al. |

(Continued)

FOREIGN PATENT DOCUMENTS

| EP | 1 936 423 A1 | 6/2008 |
| EP | 2 806 262 A1 | 11/2014 |

(Continued)

OTHER PUBLICATIONS

Saxena et al.; "Structured Illumination Microscopy;" Advances in Optics and Photonics; 2015; pp. 241-275; vol. 7, No. 2.

(Continued)

*Primary Examiner* — Georgia Y Epps
*Assistant Examiner* — Don J Williams
(74) *Attorney, Agent, or Firm* — Oliff PLC

(57) ABSTRACT

To acquire an image of a sample. A microscope includes: an illumination optical system that includes a light flux splitter that splits light from a light source into a plurality of light fluxes, and scans a sample in a plurality of directions with interference fringes generated by interference of at least part of the light fluxes split by the light flux splitter; a detection optical system on which light from the sample is incident; a detection device that includes a plurality of detectors that detect the light from the sample via the detection optical system; and an image processor that generates an image using detection results of two or more of the detectors of the detection device.

24 Claims, 30 Drawing Sheets

(56) References Cited

U.S. PATENT DOCUMENTS

| | | |
|---|---|---|
| 2014/0320957 A1 | 10/2014 | Ouchi et al. |
| 2014/0361148 A1 | 12/2014 | Popescu et al. |
| 2014/0362205 A1 | 12/2014 | Sasaki |
| 2014/0374575 A1* | 12/2014 | Takesue ............ G01B 9/02097 250/208.5 |
| 2015/0205087 A1 | 7/2015 | Schumann |
| 2019/0146201 A1 | 5/2019 | Ouchi et al. |

FOREIGN PATENT DOCUMENTS

| | | |
|---|---|---|
| JP | H09-005058 A | 1/1997 |
| JP | 2003-015049 A | 1/2003 |
| JP | 2009-064024 A | 3/2009 |
| JP | 2010-224320 A | 10/2010 |
| JP | 2014-052476 A | 3/2014 |
| JP | 2015-099177 A | 5/2015 |
| JP | 2015-230439 A | 12/2015 |

OTHER PUBLICATIONS

Lal et al.; "Structured Illumination Microscopy Image Reconstruction Algorithm;" IEEE Journal of Selected Topics in Quantum Electronics; 2015; pp. 1-15; vol. 10, No. 10.

Lal et al.; "A Frequency Domain Reconstruction of SIM Image Using Four Raw Images;" Optics in Health Care and Biomedical Optics VII, Proc of SPIE; 2016; pp. 1002411-1-1002411-13; vol. 10024.

May 10, 2021 Extended Search Report issued in European Patent Application No. 17924823.2.

Mandula et al.; "Line scan—structuerd illumination microscopy super-resolution imaging in thick fluorescent samples;" Optics Express; 2012; pp. 24167-24174; vol. 20, No. 22.

Schropp et al.; "XL-SIM: Extending Superresoluton into Deeper Layers;" Photonics; 2017; pp. 1-17; vol. 4, No. 33.

Mar. 12, 2021 Partial Search Report issued in European Patent Application No. 17924823.2.

Mar. 30, 2021 Office Action issued in Japanese Patent Application No. 2019-541507.

Dec. 8, 2020 Office Action issued in Japanese Patent Application No. 2019-541507.

Gao et al.; "Confocal laser scanning microscopy with spatiotemporal structured illumination;" Optics Letters; 2016; pp. 1193-1196; vol. 41, No. 6.

Oct. 31, 2017 Search Report issued in International Patent Application No. PCT/JP2017/032817.

Mar. 17, 2020 International Preliminary Report on Patentability issued in International Patent Application No. PCT/JP2017/032817.

Oct. 26, 2021 Decision of Dismissal of Amendment issued in Japanese Patent Application No. 2019-541507.

Oct. 26, 2021 Decision of Refusal issued in Japanese Patent Application No. 2019-541507.

\* cited by examiner

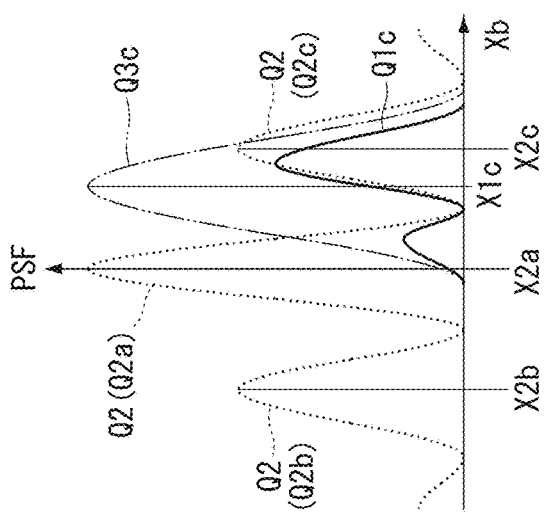
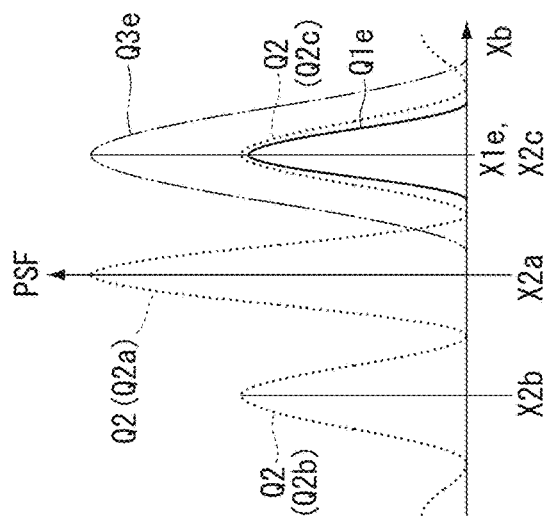
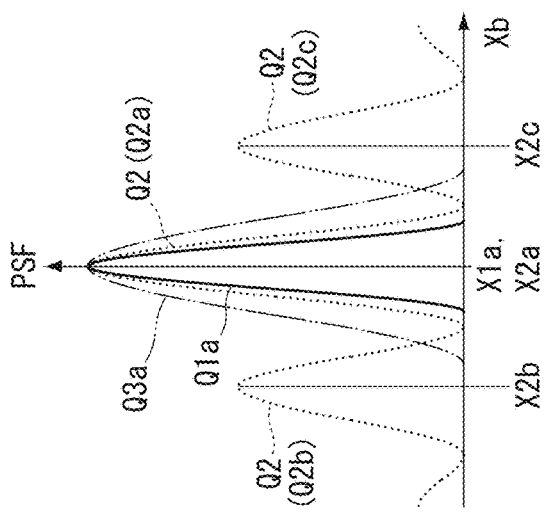
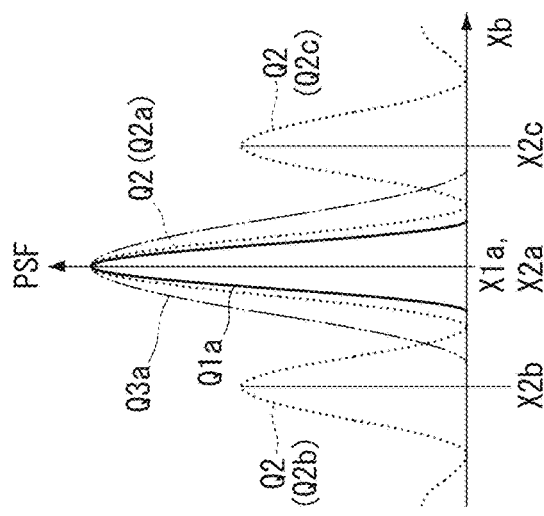
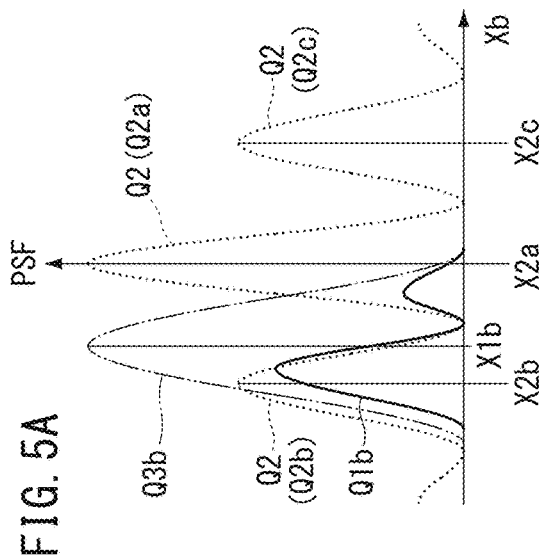
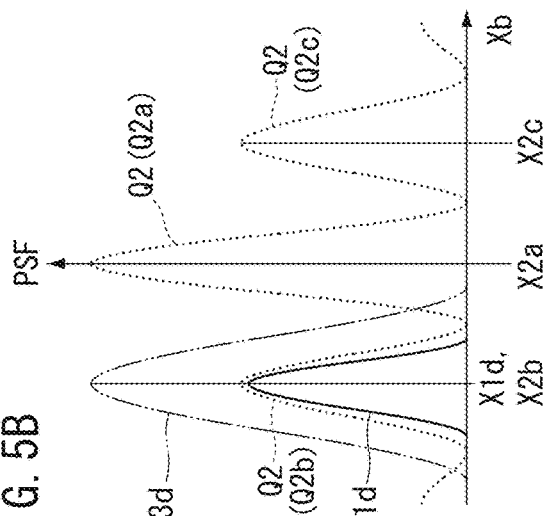
FIG. 5A
FIG. 5B

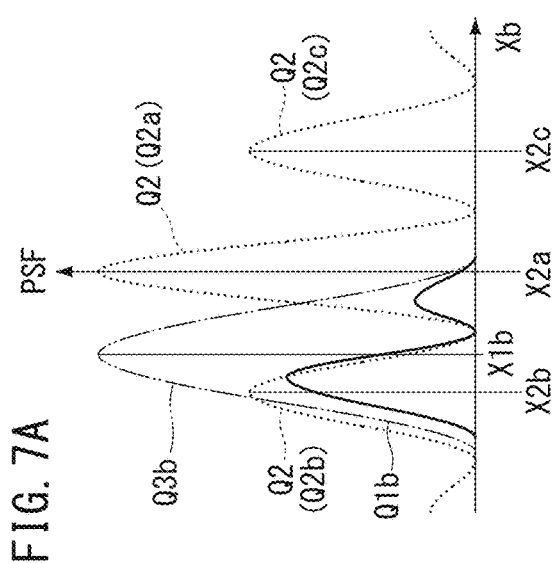
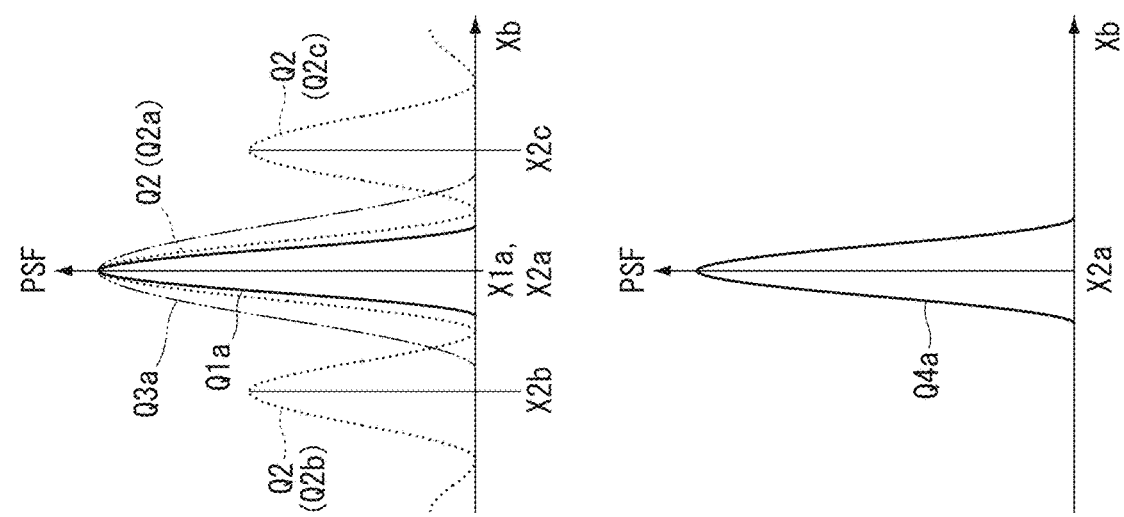
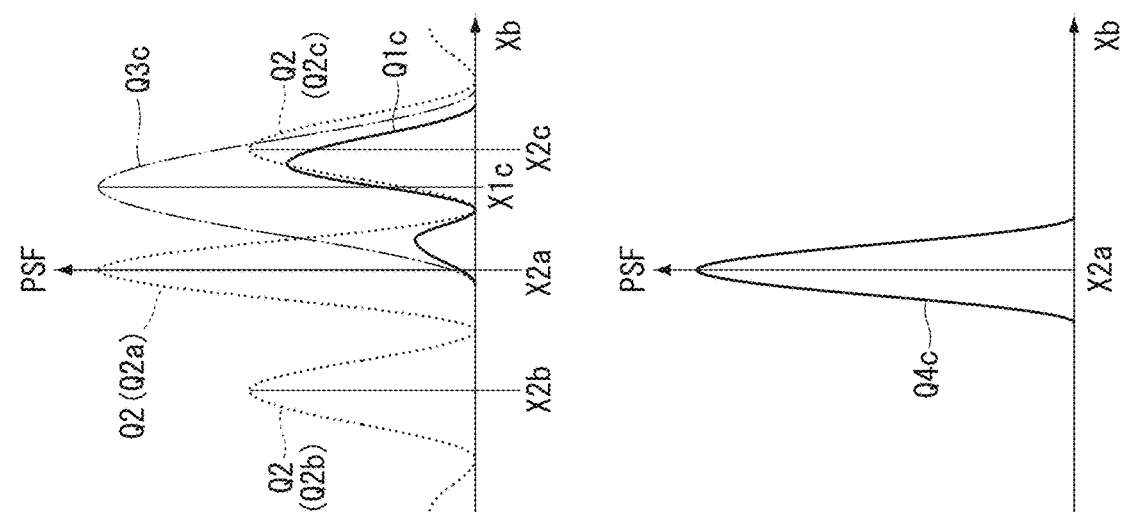

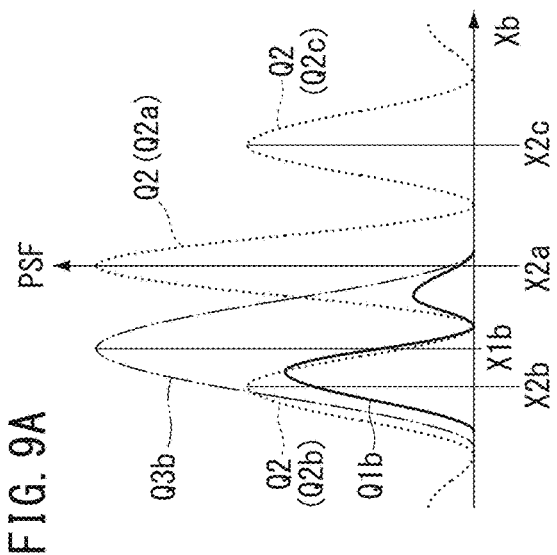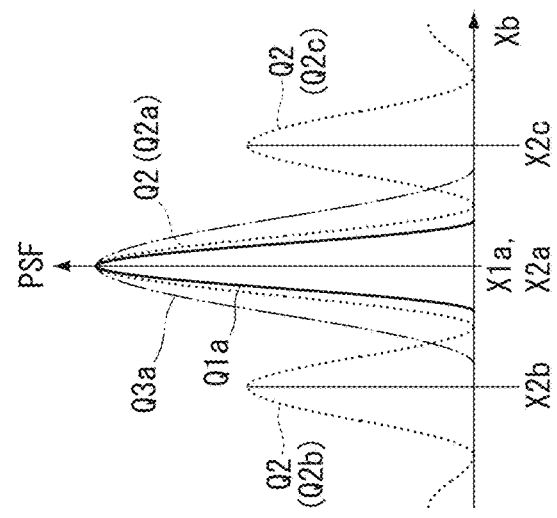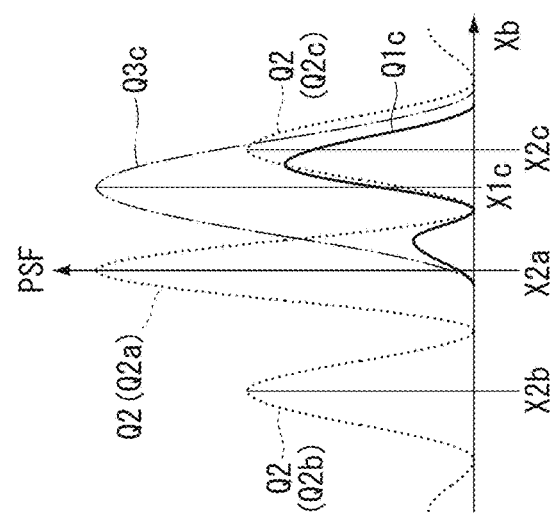
FIG. 9A
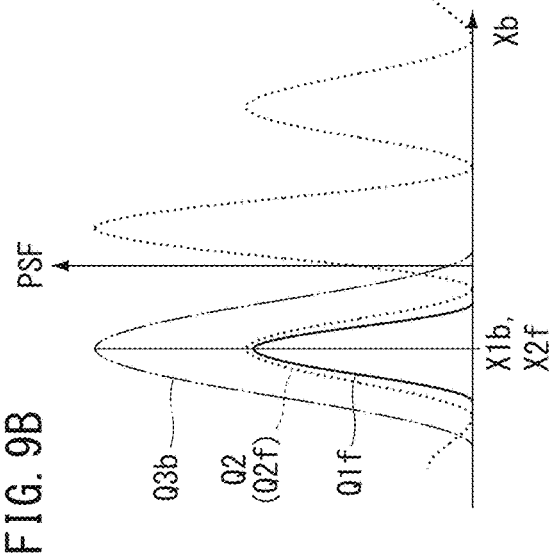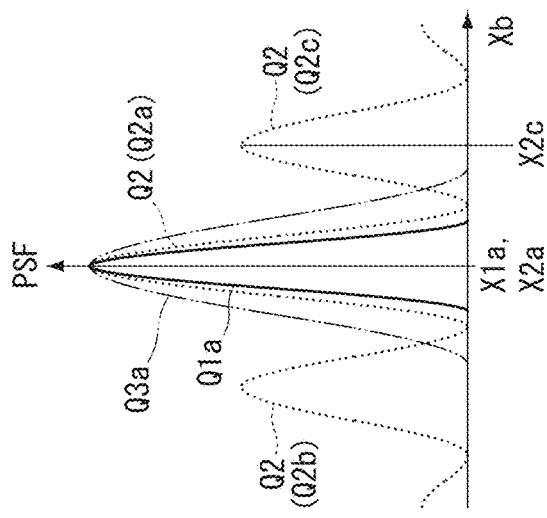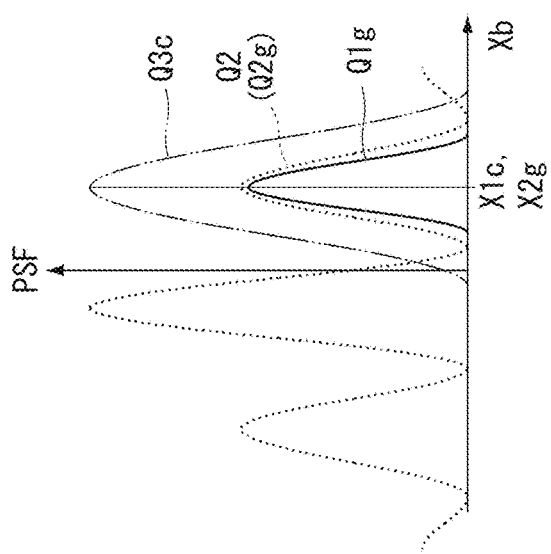
FIG. 9B

000
MICROSCOPE AND OBSERVATION METHOD

CROSS REFERENCE TO RELATED APPLICATION

This is a Continuation of PCT International Application No. PCT/JP2017/032817, filed on Sep. 12, 2017. The contents of the above-mentioned application are incorporated herein by reference.

FIELD OF THE INVENTION

The present invention relates to a microscope and an observation method.

BACKGROUND

There has been developed a scanning type microscope that detects fluorescence from a sample (for example, refer to the following Non-Patent Literature 1 (Confocal laser scanning microscopy with spatiotemporal structured illumination, Peng Gao, G. Ulrich Nienhaus, Optics Letters, Vol. 41, No. 6, 1193-1196, 2016.3.15)).

SUMMARY

A first aspect of the present invention provides a microscope including: an illumination optical system that includes a light flux splitter that splits light from a light source into a plurality of light fluxes, and scans a sample in a plurality of directions with interference fringes that are generated by interference of at least part of the light fluxes split by the light flux splitter; a detection optical system on which light from the sample is incident; a detection device including a plurality of detectors that detect the light from the sample via the detection optical system; and an image processor that generates an image using detection results obtained by two or more detectors of the detection device.

A second aspect of the present invention provides an observation method including: splitting the light from the light source into a plurality of light fluxes, and scanning the sample in a plurality of directions with the interference fringes that are generated by interference of at least part of the light fluxes; detecting the light from the sample with the detection device including the detectors via the detection optical system on which the light from the sample is incident; and generating an image using detection results obtained by two or more detectors of the detection device.

BRIEF DESCRIPTION OF DRAWINGS

FIGS. 5A and 5B are diagrams illustrating an effective PSF at each position of a detection device according to the first embodiment.

FIGS. 7A and 7B is a diagram illustrating processing performed by an image processor of a microscope according to a second embodiment.

FIGS. 9A and 9B are diagrams illustrating processing performed by an image processor of a microscope according to a third embodiment.

DETAILED DESCRIPTION OF EMBODIMENTS

First Embodiment

Figure 1:
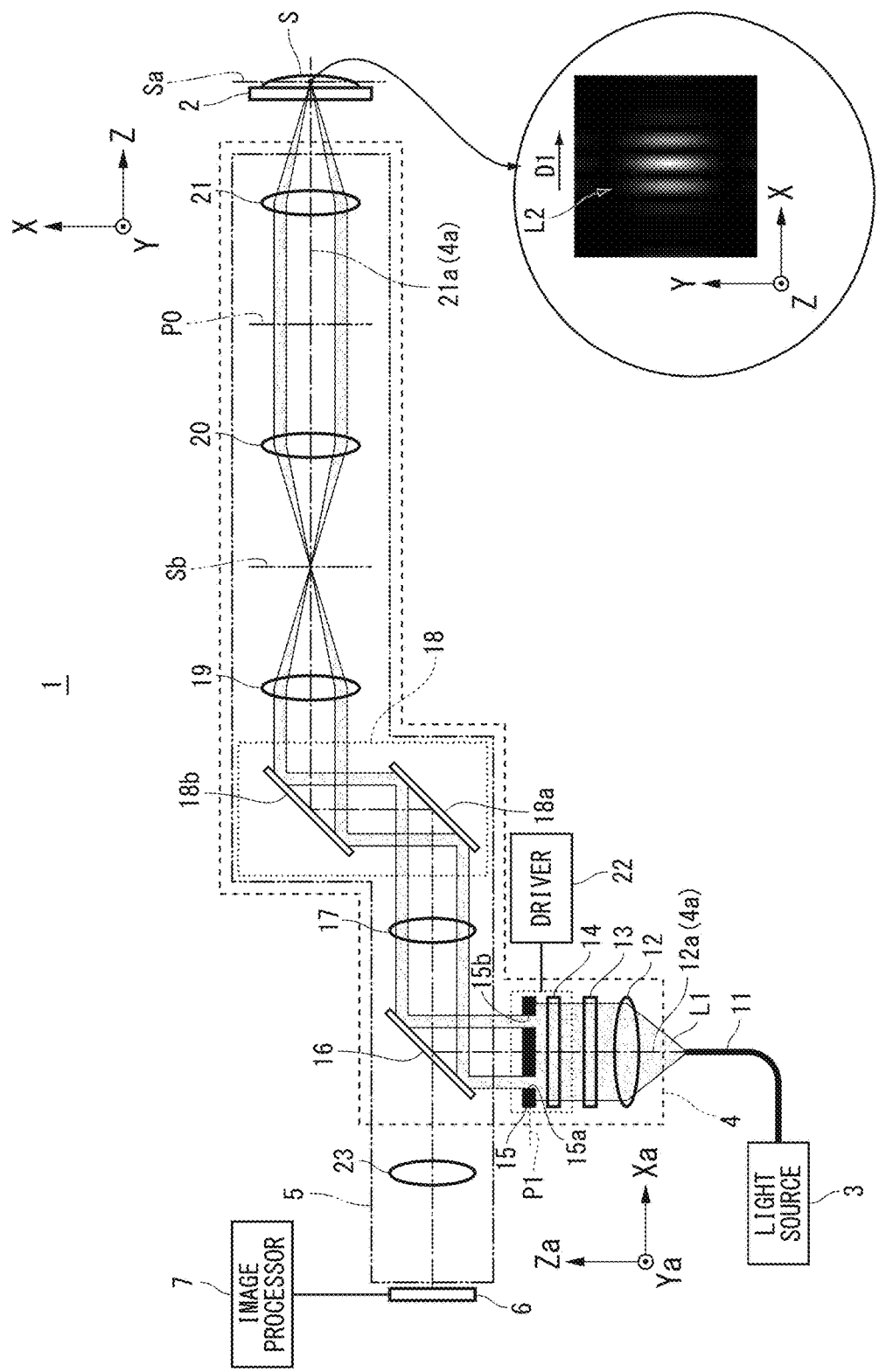
FIG. 1 is a diagram illustrating a microscope and an optical path of excitation light according to a first embodiment.

The following describes a first embodiment. FIG. 1 is a diagram illustrating a microscope and an optical path of excitation light according to the first embodiment. In the following embodiment, a microscope 1 is assumed to be a scanning type fluorescence microscope, but the microscope according to the embodiment is not limited to a scanning type microscope or a fluorescence microscope. The microscope 1 includes a stage 2, a light source 3, an illumination optical system 4, a detection optical system 5, a detection device 6, and an image processor 7. The microscope 1 operates as follows in brief.

The stage 2 holds a sample S as an observation target. The sample S is a cell and the like subjected to fluorescent staining in advance. The sample S contains a fluorescent substance such as a fluorescent dye. The light source 3 emits excitation light L1 that excites the fluorescent substance contained in the sample S. The illumination optical system 4 scans the sample S in a plurality of directions (for example, the X-direction and the Y-direction) with interference fringes L2 of the excitation light L1. The illumination optical system 4 two-dimensionally scans the sample S with the interference fringes L2. The detection optical system 5 is disposed at a position on which fluorescence L3 (illustrated in FIG. 4 described later) from the sample S is incident. The detection device 6 includes a plurality of detectors 6a (illustrated in FIG. 4 described later) that detect the fluorescence L3 from the sample S via the detection optical system 5. The image processor 7 generates an image (for example, a super resolution image) using detection results obtained by two or more of the detectors 6a of the detection device 6. The following describes respective parts of the microscope 1.

The light source 3 includes, for example, a light source such as a laser element. The light source 3 generates coherent light of a predetermined wavelength band. The predetermined wavelength band is set to be a wavelength band including an excitation wavelength of the sample S. The excitation light L1 emitted from the light source 3 is, for example, linearly polarized light. A light guide member such as an optical fiber 11 is connected to an emitting port of the light source 3. The microscope 1 does not necessarily include the light source 3, and the light source 3 may be provided separately from the microscope 1. For example, the light source 3 may be disposed in the microscope 1 in a replaceable (attachable, or removable) manner. The light source 3 may be externally mounted on the microscope 1 at the time of observation by the microscope 1.

The illumination optical system 4 is disposed at a position on which the excitation light L1 from the light source 3 is incident. The excitation light L1 is incident on the illumination optical system 4 from the light source 3 via the optical fiber 11. The optical fiber 11 may be part of the illumination optical system 4 or may be part of a light source device including the light source 3. The illumination optical system 4 includes a collimator lens 12, a λ/4 wave plate 13, a polarizer 14, a mask 15 (opening member), a dichroic mirror 16, a relay optical system 17, a scanning part 18, a lens 19, a lens 20, and an objective lens 21 in this order from the light source 3 side toward the sample S side.

In the following description, an XYZ orthogonal coordinate system illustrated in FIG. 1, for example, should be referred to as appropriate. In the XYZ orthogonal coordinate system, each of the X-direction and the Y-direction is a direction perpendicular to an optical axis 21a of the objective lens 21. The Z-direction is a direction parallel with the optical axis 21a of the objective lens 21. The optical axis 21a of the objective lens 21 is included in an optical axis 4a of the illumination optical system 4. For each of the X-direction, the Y-direction, and the Z-direction, the same side as an arrow is referred to as a +side (for example, +X side), and the opposite side of the arrow is referred to as a −side (for example, −X side) as appropriate. In a case in which an optical path is bent by reflection, a direction corresponding to each of the X-direction, the Y-direction, and the Z-direction is represented by adding a subscript. For example, the Xa-direction, the Ya-direction, and the Za-direction in FIG. 1 are directions respectively corresponding to the X-direction, the Y-direction, and the Z-direction on the optical path from the collimator lens 12 to the dichroic mirror 16.

The collimator lens 12 converts the excitation light L1 emitted from the optical fiber 11 into parallel light. For example, the collimator lens 12 is disposed so that a focal point thereof on the same side as the light source 3 is aligned with a light emitting port of the optical fiber 11. In the following description, a focal point of the lens included in the illumination optical system 4 on the same side as the light source 3 is referred to as a rear side focal point, and a focal point thereof on the same side as the sample S is referred to as a front side focal point as appropriate.

The λ/4 wave plate 13 causes the polarization state of the excitation light L1 to be circular polarization. The polarizer 14 is, for example, a polarizing plate, and has a characteristic of transmitting linearly polarized light in a predetermined direction. The polarizer 14 is disposed so that light incident on the sample S becomes S-polarized light (linearly polarized light in the Y-direction). The polarizer 14 can rotate about an optical axis 12a of the collimator lens 12. The optical axis 12a of the collimator lens 12 is included in the optical axis 4a of the illumination optical system 4.

The mask 15 is a light flux splitter that splits excitation light that excites a fluorescent substance into a plurality of light fluxes. The illumination optical system 4 scans the sample S with the interference fringes L2 that are generated by interference of two or more of the light fluxes split by the mask 15. The mask 15 is disposed at a position of a pupil conjugate plane P1 that is optically conjugate to a pupil plane P0 of the objective lens 21, or within a range distant therefrom by 100 mm or less. The mask 15 may also be disposed on the pupil plane P0, or within a range distant therefrom by 100 mm or less.

The mask 15 has an opening 15a and an opening 15b through which the excitation light L1 passes. The interference fringes L2 are formed by interference between excitation light L1a passed through the opening 15a and excitation light L1b passed through the opening 15b. The mask 15 can rotate about the optical axis 12a of the collimator lens 12. The mask 15 is, for example, fixed relatively to the polarizer 14, and rotates integrally with the polarizer 14. The mask 15 and the polarizer 14 are rotated by torque supplied from a driver 22.

Figure 2A:
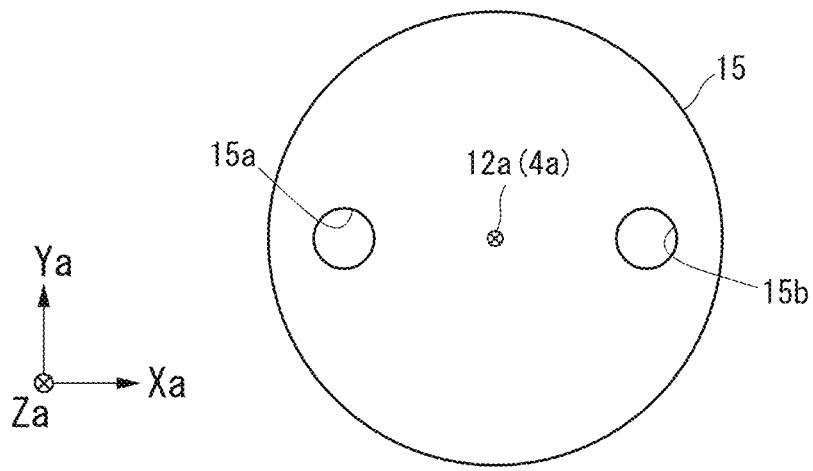
FIGS. 2A to 2C are diagrams illustrating a mask and a polarizer according to the first embodiment.
Figure 2B:
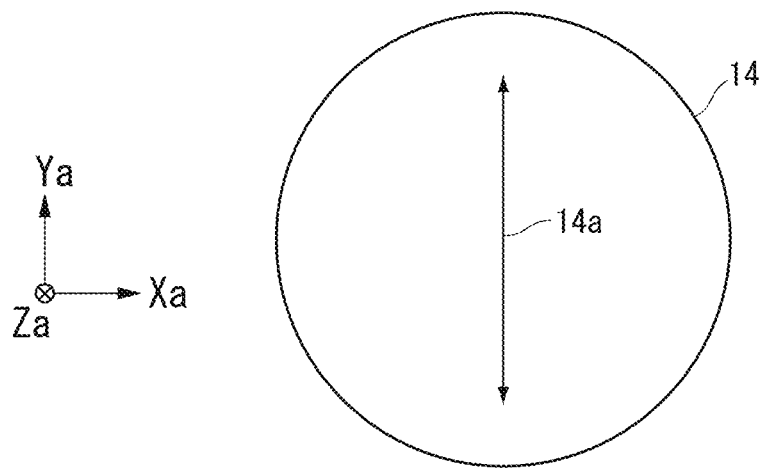
Figure 2C:
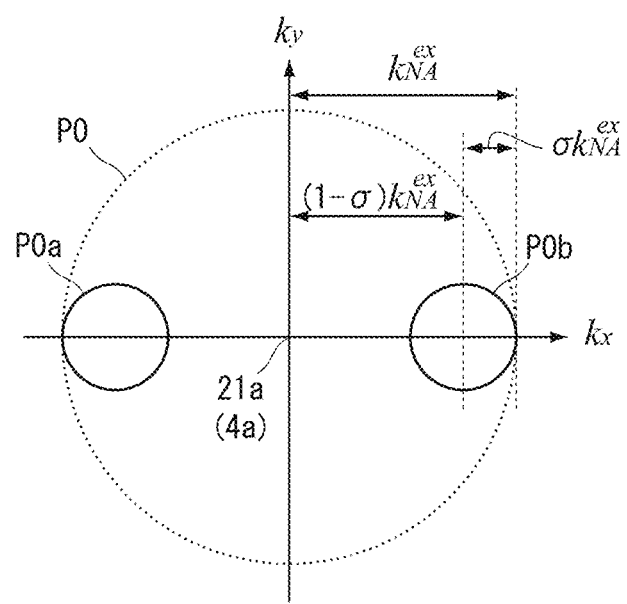

FIG. 2A is a diagram illustrating the mask according to the first embodiment. The opening 15a and the opening 15b of the mask 15 are disposed symmetrically to the optical axis 12a of the collimator lens 12 (refer to FIG. 1). In the state of FIG. 2A, the opening 15a and the opening 15b are arranged in the Xa-direction. FIG. 2B is a diagram illustrating the polarizer according to the first embodiment. A transmission axis 14a of the polarizer 14 is set to be parallel with a direction (in FIG. 2B, the Ya-direction) perpendicular to the direction in which the opening 15a and the opening 15b are arranged (in FIG. 2A, the Xa-direction) on the mask 15. FIG. 2C is a diagram illustrating the pupil plane P0 of the objective lens 21. Each of the reference numerals P0a and P0b denotes a region on which the excitation light L1 is incident. Parameters illustrated in FIG. 2C will be referred to later in the description about the image processor 7.

Returning to the description of FIG. 1, the dichroic mirror 16 has a characteristic of reflecting the excitation light L1, and transmitting the fluorescence L3 (illustrated in FIG. 4 described later) from the sample S. The excitation light L1 passed through the opening 15a and the opening 15b of the mask 15 is reflected by the dichroic mirror 16, the optical path thereof is bent, and the excitation light L1 is incident on the relay optical system 17. The relay optical system 17 guides the excitation light L1 from the dichroic mirror 16 to the scanning part 18. The relay optical system 17 is represented as one lens in the drawing, but the number of lenses included in the relay optical system 17 is not limited to one. The relay optical system 17 may be unnecessary depending on a distance and the like of the optical system. In the respective drawings, two or more lenses may be represented as one lens for a portion other than the relay optical system 17.

The scanning part 18 scans the sample S with the interference fringes L2 of the excitation light L1 in two directions including the X-direction and the Y-direction. The scanning part 18 changes positions at which the interference fringes L2 are formed by the excitation light L1 in two directions intersecting with the optical axis 21a of the objective lens 21. The scanning part 18 includes a deflecting mirror 18a and a deflecting mirror 18b. Inclination of the deflecting mirror 18a and the deflecting mirror 18b with respect to the optical path of the excitation light L1 is variable. Each of the deflecting mirror 18a and the deflecting mirror 18b is a galvanometer mirror, a MEMS mirror, a resonant mirror (resonance type mirror), and the like. Each of the deflecting mirror 18a and the deflecting mirror 18b may be a scanner.

The deflecting mirror 18a changes, in the X-direction, a position on the sample S on which the excitation light L1 is incident. The deflecting mirror 18b changes, in the Y-direction, a position on the sample S on which the excitation light L1 is incident. The scanning part 18 is, for example, disposed so that a position that is conjugate to the pupil plane P0 of the objective lens 21 becomes the position of the deflecting mirror 18a, the position of the deflecting mirror 18b, or a position between the deflecting mirror 18a and the deflecting mirror 18b. Alternatively, the scanning part 18 may have a configuration in which the position on the sample S on which the excitation light L1 is incident is changed in the Y-direction by the deflecting mirror 18a, and changed in the X-direction by the deflecting mirror 18b.

The excitation light L1 from the scanning part 18 is incident on the lens 19. The lens 19 concentrates the excitation light L1 to a sample conjugate plane Sb that is optically conjugate to a sample plane Sa of the objective lens 21. The sample plane Sa is a plane disposed at the front side focal point of the objective lens 21 or a position in the vicinity of the front side focal point, and perpendicular to the optical axis 21a of the objective lens 21. On the sample conjugate plane Sb, interference fringes are formed by interference between the excitation light L1a passed through the opening 15a of the mask 15 and the excitation light L1b passed through the opening 15b.

The excitation light L1 passed through the sample conjugate plane Sb is incident on the lens 20. The lens 20 converts the excitation light L1 into parallel light. The excitation light L1 passed through the lens 20 passes through the pupil plane P0 of the objective lens 21. The objective lens 21 concentrates the excitation light L1 onto the sample plane Sa. The lens 20 and the objective lens 21 project, on the sample plane Sa, the interference fringes formed on the sample conjugate plane Sb. The interference fringes L2 are locally formed on the sample plane Sa.

The interference fringes L2 include a bright part having relatively high light intensity and a dark part having relatively low light intensity. A direction in which the bright part and the dark part are arranged (in FIG. 1, the X-direction) is referred to as a periodic direction D1 of the interference fringes L2 as appropriate. The periodic direction D1 of the interference fringes L2 corresponds to the direction in which the opening 15a and the opening 15b of the mask 15 are arranged (in FIG. 1, the Xa-direction). When the driver 22 causes the mask 15 to rotate about the Za-direction, the direction in which the opening 15a and the opening 15b are arranged is rotated, and the periodic direction D1 of the interference fringes L2 is rotated about the Z-direction. That is, the driver 22 is included in a fringe direction changer that changes the direction of the interference fringes L2. The driver (fringe direction changer) changes a direction in which two or more light fluxes are arranged (hereinafter, referred to as a light flux splitting direction) on a plane perpendicular to the optical axis 4a of the illumination optical system 4 (for example, a plane on a light emitting side of the mask 15). The light flux splitting direction described above is, for example, the direction in which the opening 15a and the opening 15b are arranged, and the driver 22 causes the mask 15 to rotate to change the light flux splitting direction.

When the mask 15 rotates about the Za-direction, a direction in which the excitation light L1 is incident on the sample S is changed. The driver 22 causes the polarizer 14 to rotate interlocking with the mask 15 to change orientation of the transmission axis of the polarizer 14 and adjusts the excitation light L1 to be incident on the sample S as S-polarized light. That is, the polarizer 14 and the driver 22 are included in a polarization adjuster that adjusts the polarization state of the excitation light L1 on the basis of the direction of the interference fringes.

Figure 3A:
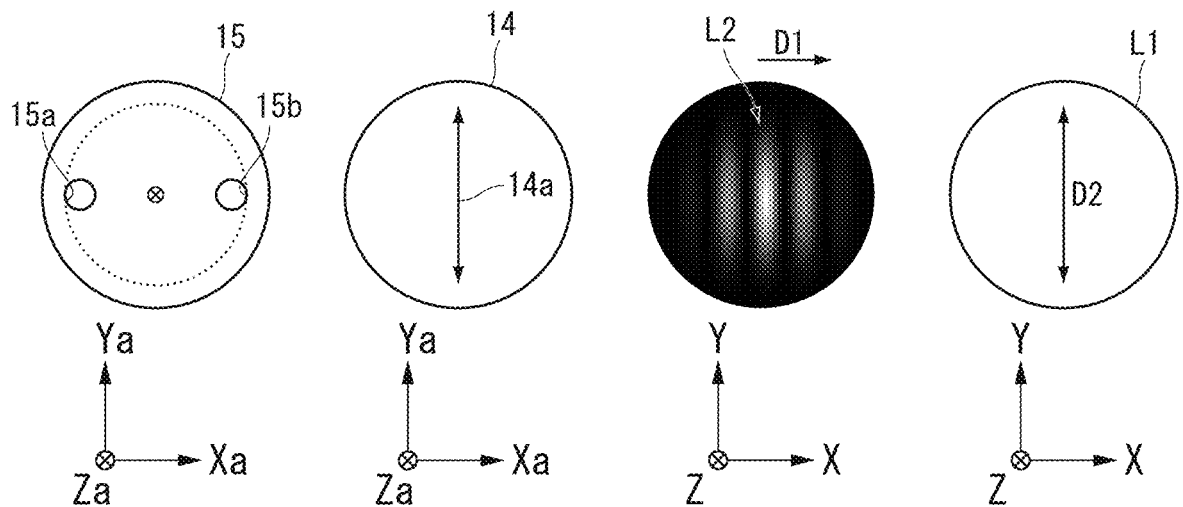
FIGS. 3A to 3C are diagrams illustrating a mask, a polarizer, interference fringes, and a polarization state of excitation light according to the first embodiment.
Figure 3B:
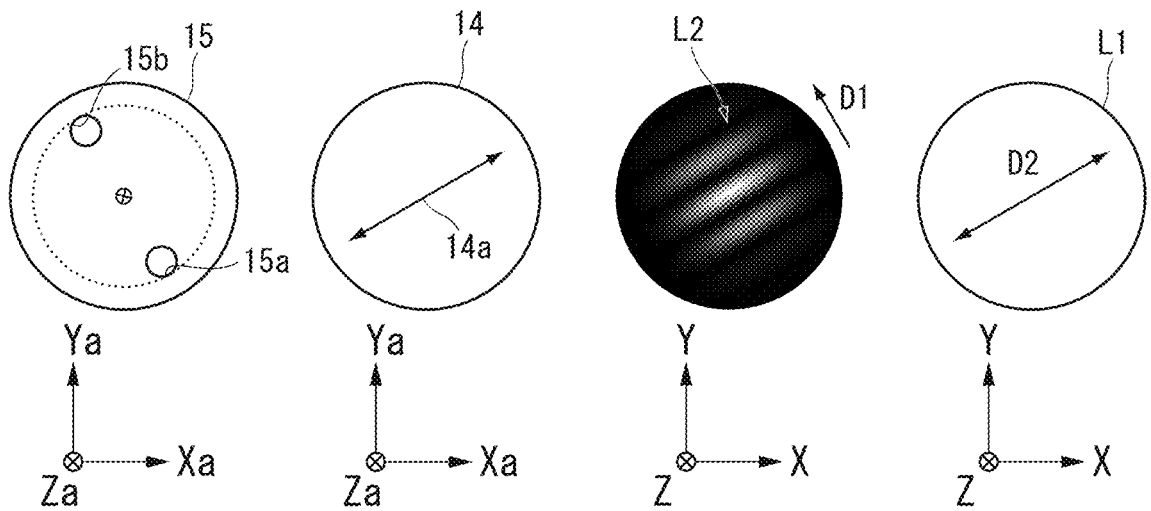
Figure 3C:
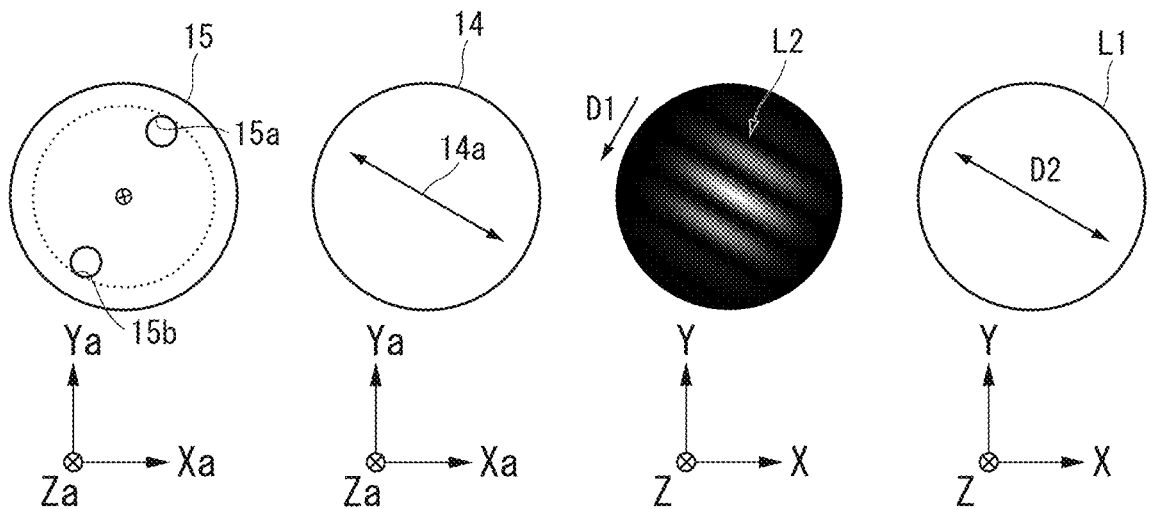

FIGS. 3A to 3C are diagrams illustrating the mask, the polarizer, the interference fringes, and the polarization state of the excitation light according to the first embodiment. In FIG. 3A, the direction in which the opening 15a and the opening 15b of the mask 15 are arranged is the Xa-direction. The transmission axis 14a of the polarizer 14 is the Ya-direction perpendicular to the Xa-direction. In this case, the light flux of the excitation light L1 (refer to FIG. 1) passed through the opening 15a and the light flux thereof passed through the opening 15b are incident on the sample S, and the interference fringes L2 in the periodic direction D1 are generated. The excitation light L1 incident plane is parallel with the XZ-plane. At the time when the excitation light L1 is incident on the sample S, a polarization direction D2 thereof is the Y-direction perpendicular to the incident plane. That is, the excitation light L1 is incident on the sample S as S-polarized light.

In FIG. 3B, the direction in which the opening 15a and the opening 15b of the mask 15 are arranged is a direction obtained by rotating the Xa-direction counterclockwise by 120°. The transmission axis 14a of the polarizer 14 is a direction obtained by rotating the Ya-direction counterclockwise by 120°. The periodic direction of the interference fringes L2 is a direction forming an angle of 120° with respect to the X-direction. The incident plane of the excitation light L1 is a plane obtained by rotating the XZ-plane about the Z-direction by 120°. At the time when the excitation light L1 is incident on the sample S, the polarization direction D2 thereof is a direction perpendicular to the incident plane. That is, the excitation light L1 is incident on the sample S as S-polarized light.

In FIG. 3C, the direction in which the opening 15a and the opening 15b of the mask 15 are arranged is a direction obtained by rotating the Xa-direction counterclockwise by 240°. The transmission axis 14a of the polarizer 14 is a direction obtained by rotating the Ya-direction counterclockwise by 240°. The periodic direction D1 of the interference fringes L2 is a direction forming an angle of 240° with respect to the X-direction. The incident plane of the excitation light L1 is a plane obtained by rotating the XZ-plane about the Z-direction by 240°. At the time when the excitation light L1 is incident on the sample S, the polarization direction D2 thereof is a direction perpendicular to the incident plane. That is, the excitation light L1 is incident on the sample S as S-polarized light.

In a case in which the excitation light L1 is incident on the sample S as S-polarized light as described above, contrast of the interference fringes L2 is enhanced as compared with a case of being incident thereon as P-polarized light. In FIGS. 3A to 3C, the periodic direction of the interference fringes L2 is changed in three patterns in units of an angle of 120°, but the periodic direction of the interference fringes L2 is not limited to this example. The periodic direction of the interference fringes L2 corresponds to a direction in which resolving power can be improved (a direction in which a super resolution effect can be obtained) in an image generated by the image processor 7 (described later). The periodic direction of the interference fringes L2 is appropriately set so that a desired super resolution effect can be obtained. For example, there may be two patterns of periodic directions of the interference fringes L2 that form an angle of 90°, or there may be one pattern of periodic direction thereof. The mask 15 may be replaceable in accordance with magnification, a numerical aperture (NA) of the objective lens 21, and an illumination pupil shape.

Figure 4:
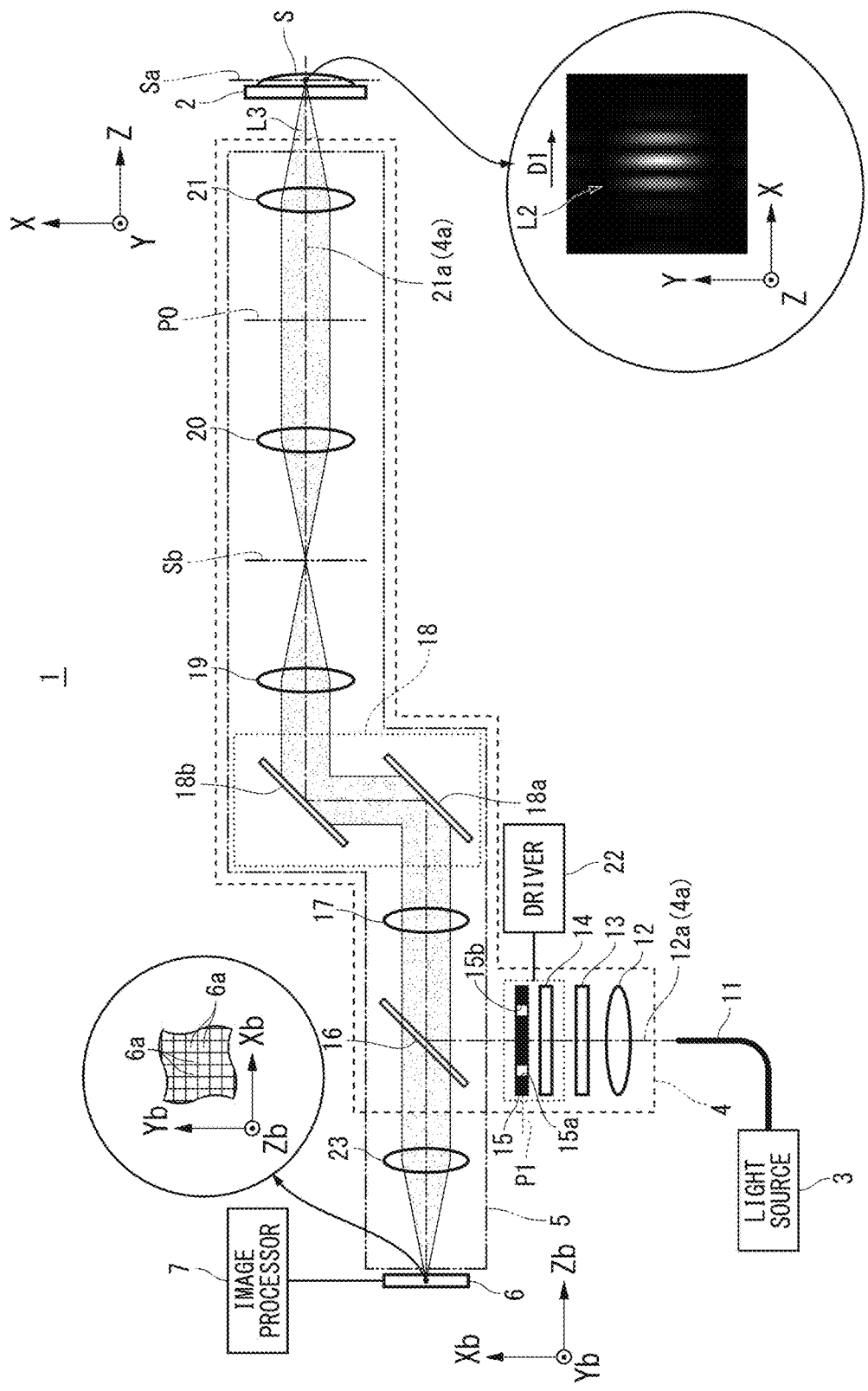
FIG. 4 is a diagram illustrating the microscope and an optical path of fluorescence according to the first embodiment.

FIG. 4 is a diagram illustrating the microscope 1 and an optical path of fluorescence according to the first embodiment. The detection optical system 5 forms an image of the fluorescence L3 generated in the sample S. The detection optical system 5 includes the objective lens 21, the lens 20, the lens 19, the scanning part 18, the relay optical system 17, the dichroic mirror 16, and a lens 23 in this order from the sample S side toward the detection device 6 side. The fluorescence L3 generated in the sample S passes through the objective lens 21, the lens 20, and the lens 19 in this order, and is incident on the scanning part 18. The fluorescence L3 is descanned by the scanning part 18 and passes through the relay optical system 17 to be incident on the dichroic mirror 16. The dichroic mirror 16 has a characteristic of transmitting the fluorescence L3. The fluorescence L3 transmitted through the dichroic mirror 16 is incident on the lens 23. The lens 23 concentrates the fluorescence L3 to the detection device 6.

The detection device 6 is an image sensor and includes the detectors 6a that are two-dimensionally arranged. The detectors 6a are arranged in two directions in the detection device 6. The detectors 6a are arranged in two directions including the Xb-direction and the Yb-direction. Each of the detectors 6a is a sensor cell, a pixel, a photodetector, or the like including a photoelectric conversion element such as a photodiode. Each of the detectors 6a can detect the fluorescence L3. For example, the detector 6a corresponds to one pixel, but a detection region (light receiving region) including a plurality of pixels may be used as one detector 6a.

The microscope 1 scans the interference fringes L2 on the sample plane Sa with the scanning part 18, and the detection device 6 detects the fluorescence L3. For example, the microscope 1 illuminates an illumination region selected from the sample plane Sa with the interference fringes L2, and the detection device 6 detects the fluorescence L3 from the illumination region. After the detection performed by the detection device 6 is ended, the microscope 1 changes the illumination region with the scanning part 18. The microscope 1 repeatedly performs the processing of detecting the fluorescence and the processing of changing the illumination region to acquire fluorescence intensity distribution (a measurement value obtained by the detection device 6) in a desired region.

The image processor 7 generates an image on the basis of a detection result that is obtained by the detection device 6 as described above. The following describes processing performed by the image processor 7. In numerical expressions used for the following description, a coordinate system is described as a vector as appropriate. Coordinates on the sample plane Sa and coordinates on the detection device 6 (hereinafter, referred to as detector coordinates) are represented as vector r=(x, y), and wave coordinates corresponding thereto (coordinates subjected to Fourier transformation with r) are represented as vector k=($k_x$, $k_y$). Coordinates of a scanning target (hereinafter, referred to as scan coordinates) of the scanning part 18 is represented as vector $r_s$=($x_s$, $y_s$), and wave coordinates corresponding thereto (coordinates subjected to Fourier transformation with $r_s$) are represented as vector $k_s$=($k_{xs}$, $k_{ys}$). In the following description, a wave number may be referred to as a space frequency or a frequency. The magnification of the optical system is assumed to be 1 for convenience of explanation, but the magnification may be optionally set.

Assuming that the numerical aperture of the optical system including the objective lens 21 is NA, an wavelength of illumination light is $\lambda_{ex}$, and the wavelength of the fluorescence L3 is $\lambda_{em}$, a pupil radius $k_{NA}^{ex}$ of the objective lens 21 in a case in which the excitation light is incident and a pupil radius $k_{NA}^{em}$ of the objective lens 21 in a case in which the fluorescence is incident are represented by the following expression (1). As well known in the art, electric field amplitudes of the pupil plane and an image plane are related to each other on the basis of a relation of Fourier transformation, so that the coordinates of a pupil position may be represented by wave coordinates. Each of $k_{NA}^{ex}$ and $k_{NA}^{em}$ indicates a value of the pupil radius in a case in which the pupil is represented by the wave coordinates.

$$\begin{cases} k_{NA}^{ex} = \dfrac{NA}{\lambda_{ex}} \\ k_{NA}^{em} = \dfrac{NA}{\lambda_{em}} \end{cases} \quad \text{Expression (1)}$$

The following describes various parameters with reference to FIG. 2C. In FIG. 2C, the pupil plane P0 is represented in a wave coordinate space (frequency space). An inside region of a circle illustrated by a dotted line in FIG. 2C is a pupil of the objective lens 21, and $k_{NA}^{ex}$ is a pupil radius of the objective lens 21. Each of a region P0a and a region P0b on which the excitation light L1 is incident is assumed to have a circular shape but does not necessarily have the circular shape. A radius of each of the region P0a and the region P0b is $\sigma k_{NA}^{ex}$. ($\sigma$ is a ratio of the radius of the region P0a or the region P0b to the pupil radius of the objective lens 21. A distance from the optical axis 21a of the objective lens 21 to the center of the region P0a is $(1-\sigma)k_{NA}^{ex}$. A distance between the center of the region P0a and the center of the region P0b is, for example, $2(1-\sigma)k_{NA}^{ex}$, but is not limited to this value. Electric field intensity ill(r) of the excitation light on the sample plane Sa is represented by the following expression (2).

$$\text{ill}(r) = PSF_{ill}(r)\frac{1+\cos 2\pi k_0 \cdot r}{2} \qquad \text{Expression (2)}$$

In this case, vector $k_0=(k_0, 0)$ indicates a wave vector of illumination fringes, and $k_0=2(1-\sigma)k_{NA}^{ex}$ is satisfied. $PSF_{ill}(r)$ is a point spread function in a case in which the numerical aperture of the optical system is σNA. An interval between the interference fringes of ill(r) (a distance from the bright part to the next bright part) is $1/k_0 = 1/(2(1-\sigma)k_{NA}^{ex})$. In the following description, the interval between the interference fringes is referred to as a fringe interval or a period of the interference fringes as appropriate.

In the embodiment, the fluorescent substance contained in the sample S is excited by the excitation light L1, and the fluorescence L3 is emitted from the excited fluorescent substance. The detection device 6 receives the fluorescence L3 and takes an image of the fluorescent substance formed by the detection optical system 5. The detection device 6 takes the image of the fluorescent substance to acquire image data. In the following description, the size of the detector 6a (detector size) of the detection device 6 is assumed to be sufficiently smaller than a dimension corresponding to the period of the interference fringes L2 in the detection device 6 (a length on the detection device 6 corresponding to one period). For example, the size of the detector 6a is set to be about $\lambda_{em}/4NA$.

In this case, distribution of the fluorescent substance in the sample S is represented as Obj(r), and the image data obtained by the detection device 6 is represented as $I(r, r_s)$. $I(r, r_s)$ is represented by the following expression (3).

$$I(r,r_s) = PSF_{det}(r)^{*r}\{Obj(r+r_s)\text{ill}(r)\} \qquad \text{Expression (3)}$$

In the expression (3), $*^r$ is a convolution of r. In this case, $PSF_{det}(r)$ is a detection PSF defined by the detection optical system 5 including the objective lens 21 and the fluorescence wavelength $\lambda_{em}$. The image data $I(r, r_s)$ is four-dimensional data having the detector coordinates r=(x, y) and the scan coordinates $r_s=(x_s, y_s)$ as independent variables. The following expression (4) is obtained by deforming $I(r, r_s)$.

$$I(r, r_s) = \{PSF_{det}(r + r_s)\text{ill}(r_s)\}\overset{r_s}{*} Obj(r_s) \qquad \text{Expression (4)}$$
$$= PSF_{\textit{eff}}(r, r_s)\overset{r_s}{*} Obj(r_s)$$

In the expression (4), $*^{r_s}$ is a convolution of $r_s$. $PSF_{\textit{eff}}(r, r_s)$ is an effective PSF defined in the following expression (5).

$$PSF_{\textit{eff}}(r, r_s) = PSF_{det}(r + r_s)\text{ill}(r_s) \qquad \text{Expression (5)}$$
$$= PSF_{det}(r + r_s)PSF_{ill}(r_s)\frac{1+\cos 2\pi k_0 \cdot r_s}{2}$$

From the expression (4) described above, it can be found that image data of Obj ($r_s$) can be obtained for each detector 6a of the detection device 6. From the expression (5) described above, it can be found that the shape of the effective PSF is different for each position (r) of the detector 6a of the detection device 6.

FIGS. 5A and 5B are diagrams illustrating the effective PSF for each detector of the detection device according to the first embodiment. In each graph in FIGS. 5A and 5B, a horizontal axis indicates the Xb-direction of the detection device 6. The sample plane Sa is optically conjugate to the detection device 6, and coordinates X on the sample plane Sa and coordinates Xb on the detection device are associated with each other by appropriate coordinate transformation. For example, in a case in which the magnification of the optical system is 1, X=Xb is satisfied.

FIG. 5A illustrates a graph representing the effective PSF (solid line) of each of three detectors 6a having different coordinates in the Xb-direction. For example, the graph at the center of FIG. 5A represents distribution Q1a (solid line) corresponding to the effective PSF of the detector 6a disposed at a position X1a. The graph on the left side of FIG. 5A represents distribution Q1b (solid line) corresponding to the effective PSF of the detector 6a disposed at a position X1b. The graph on the right side of FIG. 5A represents distribution Q1c (solid line) corresponding to the effective PSF of the detector 6a disposed at a position X1c.

The reference numeral Q2 corresponding to a dotted line in FIGS. 5A and 5B denotes distribution corresponding to intensity distribution of the interference fringes L2 illustrated in FIGS. 2A to 2C, for example. The distribution Q2 corresponds to the electric field intensity ill(r) (refer to the expression (2) described above) of the excitation light on the sample plane Sa. Positions at which the intensity of the interference fringes L2 becomes a maximum, that is, peak positions X2a, X2b, and X2c of the distribution Q2 can be obtained by numerical simulation and the like in advance.

The distribution Q2 includes Q2a, Q2b, and Q2c as partial distribution. The distribution Q2a is distribution in a range from a minimum position before the peak position X2a to the next minimum position. The distribution Q2b is distribution in a range from a minimum position before the peak position X2b to the next minimum position. The distribution Q2c is distribution in a range from a minimum position before the peak position X2c to the next minimum position.

The reference numerals Q3a, Q3b, and Q3c corresponding to a chain double-dashed line in FIGS. 5A and 5B denote distribution corresponding to the detection PSF defined by the detection optical system 5 including the objective lens 21 and the fluorescence wavelength $\lambda_{em}$. The detection PSF corresponds to $PSF_{det}(r)$ in the expression (3) and the like.

The distribution Q3a represented by a graph at the center of FIG. 5A is distribution corresponding to the detector 6a disposed at the position X1a among the detectors 6a. The distribution Q3a becomes a maximum (reaches a peak) at the position X1a at which the detector 6a is disposed (for example, the center position in the light receiving region of the detector 6a). The position X1a is substantially the same as the peak position X2a of the distribution Q2a corresponding to the intensity distribution of the interference fringes L2. The distribution Q1a corresponding to the effective PSF is distribution obtained by multiplying the distribution Q2 corresponding to the intensity distribution of the interference fringes L2 by the distribution Q3a corresponding to the detection PSF of the detector 6a disposed at the position X1a.

In the graph at the center of FIG. 5A, a deviation amount of the position X1a of the detector 6a, that is, the peak position of the detection PSF (the peak position of the distribution Q3a) from the peak position X2a of the distribution Q2a corresponding to the intensity distribution of the interference fringes L2 is smaller than a predetermined value (for example, substantially 0). In such a case, the distribution Q1a of the effective PSF takes a single maximum (peak). In this case, the peak position of the distribution Q1a is substantially the same as the position X1a of the detector 6a or the peak position X2a of the distribution Q2a corresponding to the intensity distribution of the interference fringes L2.

The distribution Q3b represented by the graph on the left side of FIG. 5A is distribution corresponding to the detector 6a disposed at the position X1b among the detectors 6a. The distribution Q3b becomes a maximum (reaches a peak) at the position X1b at which the detector 6a is disposed (for example, the center position in the light receiving region of the detector 6a). The position X1b deviates from the peak position X2b of the partial distribution Q2b including the position X1b of the distribution Q2 corresponding to the intensity distribution of the interference fringes L2. The distribution Q1b corresponding to the effective PSF is distribution obtained by multiplying the distribution Q2 corresponding to the intensity distribution of the interference fringes L2 by the distribution Q3b corresponding to the detection PSF of the detector 6a disposed at the position X1b.

In the graph on the left side of FIG. 5A, a shift amount of the position X1b of the detector 6a, that is, the peak position of the detection PSF (the peak position of the distribution Q3b) from the peak position X2b of the distribution Q2b corresponding to the intensity distribution of the interference fringes L2 is larger than the predetermined value. In this case, the distribution Q1b of the effective PSF takes two maxima (peaks). In this way, the peak of the effective PSF is caused to branch into two peaks depending on the position of the detector 6a in some cases, and this phenomenon is called distortion of the shape of the effective PSF. A peak at which the effective PSF is the strongest is called a main lobe, and the other peaks are called side lobes.

The peak position of the main lobe of the distribution Q1b of the effective PSF deviates from the center position of the detection device 6 (the position of X2a, the position of the optical axis of the detection optical system). In this way, it can be found that the position of the main lobe of the effective PSF deviates depending on the position (r) of the detector 6a of the detection device 6. In the following description, a deviation in the position of the main lobe of the effective PSF is called a positional deviation of the effective PSF as appropriate.

The distribution Q3c represented by the graph on the right side of FIG. 5A is distribution corresponding to the detector 6a disposed at the position X1c among the detectors 6a. The distribution Q3c becomes a maximum (reaches a peak) at the position X1c at which the detector 6a is disposed (for example, the center position in the light receiving region of the detector 6a). The position X1c deviates from the peak position X2c of the partial distribution Q2c including the position X1c of the distribution Q2 corresponding to the intensity distribution of the interference fringes L2. The distribution Q1c corresponding to the effective PSF is distribution obtained by multiplying the distribution Q2 corresponding to the intensity distribution of the interference fringes L2 by the distribution Q3c corresponding to the detection PSF of the detector 6a disposed at the position X1c.

In the graph on the right side of FIG. 5A, a deviation of the position X1c of the detector 6a, that is, the peak position of the detection PSF (the peak position of the distribution Q3c) from the peak position X2c of the distribution Q2c corresponding to the intensity distribution of the interference fringes L2 is larger than the predetermined value. In this case, the distribution Q1b of the effective PSF takes two maxima (peaks), and distortion of the shape of the effective PSF and a positional deviation of the effective PSF are caused.

FIG. 5B is different from FIG. 5A in the position of the detector 6a. Distribution Q3d represented by the graph on the left side of FIG. 5B is distribution corresponding to the detector 6a disposed at a position X1d among the detectors 6a. The distribution Q3d becomes a maximum (reaches a peak) at the position X1d at which the detector 6a is disposed (for example, the center position in the light receiving region of the detector 6a). The position X1d is substantially the same as the peak position X2b of the partial distribution Q2b including the position X1d of the distribution Q2 corresponding to the intensity distribution of the interference fringes L2. In such a case, the distribution Q1d of the effective PSF takes a single maximum (peak), and the peak position of the distribution Q1d is substantially the same as the position X1d of the detector 6a or the peak position X2b of the distribution Q2b corresponding to the intensity distribution of the interference fringes L2. That is, distortion of the shape of the effective PSF is not caused.

Distribution Q3e represented by the graph on the right side of FIG. 5B is distribution corresponding to the detector 6a disposed at a position X1e among the detectors 6a. The distribution Q3e becomes a maximum (reaches a peak) at the position X1e at which the detector 6a is disposed (for example, the center position in the light receiving region of the detector 6a). The position X1e is substantially the same as the peak position X2c of the partial distribution Q2c including the position X1e of the distribution Q2 corresponding to the intensity distribution of the interference fringes L2. In such a case, the distribution Q1e of the effective PSF takes a single maximum (peak), and the peak position of the distribution Q1e is substantially the same as the position X1e of the detector 6a or the peak position X2c of the distribution Q2c corresponding to the intensity distribution of the interference fringes L2. That is, distortion of the shape of the effective PSF is not caused.

In the present embodiment, the image processor 7 uses a detection result of the detector 6a that is selected from among the detectors 6a on the basis of the magnification of the detection optical system 5 and the period of the interference fringes L2 (fringe interval). The image processor 7 selects the detector 6a from among the detectors 6a on the basis of the peak position of the interference fringes L2 (for example, the peak positions X2a, X2b, and X2c in FIGS. 5A and 5B), and uses a detection result of the selected detector 6a. The peak position of the interference fringes L2 corresponds to, for example, a position at which the intensity is maximum in the intensity distribution of the interference fringes L2 (for example, the center position of the bright part).

For example, the image processor 7 uses a detection result of the detector 6a disposed at the position X1a corresponding to the peak position X2a as a detection result corresponding to the peak position X2a in the graph at the center of FIG. 5B. For example, the peak positions X2a, X2b, and X2c are obtained in advance by numerical simulation and the like and stored in a storage in advance. The image processor 7 selects the detector 6a that is disposed to be the closest to the peak position X2a from among the detectors 6a on the basis of the stored information about the peak positions and uses a detection result of the selected detector 6a.

As a detection result related to the partial distribution Q2a including one peak of the intensity distribution of the interference fringes L2, the image processor 7 may use only a detection result of one detector 6a disposed at the position X1a, or may use detection results of the detector 6a disposed at the position X1a and at least one detector 6a around the former detector 6a.

As a detection result corresponding to the peak position X2b in the graph on the left side of FIG. 5B, for example, the image processor 7 uses a detection result of the detector 6a disposed at the position X1d corresponding to the peak position X2b. On the basis of the magnification of the detection optical system 5 and the period of the interference fringes L2, the image processor 7 selects, from among the detectors 6a, the detector 6a the position of which matches the partial distribution Q2b including one peak of the intensity distribution of the interference fringes L2. For example, on the basis of the stored information about the peak positions, the image processor 7 selects, from among the detectors 6a, the detector 6a that is disposed to be the closest to the peak position X2b (for example, the detectors 6a disposed at the position X1d). The image processor 7 uses a detection result of the selected detector 6a as a detection result related to the distribution Q2b.

As the detection result related to the partial distribution Q2b including one peak of the intensity distribution of the interference fringes L2, the image processor 7 may use only a detection result of one detector 6a disposed at the position X1d, or may use detection results of the detector 6a disposed at the position X1d and at least one detector 6a around the former detector 6a. Regarding the effective PSF ($PSF_{eff}$) corresponding to the distribution Q1d, distortion of the shape of the effective PSF is suppressed when the peak position X2b of the distribution Q2b matches the position X1d of the detector 6a.

As a detection result corresponding to the peak position X2c in the graph on the right side of FIG. 5B, for example, the image processor 7 uses a detection result of the detector 6a disposed at the position X1e corresponding to the peak position X2c. On the basis of the magnification of the detection optical system 5 and the period of the interference fringes L2, the image processor 7 selects, from among the detectors 6a, the detector 6a the position of which matches the partial distribution Q2c including one peak of the intensity distribution of the interference fringes L2. For example, on the basis of the stored information about the peak positions, the image processor 7 selects, from among the detectors 6a, the detector 6a that is disposed to be the closest to the peak position X2c (for example, the detector 6a disposed at the position X1e). The image processor 7 uses a detection result of the selected detector 6a as a detection result related to the distribution Q2c.

As the detection result related to the partial distribution Q2c including one peak of the intensity distribution of the interference fringes L2, the image processor 7 may use only a detection result of one detector 6a disposed at the position X1e, or may use detection results of the detector 6a disposed at the position X1e and at least one detector 6a around the former detector 6a. Regarding the distribution Q1e ($PSF_{eff}$), distortion of the shape of the effective PSF is suppressed when the peak position X2c of the distribution Q2c matches the position X1e of the detector 6a.

The image processor 7 corrects the positional deviation of the image for each detector (the positional deviation of the peak position of the effective $PSF_{eff}$ or the main lobe) in the detection result of the detector 6a that is selected as described above. The positional deviation of the image for each detector can be acquired on the basis of theoretical calculation using various design values or a taken image of small objects such as fluorescent beads photographed by the detection device 6. By correcting the positional deviation in this way, effective PSFs of images obtained by the respective selected detectors 6a can be caused to be substantially the same. The $PSF_{eff}$ of the image that is obtained as described above can be assumed to be approximately equivalent to the $PSF_{eff}$ of the detector at the center position of the detection device 6 (the detector positioned on the optical axis). The $PSF_{eff}$ of the detector at the center position (r=(0, 0)) of the detection device 6 is represented by the following expression (6).

$$PSF_{eff}(r = 0, r_s) = PSF_{det}(r_s)PSF_{ill}(r_s)\frac{1+\cos 2\pi k_0 \cdot r_s}{2} \quad \text{Expression (6)}$$

Focusing on the periodic direction of the interference fringes L2, that is, the $k_0$-direction, it can be found that a full width at half maximum of the $PSF_{eff}$ becomes narrower and resolving power is improved as the period of the interference fringes L2 is smaller on the basis of the expression (6). That is, as the number of fringes (bright parts) included in the periodic direction of the interference fringes L2 according to the embodiment is increased, the full width at half maximum of the $PSF_{eff}$ is reduced and resolving power is improved. The full width at half maximum of a conventional fluorescence microscope is given as $0.51\lambda_{em}$/NA. The full width at half maximum of the $PSF_{eff}$ according to the embodiment is $0.3\lambda_{ex}$/NA in a case in which σ=0.3, for example, and the full width at half maximum of the PSF is 1.7 times narrower and resolving power is improved as compared with the conventional fluorescence microscope. The number of bright parts included in the periodic direction of the interference fringes L2 according to the embodiment is 5 in a case in which σ=0.3, for example. The full width at half maximum of the $PSF_{eff}$ according to the embodiment is $0.34\lambda_{ex}$/NA in a case in which σ=0.4, for example, and the full width at half maximum of the PSF is 1.5 times narrower and resolving power is improved as compared with the conventional fluorescence microscope. The number of bright parts included in the periodic direction of the interference fringes L2 according to the embodiment is 3 in a case in which σ=0.4, for example. In a case of sufficiently reducing an aperture of a pinhole of a conventional confocal microscope, it is known that the full width at half maximum of the PSF becomes 1.4 times narrower and resolving power is improved as compared with the conventional fluorescence microscope. To hold superiority in an effect of improving the resolving power, the full width at half maximum of the PSF of the confocal microscope is preferably 1.5 times or more narrower as compared with the conventional fluorescence microscope. That is, the number of bright parts included in the periodic direction of the interference fringes L2 according to the embodiment is preferably equal to or larger than 3. The same applies to the other embodiments.

The image processor 7 generates an image by adding up images the $PSF_{eff}$ of which becomes substantially the same. The image processor 7 can generate an image $I_{SR}(r_s)$ having favorable resolving power and a favorable S/N ratio when the images that are added up have substantially the same $PSF_{eff}$. By widening a range of the detector 6a used for generating the image $I_{SR}(r_s)$, a signal amount can be increased. By narrowing the range of the detector 6a used for generating the image $I_{SR}(r_s)$, a sectioning capacity can be enhanced.

By performing Fourier transformation on the expression (6) described above, an effective OTF can be obtained.

$k_{cut}^{conv}$ as a cutoff frequency of the conventional fluorescence microscope is given as $k_{cut}^{conv}=2NA/\lambda$. In the microscope according to the embodiment, the OTF is expanded in the direction of the interference fringes L2, and the microscope has a cutoff frequency up to $2 k_{cut}^{conv}$. For simplifying the description, the excitation wavelength and the fluorescence wavelength are equally assumed to be A herein. The OTF according to the embodiment is obtained by combining the OTF of the conventional fluorescence microscope with a component that is the OTF of the conventional fluorescence microscope shifted in the periodic direction of the interference fringes L2.

As described above with reference to the expression (6), with the microscope 1 according to the embodiment, the resolving power in the periodic direction of the interference fringes L2 (in FIG. 1, the X-direction) is improved. The microscope 1 can also two-dimensionally improve the resolving power by changing the periodic direction of the interference fringes L2 and detecting fluorescence from the sample S. The following describes an example of changing the periodic direction of the interference fringes L2 by 90°. To change the periodic direction of the interference fringes L2 by 90°, the mask 15 and the polarizer 14 in the state of FIGS. 2A to 2C are rotated about the Za-direction by 90°.

A super resolution image in a case in which the periodic direction of the interference fringes L2 is the X-direction is assumed to be $I_{SRx}(r_s)$, and a super resolution image in a case in which the periodic direction of the interference fringes L2 is the Y-direction is assumed to be $I_{SRy}(r_s)$. The image processor 7 may generate the super resolution image the resolving power of which is two-dimensionally improved by adding up $I_{SRx}(r_s)$ and $I_{SRy}(r_s)$. The image processor 7 may also generate the super resolution image by performing the following processing.

The image processor 7 performs Fourier transformation on each of the super resolution image $I_{SRx}(r_s)$ and the super resolution image $I_{SRy}(r_s)$. The super resolution image $I_{SRx}(r_s)$ subjected to the Fourier transformation is represented as $I\sim_{SRx}(k_s)$. Herein, "~" is a tilde in numerical expressions. The super resolution image $I_{SRy}(r_s)$ subjected to the Fourier transformation is represented as $I\sim_{SRy}(k_s)$. The cutoff frequency of $I\sim_{SR\_x}(k_s)$ is increased in the periodic direction (X-direction) of the interference fringes as compared with the conventional fluorescence microscope. The cutoff frequency of $I\sim_{SRy}(k_s)$ is increased in the periodic direction (Y-direction) of the interference fringes as compared with the conventional fluorescence microscope. The image processor 7 adds up $I\sim_{SRx}(k_s)$ and $I\sim_{SRy}(k_s)$. Due to this, the cutoff frequency is increased in two directions (the X-direction and the Y-direction).

The shape of the added effective OTF may be distorted depending on a combination of directions in which the periodic direction of the interference fringes L2 is changed. In this case, the image processor 7 may apply a frequency filter to correct the shape of the effective OTF. Due to this, the resolving power can be improved more effectively than the case of adding up $I_{SRx}(r_s)$ and $I_{SRy}(r_s)$. As described above with reference to FIGS. 3A to 3C, the illumination optical system 4 may change the periodic direction of the interference fringes L2 into three patterns including 0°, 120°, and 240°, and the detection device 6 may detect the fluorescence L3 for each of the three patterns of periodic directions. The image processor 7 may generate the super resolution image for three patterns of periodic directions using three detection results (for example, three images) detected by the detection device 6.

Figure 6:
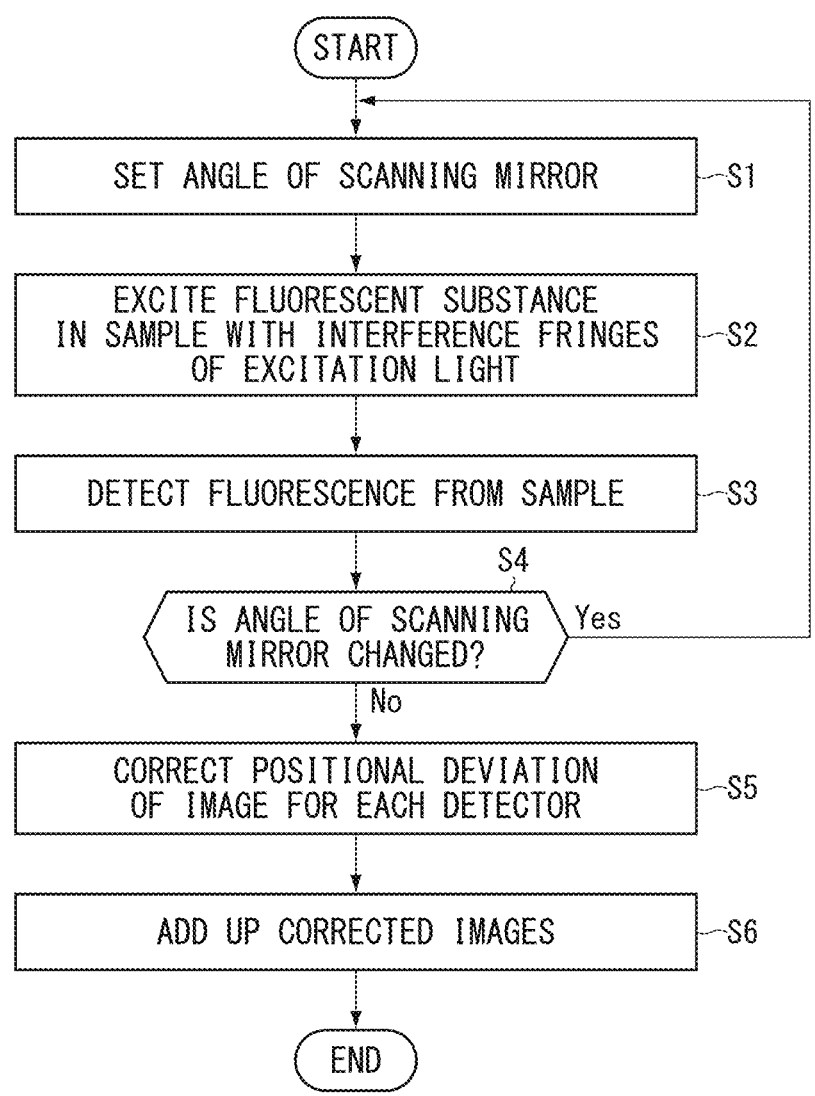
FIG. 6 is a flowchart illustrating an observation method according to the first embodiment.

Next, the following describes an observation method according to the embodiment on the basis of the configuration of the microscope 1 described above. FIG. 6 is a flowchart illustrating the observation method according to the embodiment. Regarding the respective parts of the microscope 1, refer to FIG. 1 or FIG. 4 as appropriate. In Step S1, the illumination optical system 4 in FIG. 1 sets an angle of a scanning mirror. The illumination optical system 4 irradiates a position on the sample that is defined on the basis of the angle of the scanning mirror set in Step S1 with excitation light as the interference fringes. In Step S2, a fluorescent substance of the sample is excited by the interference fringes of the excitation light. In Step S3, the detection device 6 in FIG. 4 detects the fluorescence L3 from the sample S via the detection optical system 5.

In Step S4, the microscope 1 (for example, a controller) determines whether to change the angle of the scanning mirror. If it is determined that the processing from Step S1 to Step S3 is not ended for part of planned observation regions, the microscope 1 determines to change the angle of the scanning mirror in Step S4 (Yes in Step S4). If it is determined to change the angle of the scanning mirror (Yes in Step S4), the microscope 1 returns the process to the processing in Step S1, and the illumination optical system 4 sets the angle of the scanning mirror to be the next planned angle. The processing from Step S2 to Step S4 is then repeated. In this way, the illumination optical system 4 two-dimensionally scans the sample S with the interference fringes of the excitation light L1.

In Step S4, if it is determined that the processing from Step S1 to Step S3 is ended for all of the planned observation regions, the microscope 1 determines not to change the angle of the scanning mirror (No in Step S4). If the microscope 1 determines not to change the angle of the scanning mirror (No in Step S4), the image processor 7 corrects the positional deviation of the image for each detector in Step S5. The image processor 7 corrects data obtained from at least one of the detectors on the basis of the position of the detector. For example, the image processor 7 corrects data obtained from the detector that is selected from among the detectors on the basis of the position of the detector. For example, the image processor corrects data obtained from a first detector in the detectors (for example, the detector disposed at the position X1d in FIG. 5B) on the basis of the position of the first detector (for example, X1d). The image processor 7 generates an image using detection results of two or more detectors. For example, in Step S6, the image processor 7 generates an image (for example, a super resolution image) by adding up the images corrected in Step S5.

The positions of the detectors 6a of the detection device 6 may be set on the basis of the period of the interference fringes L2 to be matched with the peak (or maximum, bright point) position of the interference fringes L2. The detection device 6 may be set in advance so that an interval between the detectors 6a matches the fringe interval of the interference fringes L2. The interval between the detectors 6a described above is an interval between the center of one detector 6a and the center of the detector 6a adjacent thereto. The fringe interval of the interference fringes L2 described above is an interval between a center line of one bright part and a center line of a bright part adjacent thereto in the interference fringes L2. In this case, assuming that a wave number of the interference fringes L2 is $k_0$, the fringe interval of the interference fringes L2 is $1/k_0$. In a case in which the fringe interval of the interference fringes is $1/k_0$, the interval between the detectors 6a of the detection device 6 is set to be substantially the same as P represented by the following expression (7).

$$P = \frac{1}{k_0}$$
$$= \frac{1}{2(1-\sigma)k_{NA}^{ex}}$$
$$= \frac{\lambda_{ex}}{2(1-\sigma)NA}$$

Expression (7)

In the expression (7) described above, the magnification of the detection optical system 5 including the objective lens 21 is assumed to be 1. In a case in which the magnification of the detection optical system 5 is $M_{det}$, the interval between the detectors 6a may be changed corresponding to the magnification to cause the interval between the detectors 6a to be $M_{det}$/k0. Alternatively, the interval between the detectors 6a can be caused to match the period of the interference fringes L2 by causing part of the detection optical system 5 to be a zoom lens. In this case, it is preferable to cause the lens 23 that can change only the magnification of the detection optical system 5 to be a zoom lens. The period of the interference fringes L2 may be adjusted to match the interval between the detectors 6a of the detection device 6. For example, the period of the interference fringes L2 can be changed by changing an interval between the openings 15a and 15b of the mask 15.

In the present embodiment, the microscope 1 two-dimensionally scans the interference fringes L2 by scanning the interference fringes L2 in two directions that are parallel with the sample plane Sa. The microscope 1 according to the embodiment may three-dimensionally scan the interference fringes L2 by scanning the interference fringes L2 in two directions parallel with the sample plane Sa and in one direction perpendicular to the sample plane Sa. In a case of three-dimensionally scanning the interference fringes L2, processing of scanning the interference fringes L2 in two directions parallel with the sample plane Sa (hereinafter, referred to as two-dimensional processing) is the same as the processing described in the embodiment described above. By repeating the two-dimensional processing while changing the position in the Z-direction, for example, the microscope 1 can generate a three-dimensional super resolution image. Also in embodiments described later, the microscope 1 may similarly three-dimensionally scan the interference fringes L2.

Second Embodiment

The following describes a second embodiment. In the present embodiment, a configuration similar to that in the embodiment described above is denoted by the same reference numeral, and description thereof is omitted or simplified as appropriate. In the present embodiment, the image processor 7 (refer to FIG. 4) performs filtering on data in the frequency space to generate an image. The image processor 7 performs deconvolution on the data obtained from the detection device 6 to generate the image. As the filtering described above, the image processor 7 performs deconvolution and apodization for each detector 6a of the detection device 6 to generate the image. That is, the image processor 7 performs filtering including deconvolution on the data in the frequency space. In the following description, a series of processing including deconvolution and apodization may be collectively referred to as deconvolution as appropriate.

FIGS. 7A and 7B are diagrams illustrating processing performed by the image processor of the microscope according to the second embodiment. Regarding the respective parts of the microscope, refer to FIG. 1 or FIG. 4 as appropriate. FIG. 7A illustrates the PSF before deconvolution, which is the same as that in FIG. 5A. In FIG. 7A, the interval between the detectors 6a of the detection device 6 (refer to FIG. 4) does not match the interval of the interference fringes L2. In this case, as described above with reference to the expression (5), the shape of the effective PSF (solid line) of the image obtained for each detector 6a may be distorted depending on the position of the detector 6a. The effective PSF for each detector 6a can be acquired (estimated) by performing theoretical calculation on the basis of the design value or imaging small objects such as fluorescent beads. By using the effective PSF that is acquired as described above, the image processor 7 performs deconvolution to correct distortion of the shape of the effective PSF of the image that is obtained for each detector 6a and the positional deviation thereof.

FIG. 7B illustrates the PSF after deconvolution. In the graph at the center of FIG. 7B, the reference numeral Q4a corresponds to the effective PSF that is obtained by performing deconvolution on the distribution Q1a represented by the graph at the center of FIG. 7A, that is, the effective PSF of the detector 6a disposed at the position X1a. In this case, the deviation amount between the position X1a of the detector 6a and the peak position X2a of the distribution Q2a is smaller than a predetermined value, and the distribution Q4a corresponding to the effective PSF after deconvolution is substantially the same as the distribution Q1a corresponding to the effective PSF before deconvolution.

In the graph on the left side of FIG. 7B, the reference numeral Q4b corresponds to the effective PSF that is obtained by performing deconvolution on the distribution Q1b represented by the graph on the left side of FIG. 7A, that is, the effective PSF of the detector 6a disposed at the position X1b. In the graph on the right side of FIG. 7B, the reference numeral Q4c corresponds to the effective PSF that is obtained by performing deconvolution on the distribution Q1c represented by the graph on the right side of FIG. 7A, that is, the effective PSF of the detector 6a disposed at the position X1c. Through such a series of processing (deconvolution), as represented by the three graphs of FIG. 7B, the effective PSFs of the respective detectors 6a become substantially the same. The image processor 7 generates an image using a result of deconvolution. The following describes processing performed by the image processor 7 in more detail.

The image processor 7 converts at least some of the detection results of the detectors 6a into data in the frequency space, and generates an image (for example, a super resolution image) using a conversion result thereof. In the following description, the data representing at least some of the detection results of the detectors 6a in the frequency space is referred to as a component of the frequency space as appropriate. The image processor 7 performs Fourier transformation on at least some of the detection results of the detectors 6a, and generates the image using the component of the frequency space obtained through the Fourier transformation. By performing Fourier transformation on $r_s$ in the expression (4) described above, the following expression (8) is obtained.

$$\tilde{I}(r,k_s) = OTF_{eff}(r,k_s)\widetilde{Ob}_j(k_s)$$

Expression (8)

In the expression (4), I~(r, $k_s$) on the left side is obtained by performing Fourier transformation on $r_s$ of I(r, $r_s$). $OTF_{eff}$(r, $k_s$) on the right side is obtained by performing Fourier transformation on $r_s$ of $PSF_{eff}$(r, $r_s$), and represents the effective OTF for each detector 6a of the detection device 6. Obj~($k_s$) on the right side is obtained by performing Fourier transformation on $r_s$ of Obj($r_s$).

There are known various methods of deconvolution such as a Wiener filter and a Richardson-Lucy method. By way of example, the following describes processing using the Wiener filter, but the image processor 7 may perform deconvolution through other processing. Deconvolution for each detector using the Wiener filter is represented by the following expression (9).

$$\widetilde{Obj}(r, k_s) = \frac{OTF_{eff}^*(r, k_s)\tilde{I}(r, k_s)}{|OTF_{eff}(r, k_s)|^2 + w^2} \qquad \text{Expression (9)}$$

In the expression (9), Obj~(r, $k_s$) is distribution of the fluorescent substance estimated for each detector 6a of the detection device 6 (hereinafter, referred to as estimated fluorescent substance distribution). w is a Wiener parameter for suppressing noise. Through this processing, the estimated fluorescent substance distribution Obj~(r, $k_s$) becomes substantially common to two or more detectors 6a of the detection device 6. That is, through the processing described above, distortion of the shape of the effective PSF for each detector 6a and the positional deviation thereof are corrected, and the effective PSFs of the respective detectors 6a become substantially the same. The image processor 7 performs apodization on Obj~(r, $k_s$) through processing represented by the following expression (10) and adds up spectrums of the detectors 6a of the detection device 6 to generate the super resolution image $I_{SR}(r_s)$.

$$I_{SR}(r_s) = \mathcal{F}_{k_s}^{-1}\left[\sum_r \widetilde{Obj}(r, k_s)A(k_s)\right] \qquad \text{Expression (10)}$$

In the expression (10), A($k_s$) is an apodization function for suppressing a negative value of the image, and multiplying Obj~(r, $k_s$) by A($k_s$) is called apodization. A function form of A($k_s$) is designed to suppress a negative value of the image by theoretical calculation, simulation, or the like. $F_{ks}^{-1}$ is inverse Fourier transformation of $k_s$. The image processor 7 performs inverse Fourier transformation after adding up the spectrums of the respective detectors 6a but may add up the images after performing inverse Fourier transformation. In the processing of the expression (9) and the expression (10), the image processor 7 adds up the images of the respective detectors 6a after independently performing deconvolution for each detector 6a. The image processor 7 may collectively perform deconvolution on two or more detectors 6a as represented by the following expression (11).

$$I(r_s) = \mathcal{F}_{k_s}^{-1}\left[\frac{\sum_r OTF_{eff}^*(r, k_s)\tilde{I}(r, k_s)}{\sum_r |OTF_{eff}(r, k_s)|^2 + w^2}A(k_s)\right] \qquad \text{Expression (11)}$$

Figure 8:
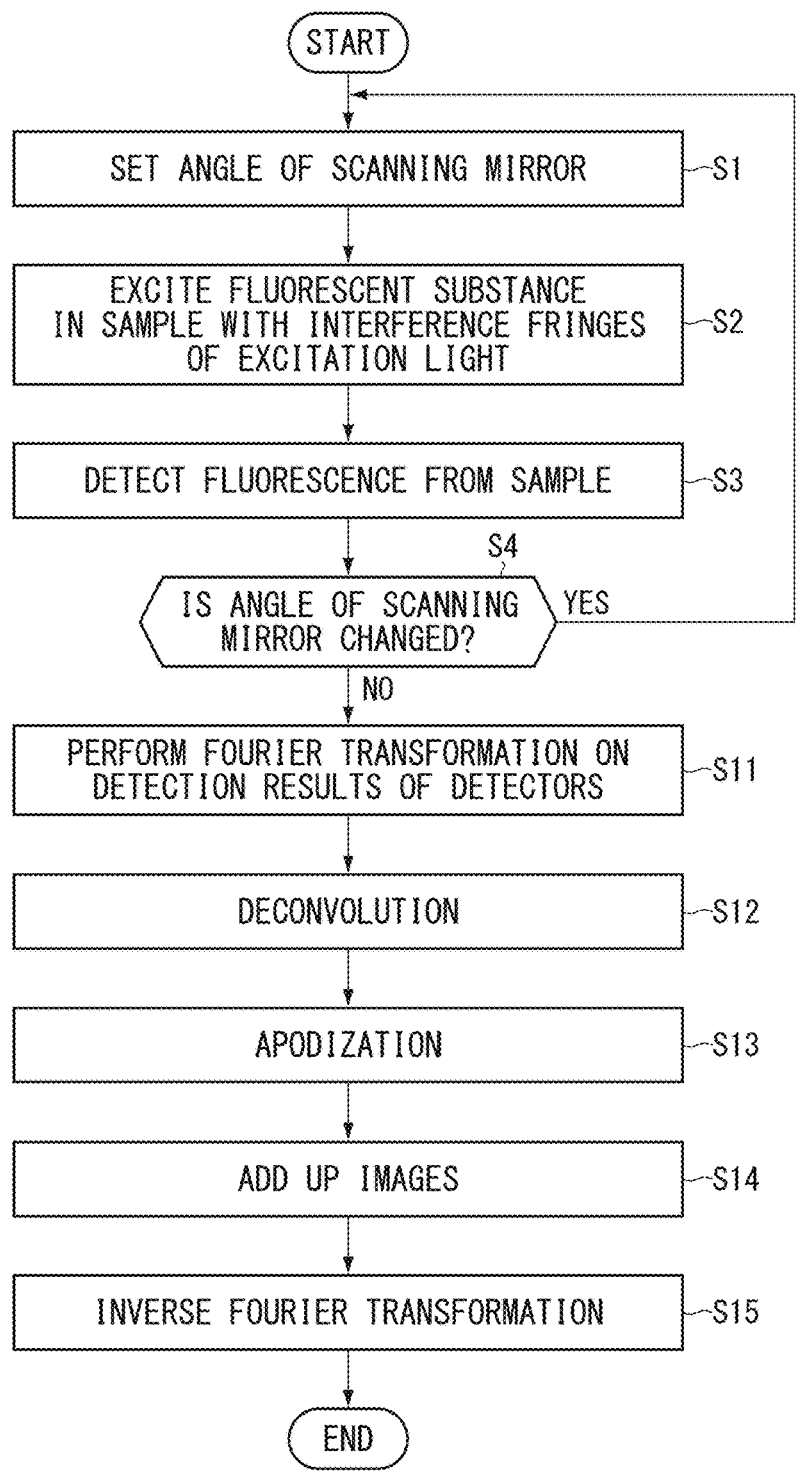
FIG. 8 is a flowchart illustrating an observation method according to the second embodiment.

FIG. 8 is a flowchart illustrating the observation method according to the second embodiment. The processing from Step S1 to Step S4 is the same as that in FIG. 6, so that description thereof is omitted. In Step S11, the image processor 7 performs Fourier transformation on the detection result of each detector. In Step S12, the image processor 7 performs deconvolution. In Step S13, the image processor 7 performs apodization. Apodization may be processing as part of deconvolution. In Step S14, the image processor 7 adds up the images of the respective detectors 6a using a result of deconvolution. In Step S15, the image processor 7 performs inverse Fourier transformation on a first image (for example, a Fourier image) obtained in Step S14 to generate a second image (for example, a super resolution image).

As described above in the first embodiment, the image processor 7 may change the range of the detectors 6a to be added up. The image processor 7 may also one-dimensionally or two-dimensionally improve the resolving power as described above in the first embodiment.

Third Embodiment

The following describes a third embodiment. In the present embodiment, a configuration similar to that in the embodiments described above is denoted by the same reference numeral, and description thereof is omitted or simplified as appropriate. FIGS. 9A and 9B are diagrams illustrating processing performed by the image processor of the microscope according to the third embodiment. Regarding the respective parts of the microscope, refer to FIG. 1 or FIG. 4 as appropriate.

In the present embodiment, the image processor 7 (refer to FIG. 4) corrects distortion of the shape of the effective PSF for each detector 6a through image processing different from that in the second embodiment. FIG. 9A illustrates the PSF before the image processing according to the present embodiment, which is the same as that in FIG. 5A. In FIG. 9A, the interval between the detectors 6a of the detection device 6 (refer to FIG. 4) does not match the interval of the interference fringes L2. In this case, as described above with reference to the expression (5), the shape of the effective PSF (solid line) of the image obtained for each detector 6a may be distorted depending on the position of the detector 6a. The image processor 7 effectively shifts a phase of intensity distribution of the interference fringes L2 through image processing so that the peak position of partial distribution of intensity distribution of the interference fringes L2 (for example, Q2b represented by the graph on the left side of FIG. 9A) matches the position of the detector 6a.

FIG. 9B illustrates the effective PSF for each detector 6a after the phase is shifted. In the graph on the left side of FIG. 9B, distribution Q2f is distribution obtained by shifting the phase of distribution Q2 so that the peak position X2b of the distribution Q2b in FIG. 9A matches the position X1b of the detector 6a. A peak position X2f of the distribution Q2f substantially matches the position X1b of the detector 6a. The reference numeral Q1f denotes distribution corresponding to the effective PSF that is obtained on the basis of the distribution Q2f the phase of which is shifted and the detection PSF (distribution Q3b) of the detector 6a disposed at the position X1b. Distortion of the shape of the effective PSF is reduced for the distribution Q1f.

In the graph on the right side of FIG. 9B, distribution Q2g is distribution obtained by shifting the phase of the distribution Q2 so that the peak position X2c of the distribution Q2c in FIG. 9A matches the position X1c of the detector 6a. A peak position X2g of the distribution Q2g substantially matches the position X1c of the detector 6a. The reference numeral Q1g denotes distribution corresponding to the effective PSF that is obtained on the basis of the distribution Q2g the phase of which is shifted and the detection PSF (distribution Q3c) of the detector 6a disposed at the position X1c. Distortion of the shape of the effective PSF is reduced for the distribution Q1g.

Through the image processing as described above, the shapes of the effective PSFs (solid line) of the respective detectors 6a are corrected to be substantially the same. The image processor 7 generates an image using the images of the respective detectors 6a having the effective PSFs the shapes of which are corrected to be substantially the same.

The following describes a processing procedure performed by the image processor 7 in more detail. The image I(r, $r_s$) obtained by the detection device 6 is represented by the expression (3) described above. By substituting ill(r) represented by the expression (2) described above for the expression (3), the following expression (12) is obtained.

$$I(r, r_s) = \left\{PSF_{det}(r+r_s)PSF_{ill}(r_s)\frac{1+\cos(2\pi k_0 \cdot r_s + \phi)}{2}\right\} \overset{r_s}{*} Obj(r_s) \quad \text{Expression (12)}$$

In the expression (12), $\phi$ indicates an initial phase of the interference fringes L2. The image processor 7 changes the phase of the interference fringes L2 depending on the detector coordinates through image processing and adjusts the shapes of the effective PSFs. As described above with reference to the expression (3), the microscope 1 acquires four-dimensional image data I(r, $r_s$). The image processor 7 performs four-dimensional Fourier transformation on I(r, $r_s$). Four-dimensional data in the frequency space obtained through the Fourier transformation is represented as I~(k, $k_s$). The image processor 7 extracts information of a region satisfying any of conditions of the following expressions (13) to (15) from I~(k, $k_s$). In the following description, a region satisfying the condition of the expression (13) is referred to as a region AR1a of a 0th-order component, a region satisfying the condition of the expression (14) is referred to as a region AR1b of a +1st-order component, and a region satisfying the condition of the expression (15) is referred to as a region AR1c of a –1st-order component. Data of the region AR1a of the 0th-order component is represented as $I_0$~(k, $k_s$), data of the region AR1b of the +1st-order component is represented as $I_{+1}$~(k, $k_s$), and data of the region AR1c of the –1st-order component is represented as (k, $k_s$). Each of $I_0$~(k, $k_s$), $I_{+1}$~(k, $k_s$), and $I_{-1}$~(k, $k_s$) is data in the frequency space obtained through Fourier transformation. Processing of separating $I_0$~(k, $k_s$), $I_{+1}$~(k, $k_s$), and $I_{-1}$~(k, $k_s$) from I~(k, $k_s$) is referred to as component separation as appropriate.

$$|k-k_s| \leq 2\sigma k_{NA}^{ex} \text{ and } |k| \leq 2k_{NA}^{em} \quad \text{Expression (13)}$$

$$|k-k_s-k_0| \leq 2\sigma k_{NA}^{ex} \text{ and } |k| \leq 2k_{NA}^{em} \quad \text{Expression (14)}$$

$$|k-k_s+k_0| \leq 2\sigma k_{NA}^{ex} \text{ and } |k| \leq 2k_{NA}^{em} \quad \text{Expression (15)}$$

Figure 10A:
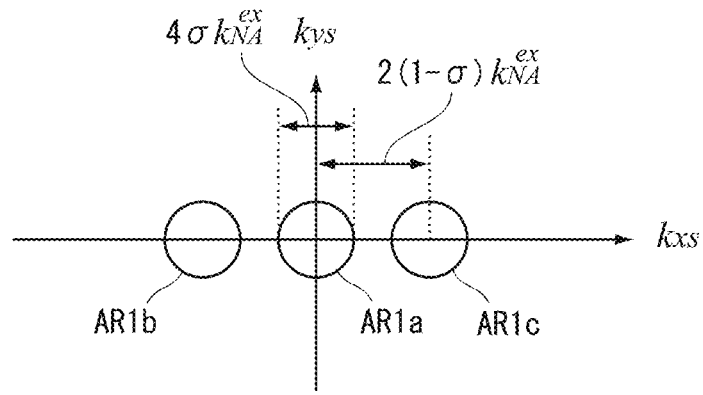
FIGS. 10A and 10B are diagrams illustrating a region of a frequency space used for component separation according to the third embodiment.
Figure 10B:
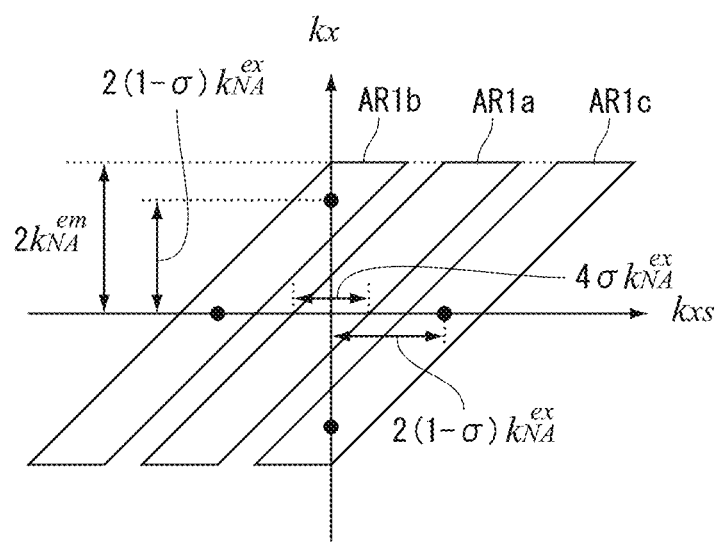

FIGS. 10A and 10B are diagrams illustrating a region of the frequency space used for component separation according to the third embodiment. Herein, the following describes a case in which each of the opening 15a and the opening 15b of the mask 15 (refer to FIGS. 2A to 2C) has a circular shape. The opening of the mask 15 may have any shape other than the circular shape. Ranges of the region AR1a of the 0th-order component, the region AR1b of the +1st-order component, and the region AR1c of the –1st-order component can be obtained by numerical simulation, theoretical calculation, and the like in both of a case in which the opening of the mask 15 has a circular shape and a case in which the opening of the mask 15 has a shape other than a circular shape.

FIG. 10A illustrates the respective regions on a $k_{xs}$-$k_{ys}$ plane. Each of the region AR1a of the 0th-order component, the region AR1b of the +1st-order component, and the region AR1c of the –1st-order component is a circular region. Diameters of the region AR1a of the 0th-order component, the region AR1b of the +1st-order component, and the region AR1c of the –1st-order component are the same. The diameter of the region AR1a of the 0th-order component is $4\sigma k_{NA}^{ex}$. The region AR1a of the 0th-order component is a region centered on an origin. Each of the region AR1b of the +1st-order component and the region AR1c of the –1st-order component is a region the center of which is disposed on an axis of $k_{xs}$. A distance A between the center of the region AR1c of the –1st-order component and the origin is $2(1-\sigma)k_{BA}^{ex}$. The region AR1b of the +1st-order component is a region at a position symmetrical to the region AR1c of the –1st-order component with respect to the region AR1a of the 0th-order component.

FIG. 10B illustrates the respective regions on a $k_{xs}$-kx plane. Each of the region AR1a of the 0th-order component, the region AR1b of the +1st-order component, and the region AR1c of the –1st-order component is a parallelogram region.

The image processor 7 sets the region of the frequency space for component separation on the basis of light intensity distribution of the excitation light on the sample S. For example, the image processor 7 sets a plurality of regions that do not overlap each other on the basis of the electric field intensity ill(r) of the excitation light on the sample plane Sa as the light intensity distribution of the excitation light on the sample S. The regions described above include three or more regions that do not overlap each other. For example, the regions described above include the region AR1a in FIGS. 10A and 10B as a first region, the region AR1b in FIGS. 10A and 10B as a second region, and the region AR1c in FIGS. 10A and 10B as a third region. The image processor 7 performs component separation by extracting each of data belonging to the first region (region AR1a), data belonging to the second region (region AR1b), and data belonging to the third region (region AR1c) from the data in the frequency space.

The image processor 7 calculates image data in a real space by performing four-dimensional inverse Fourier transformation on each of $I_0$~(k, $k_s$), $I_{+1}$~(k, $k_s$), and $I_{-1}$~(k, $k_s$). In the following description, image data obtained by performing inverse Fourier transformation on $I_0$~(k, $k_s$) is represented as $I_0$(r, $r_s$). Image data obtained by performing inverse Fourier transformation on $I_{+1}$~(k, $k_s$) is represented as $I_{+1}$(r, $r_s$). Image data obtained by performing inverse Fourier transformation on $I_{-1}$~(k, $k_s$) is represented as $I_{-1}$(r, $r_s$). The image processor 7 performs an arithmetic operation represented by the following expression (16) on each of $I_0$(r, $r_s$), $I_{+1}$(r, $r_s$), and $I_{-1}$(r, $r_s$).

$$\begin{cases} I'_0(r, r_s) = I_0(r, r_s) \\ I'_{+1}(r, r_s) = I_{+1}(r, r_s)e^{i\psi(r)} \\ I'_{-1}(r, r_s) = I_{-1}(r, r_s)e^{-i\psi(r)} \end{cases} \quad \text{Expression (16)}$$

In the expression (16), ψ(r) represents a phase shift amount for each position r of the detector 6a of the detection device 6. The image processor 7 calculates a sum of arithmetic results of the three expressions in the expression (16) described above as represented by the following expression (17).

$$I'(r,r_s) = I'_0(r,r_s) + I'_{+1}(r,r_s) + I'_{-1}(r,r_s) \quad \text{Expression (17)}$$

I'(r, $r_s$) obtained by the arithmetic operation of the expression (17) described above is an image in which distortion of the shape of the effective PSF for each position r of the detector 6a is corrected and the shapes of the effective PSFs are substantially the same. The image processor 7 corrects the positional deviation of the effective PSF for each detector 6a of the detection device 6 for I'(r, $r_s$). Due to this, the effective PSFs of two or more detectors 6a of the detection device 6 can be caused to be substantially the same. The image processor 7 generates an image by adding up the images of the respective detectors 6a the effective PSFs of which are corrected to be substantially the same.

The following describes a method of determining the region in which component separation is performed, a method of determining the phase shift amount for phase shift processing, a method of correcting the positional deviation of the effective PSF, and a super resolution effect obtained through the present method. By performing four-dimensional Fourier transformation on r and $r_s$ of I(r, $r_s$), I~(k, $k_s$) represented by the following expression (18) is obtained.

$$\tilde{I}(k, k_s) = \mathcal{F}_{r,r_s}[I(r, r_s)] \quad \text{Expression (18)}$$

$$= OTF_{det}(k)\widetilde{ill}(k - k_s)\widetilde{Obj}(k_s)$$

$$= OTF_{det}(k)\left(\frac{1}{2}OTF_{ill}(k - k_s) + \frac{1}{4}e^{i\phi}OTF_{ill}(k - k_s - k_0) + \frac{1}{4}e^{-i\phi}OTF_{ill}(k - k_s + k_0)\right)\widetilde{Obj}(k_s).$$

In the expression (18), $F_{r,r_s}$ represents Fourier transformation of r and $r_s$. $OTF_{det}$ represents Fourier transformation of $PSF_{det}$ and represents the OTF of the detection optical system 5. ill~ represents Fourier transformation of ill, $OTF_{ill}$~ represents Fourier transformation of $PSF_{ill}$, and Obj~ represents Fourier transformation of Obj. The expression (18) is a sum of three terms as represented by the following expression (19).

$$\tilde{I}(k,k_s) = \tilde{I}_0(k,k_s) + \tilde{I}_{+1}(k,k_s) + \tilde{I}_{-1}(k,k_s) \quad \text{Expression (19)}$$

In this case, $I_0$~(k, $k_s$) of the first term on the right side of the expression (19) is referred to as the 0th-order component, $I_{+1}$~(k, $k_s$) of the second term on the right side is referred to as the +1st-order component, and $I_{-1}$~(k, $k_s$) of the third term on the right side is referred to as the −1st-order component. These are the same as the data $I_0$~(k, $k_s$) of the region AR1a of the 0th-order component, the data $I_{+1}$~(k, $k_s$) of the region AR1b of the +1st-order component, and the data $I_{-1}$~(k, $k_s$) of the region AR1c of the −1st-order component described above. Each of the 0th-order component, the +1st-order component, and the −1st-order component is represented by the following expression (20).

$$\begin{cases} \tilde{I}_0(k, k_s) = \frac{1}{2}OTF_{det}(k)OTF_{ill}(k - k_s)\widetilde{Obj}(k_s) \\ \tilde{I}_{+1}(k, k_s) = \frac{1}{4}e^{i\phi}OTF_{det}(k)OTF_{ill}(k - k_s - k_0)\widetilde{Obj}(k_s) \\ \tilde{I}_{-1}(k, k_s) = \frac{1}{4}e^{-i\phi}OTF_{det}(k)OTF_{ill}(k - k_s + k_0)\widetilde{Obj}(k_s) \end{cases} \quad \text{Expression (20)}$$

The following describes a method of determining a region in which the 0th-order component, the +1st-order component, and the −1st-order component have values. In the expression (20), the cutoff frequency of $OTF_{det}(k)$ is given as $2k_{NA}^{em}$. The cutoff frequency of $OTF_{ill}(k)$ is given as $2\sigma k_{NA}^{ex}$. Thus, $OTF_{det}(k)$ has a value only in a range in which |k| is equal to or smaller than $2k_{NA}^{em}$. Similarly, $OTF_{ill}(k-k_s)$ has a value only in a range in which |k−$k_s$| is equal to or smaller than $2\sigma k_{NA}^{e}$. $OTF_{ill}(k-k_s-k_0)$ has a value only in a range in which |k−$k_s$−$k_0$| is equal to or smaller than $2\sigma k_{NA}^{ex}$. $OTF_{ukk}(k-k_s+k_0)$ has a value only in a range in which |k−$k_s$+$k_0$| is equal to or smaller than $2\sigma k_{NA}^{ex}$. These regions are illustrated in FIGS. 10A and 10B.

Thus, to separate $I_0$~(k, $k_s$), $I_{+1}$~(k, $k_s$), and $I_{-1}$~(k, $k_s$) from I~(k, $k_s$), each value of the regions represented by the respective expressions (13) to (15) may be extracted. Each of the region AR1a of the 0th-order component, the region AR1b of the +1st-order component, and the region AR1c of the −1st-order component may be larger or smaller than the region represented by each of the expressions (13) to (15). Also in a case in which the opening 15a and the opening 15b of the mask 15 have a shape other than a circular shape, the region in which component separation is performed can be determined by calculating a region in which $OTF_{det}$ and $OTF_{ill}$ have values by theoretical calculation, simulation, and the like.

$I_0$~(k, $k_s$), $I_{+1}$~(k, $k_s$), and $I_{-1}$~(k, $k_s$) that are returned to the real space by inverse Fourier transformation are respectively assumed to be $I_0$(r, $r_s$), $I_{+1}$(r, $r_s$), and $I_{-1}$(r, $r_s$). By performing inverse Fourier transformation on k and $k_s$ in the expression (20) described above, the following expression (21) is obtained.

$$\begin{cases} I_0(r, r_s) = \left\{\frac{1}{2}PSF_{det}(r + r_s)PSF_{ill}(r_s)\right\}^{r_s}_{*} Obj(r_s) \\ I_{+1}(r, r_s) = \left\{\frac{1}{4}e^{-i(2\pi k_0 \cdot r_s - \phi)}PSF_{det}(r + r_s)PSF_{ill}(r_s)\right\}^{r_s}_{*} Obj(r_s) \\ I_{-1}(r, r_s) = \left\{\frac{1}{4}e^{i(2\pi k_0 \cdot r_s - \phi)}PSF_{det}(r + r_s)PSF_{ill}(r_s)\right\}^{r_s}_{*} Obj(r_s) \end{cases} \quad \text{Expression (21)}$$

The image processor 7 performs the processing represented by the expression (16) and the expression (17) described above on results of component separation and inverse Fourier transformation. In this way, the phase of the interference fringes L2 is shifted in accordance with the detector coordinates r. The shift amount of the phase of the interference fringes is determined so that a peak position of a function obtained as a product of $PSF_{det}(r+r_s)$ and $PSF_{ill}(r_s)$ and the peak of the interference fringes substantially match each other, for example.

The deviation amount of the phase of the interference fringes is determined as follows, for example. The image processor 7 calculates a positional deviation amount of a signal detected at the detector coordinates r. The image processor 7 calculates the positional deviation amount described above by obtaining the peak position of the function obtained as a product of $PSF_{det}(r+r_s)$ and $PSF_{ill}(r_s)$. In this case, the positional deviation of the effective PSF can be considered to be proportional to the detector coordinates r. A parameter representing a degree of deviation is assumed to be β, and the positional deviation amount is represented as r/β.

A value of β may be calculated from the peak position of the function obtained as a product of $PSF_{det}(r+r_s)$ and $PSF_{ill}(r_s)$ or may be calculated by numerical simulation. When β is determined, the phase shift amount corresponding to the detector coordinates is determined. The phase shift amount ψ(r) of the interference fringes L2 is determined so that the peak position of the function obtained as a product of $PSF_{det}(r+r_s)$ and $PSF_{ill}(r_s)$ matches the peak position of the interference fringes. Through such processing, the phase shift amount is represented as $\psi(r) = -2\pi k_0 \cdot r/\beta - \phi$, for example. A value of an initial phase φ may be a value that is measured in advance by using fluorescent beads or may be a value estimated from an observation image. The image processor 7 determines a conversion amount of the phase (phase shift amount) on the basis of the light intensity distribution of the excitation light on the sample S. The image processor 7 determines the phase shift amount on the basis of the electric field intensity ill(r) of the excitation light on the sample plane Sa as the light intensity distribution of the excitation light on the sample S. By using ψ(r) that is set as described above, distortion of the shape of the effective PSF for each position r of the detector 6a is corrected after the processing represented by the expression (16) and the expression (17).

After performing the phase shift processing as described above, the image processor 7 performs processing of correcting the positional deviation of the effective PSF for each detector 6a. When the processing of correcting the positional deviation is performed, the effective PSFs of the images of the respective detectors 6a of the detection device 6 become substantially the same. The image processor 7 generates the super resolution image $I_{SR}(r_s)$ by adding up the images of the respective detectors 6a of the detection device 6. This series of processing is represented by the following expression (22).

$$I_{SR}(r_s) = \int_{-\infty}^{\infty} PH(r) I'\left(r, r_s - \frac{r}{\beta}\right) dr \quad \text{Expression (22)}$$

In the expression (22), PH(r) represents a pinhole function defined by the following expression (23).

$$PH(r) = \begin{cases} 1, & x^2 + y^2 \leq r_{PH}^2 \\ 0, & x^2 + y^2 > r_{PH}^2 \end{cases} \quad \text{Expression (23)}$$

By adjusting a value of $r_{PH}$, a signal amount and a sectioning effect can be adjusted. When $r_{PH}$ is increased, the signal amount is increased. When $r_{PH}$ is reduced, the sectioning capacity is improved. $PSF_{SR}(r_s)$ as the effective PSF of the image obtained by the arithmetic operation of the expression (22) described above is represented by the following expression (24).

$$PSF_{SR}(r_s) = \left\{ \int_{-\infty}^{\infty} PH(r) PSF_{det}\left(\left(1 - \frac{1}{\beta}\right)r + \right. \right. \quad \text{Expression (24)}$$

-continued
$$\left. \left. r_s \right) PSF_{ill}\left(r_s - \frac{r}{\beta}\right) dr \right\} \frac{1 + \cos 2\pi k_0 \cdot r_s}{2}$$

Focusing on the periodic direction of the interference fringes L2, that is, the $k_0$-direction, it can be found that the full width at half maximum of the $PSF_{eff}$ becomes narrower and the resolving power is improved as the period of the interference fringes L2 is smaller on the basis of the expression (24). That is, as the number of fringes (bright parts) included in the periodic direction of the interference fringes L2 according to the embodiment is increased, the full width at half maximum of the $PSF_{eff}$ is reduced and the resolving power is improved. The full width at half maximum of a conventional fluorescence microscope is given as $0.51\lambda_{em}/NA$. The full width at half maximum of the $PSF_{eff}$ according to the embodiment is $0.3\lambda_{ex}/NA$ in a case in which σ=0.3, for example, and the full width at half maximum of the PSF is 1.7 times narrower and the resolving power is improved as compared with the conventional fluorescence microscope. The number of bright parts included in the periodic direction of the interference fringes L2 according to the embodiment is 5 in a case in which σ=0.3, for example. The full width at half maximum of the $PSF_{eff}$ according to the embodiment is $0.34\lambda_{ex}/NA$ in a case in which σ=0.4, for example, and the full width at half maximum of the PSF is 1.5 times narrower and the resolving power is improved as compared with the conventional fluorescence microscope. The number of bright parts included in the periodic direction of the interference fringes L2 according to the embodiment is 3 in a case in which σ=0.4, for example. In a case of sufficiently reducing an aperture of a pinhole of a conventional confocal microscope, it is known that the full width at half maximum of the PSF becomes 1.4 times narrower and the resolving power is improved as compared with the conventional fluorescence microscope. To hold superiority in the effect of improving the resolving power, the full width at half maximum of the PSF of the confocal microscope is preferably 1.5 times or more narrower as compared with the conventional fluorescence microscope. That is, the number of bright parts included in the periodic direction of the interference fringes L2 according to the embodiment is preferably equal to or larger than 3. The same applies to the other embodiments.

In the present embodiment, a scanning interval and the interval between the detectors 6a of the detection device 6 may be set on the basis of the cutoff frequency and Nyquist's theorem. The scanning interval may be set to be equal to or smaller than $\lambda_{ex}/8NA$ in the periodic direction of the interference fringes. The scanning interval may also be set to be equal to or smaller than $\lambda_{ex}/4NA$ in a direction perpendicular to the periodic direction of the interference fringes. The interval between the detectors 6a of the detection device 6 may be set to be equal to or smaller than $\lambda_{em}/4NA$.

Figure 11:
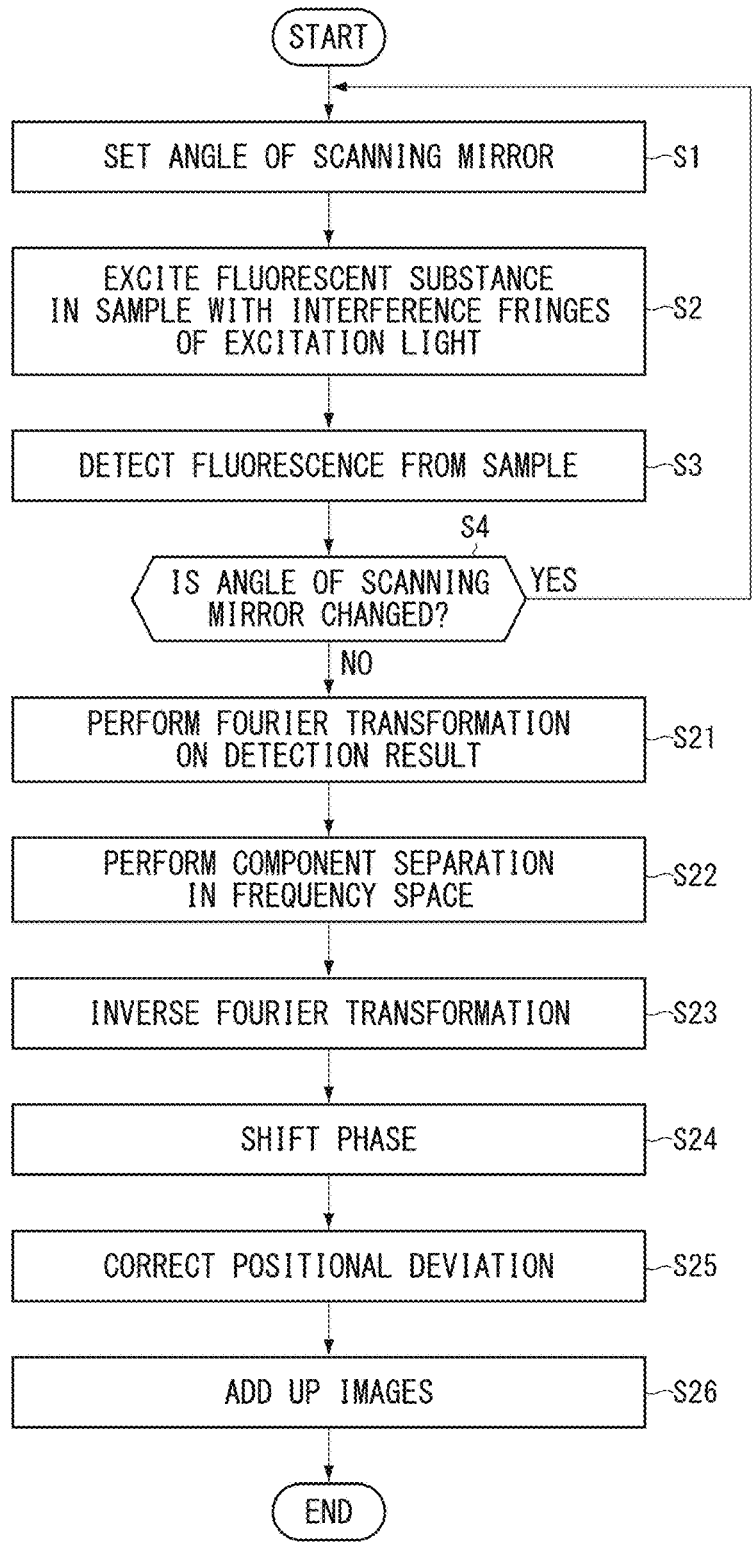
FIG. 11 is a flowchart illustrating an observation method according to the third embodiment.

FIG. 11 is a flowchart illustrating the observation method according to the third embodiment. The processing from Step S1 to Step S4 is the same as that in FIG. 6, so that description thereof is omitted. In Step S21, the image processor 7 performs Fourier transformation on at least some of the detection results of the detectors 6a. In Step S21, the image processor 7 performs four-dimensional Fourier transformation on $I(r, r_s)$. In Step S22, the image processor 7 performs component separation in the frequency space. The image processor 7 separates the component of the frequency space obtained by Fourier transformation for each region of the frequency space. In Step S23, the image processor 7 performs inverse Fourier transformation on the separated component. In Step S24, the image processor 7 performs phase shift processing. In Step S25, the image processor 7 corrects the positional deviation of the effective PSF. In Step S26, the image processor 7 generates an image (for example, a super resolution image) by adding up the images that are obtained by correcting the positional deviation in Step S25.

In this way, the image processor 7 according to the present embodiment generates the image by converting the phase of at least part of the data obtained through the component separation. In the above description, the image processor 7 performs phase shift processing on the data in the real space. That is, the image processor 7 uses, as the data obtained through the component separation, data (data in the real space) that is obtained by converting the data subjected to component separation (data in the frequency space) into the data in the real space by inverse Fourier transformation. The image processor 7 may perform, in the frequency space, phase shift processing on the data in the frequency space subjected to component separation.

Fourth Embodiment

The following describes a fourth embodiment. In the present embodiment, a configuration similar to that in the embodiments described above is denoted by the same reference numeral, and description thereof is omitted or simplified as appropriate. In the present embodiment, the image processor 7 (refer to FIG. 4) performs component separation described in the third embodiment and performs deconvolution on the separated component thereafter to generate an image.

By substituting the expression (20) for the expression (19) described above, the following expression (25) is obtained.

$$\tilde{I}(k, k_s) = \tilde{I}_0(k, k_s) + \tilde{I}_{+1}(k, k_s) + \tilde{I}_{-1}(k, k_s)$$

$$= (OTF_0(k, k_s) + OTF_{+1}(k, k_s) + OTF_{-1}(k, k_s))\tilde{Obj}(k_s)$$

Expression (25)

In the expression (25), $OTF_0(k, k_s)$, $OTF_{+1}(k, k_s)$, and $OTF_{-1}(k, k_s)$ are represented by the following expression (26).

$$\begin{cases} OTF_0(k, k_s) = c_0 OTF_{det}(k) OTF_{ill}(k - k_s) \\ OTF_{+1}(k, k_s) = c_{+1} OTF_{det}(k) OTF_{ill}(k - k_s - k_0) \\ OTF_{-1}(k, k_s) = c_{-1} OTF_{det}(k) OTF_{ill}(k - k_s + k_0) \\ c_0 = \frac{1}{2}, c_{+1} = \frac{1}{4}e^{i\phi}, c_{-1} = \frac{1}{4}e^{-i\phi} \end{cases}$$

Expression (26)

The image processor 7 performs deconvolution using an estimated value of each of $OTF_0(k, k_s)$, $OTF_{+1}(k, k_s)$, and $OTF_{-1}(k, k_s)$. There are known various methods of deconvolution such as a Wiener filter and a Richardson-Lucy method. The following describes processing using the Wiener filter as an example of deconvolution, but any other method can be used for deconvolution. Deconvolution for the expression (25) described above using the Wiener filter is represented by the following expression (27).

$$\begin{cases} \tilde{Obj}(k_s) = \frac{\sum_{i=0,\pm1} \sum_k OTF_i^*(k, k_s)\tilde{I}_i(k, k_s)}{\sum_{i=0,\pm1} \sum_k |OTF_i(k, k_s)|^2 + w^2} \\ I_{SR}(r_s) = \mathcal{F}_{k_s}^{-1}[\tilde{Obj}(k_s)A(k_s)] \end{cases}$$

Expression (27)

In the expression (27), $A(k_s)$ is an apodization function for suppressing a negative value of the image. w is a Wiener parameter for suppressing noise. $F_{k_s}^{-1}$ is inverse Fourier transformation of $k_s$. The image processor generates the image using a result of deconvolution described above.

Figure 12:
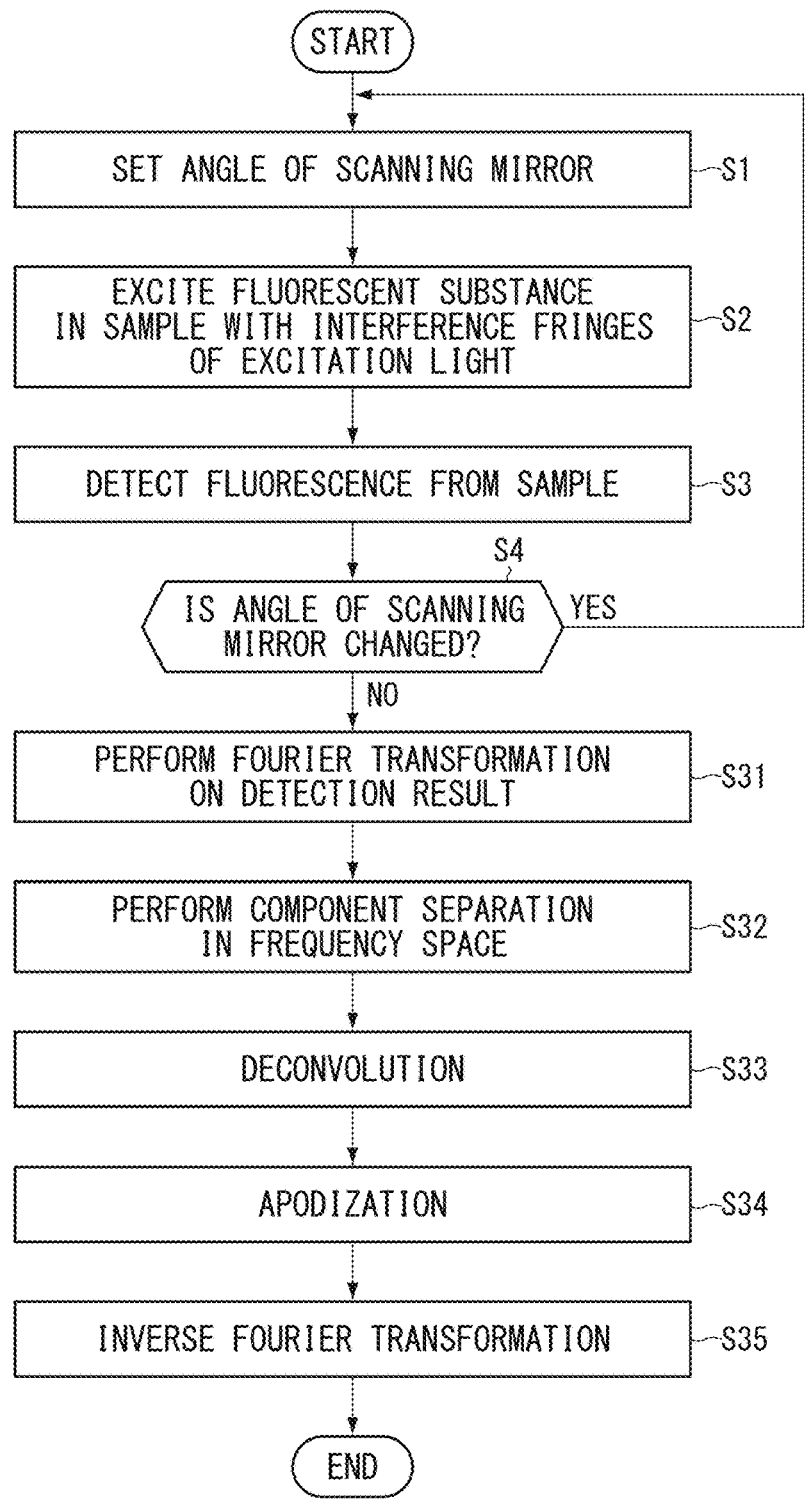
FIG. 12 is a flowchart illustrating an observation method according to a fourth embodiment.

FIG. 12 is a flowchart illustrating the observation method according to the fourth embodiment. The processing from Step S1 to Step S4 is the same as that in FIG. 6, so that description thereof is omitted. In Step S31, the image processor 7 performs Fourier transformation on the detection result. In Step S32, the image processor 7 separates the component in the frequency space. In Step S33, the image processor 7 performs deconvolution using the component separated through the processing in Step S32. In Step S34, the image processor 7 performs apodization. In Step S35, the image processor 7 performs inverse Fourier transformation on data obtained through deconvolution and apodization. The image processor 7 generates the image using data obtained through inverse Fourier transformation.

As described above, the image processor 7 according to the present embodiment performs component separation, deconvolution, and apodization in the frequency space, and converts the data obtained through these pieces of processing into data in the real space to generate the image. In the present embodiment, the image processor 7 may generate the image without performing processing of causing the effective PSFs of the respective detectors 6a of the detection device 6 to substantially match each other to correct a positional deviation.

In the present embodiment, the scanning interval and the interval between the detectors 6a of the detection device 6 may be set on the basis of the cutoff frequency and Nyquist's theorem. The scanning interval may be set to be equal to or smaller than $\lambda_{ex}/8NA$ in the periodic direction of the interference fringes. The scanning interval may be set to be equal to or smaller than $\lambda_{ex}/4NA$ in a direction perpendicular to the periodic direction of the interference fringes. The interval between the detectors 6a of the detection device 6 may be set to be equal to or smaller than $\lambda_{em}/4NA$.

The image processor 7 may set a range of k as an addition target to be a range of the entire space, or to be a partial range of the entire space. The image processor 7 may limit a range of r at the time of performing arithmetic operation on $I_0\sim(k, k_s)$, $I_{+1}\sim(k, k_s)$, and $I_{-1}\sim(k, k_s)$ by Fourier transformation. The image processor 7 may use, as $OTF_0(k, k_s)$, $OTF_{+1}(k, k_s)$, and $OTF_{-1}(k, k_s)$, data that is obtained in advance by measurement using fluorescent beads, numerical simulation using a design value, or the like, or data (for example, an estimated value) that is obtained from a result obtained by detecting fluorescence from the sample S by the detection device 6.

Fifth Embodiment

Figure 13:
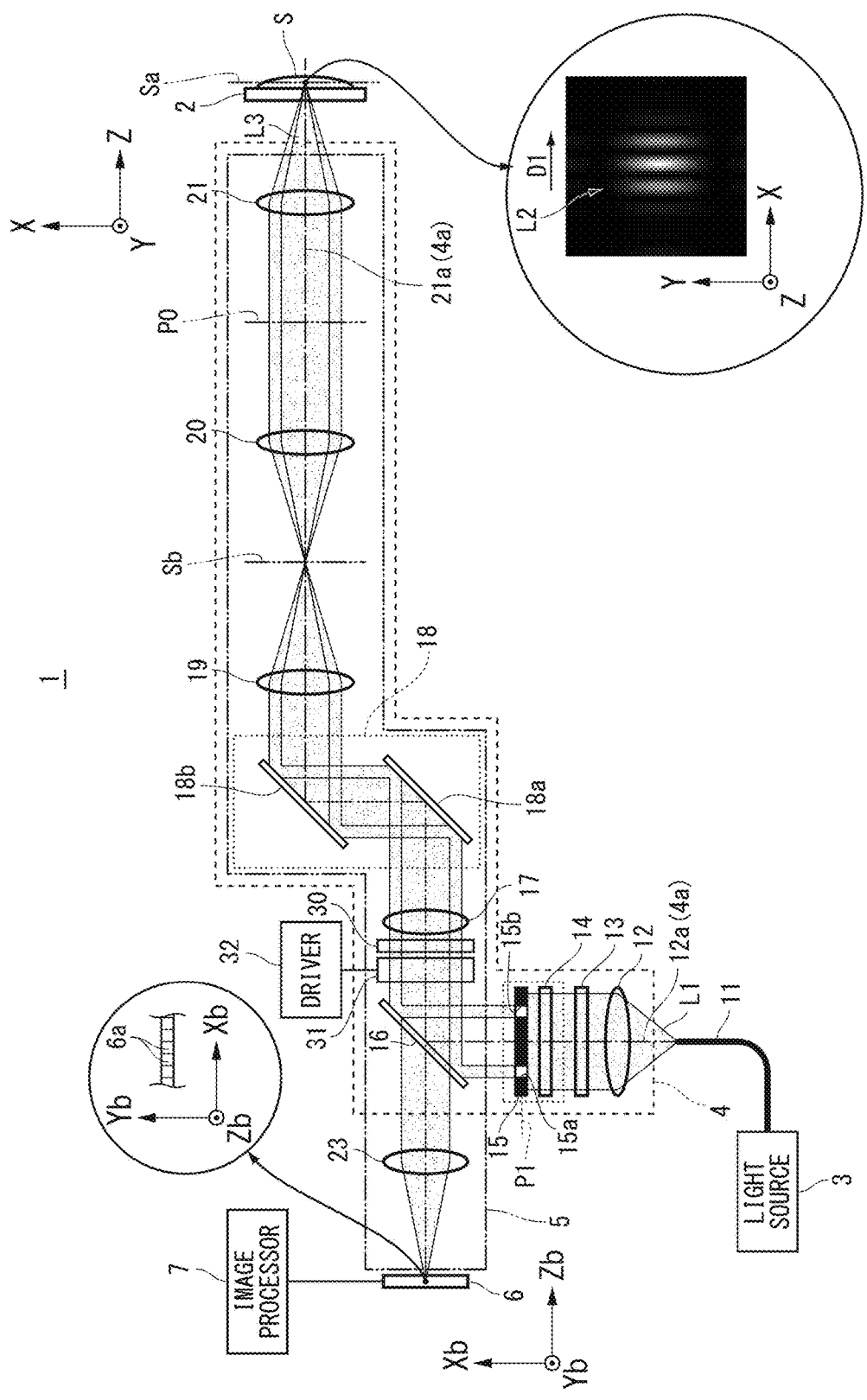
FIG. 13 is a diagram illustrating a microscope according to a fifth embodiment.

The following describes a fifth embodiment. In the present embodiment, a configuration similar to that in the embodiments described above is denoted by the same reference numeral, and description thereof is omitted or simplified as appropriate. FIG. 13 is a diagram illustrating the microscope according to the fifth embodiment. In the present embodiment, the detection device 6 includes a line sensor (line detector) in which the detectors 6a are one-dimensionally arranged. The detectors 6a are arranged in one direction in the detection device 6. The detection device 6 is disposed at a position that is optically conjugate to the sample plane Sa. The direction in which the detectors 6a are arranged (hereinafter, referred to as an arrangement direction) is set to be a direction corresponding to the periodic direction of the interference fringes L2. For example, in FIG. 13, the periodic direction of the interference fringes is the X-direction, and the arrangement direction of the detectors 6a is set to be the Xb-direction corresponding to the X-direction.

The microscope 1 according to the present embodiment includes a λ/2 wave plate 30 and an optical path rotator 31 that causes the optical path to rotate about the optical axis. The λ/2 wave plate 30 causes polarized light passing through the optical path rotator 31 to rotate on the basis of a rotation angle of the optical path rotated by the optical path rotator 31. The optical path rotator 31 is disposed on the optical path between the mask 15 and the sample S in the illumination optical system 4. The optical path rotator 31 is, for example, disposed at a position at which the excitation light L1 becomes substantially parallel light on the optical path in the illumination optical system 4. The optical path rotator 31 is, for example, disposed at a position through which the excitation light L1 passes in the illumination optical system 4 and the fluorescence L3 passes in the detection optical system 5. The optical path rotator 31 is, for example, disposed on the optical path between the dichroic mirror 16 and the sample S. The λ/2 wave plate 30 may be disposed on the same side as the sample S with respect to the optical path rotator 31, or may be disposed on the opposite side of the sample S (for example, on the same side as the light source of the excitation light) with respect to the optical path rotator 31.

The optical path rotator 31 is, for example, an image rotator such as a Dove prism. The optical path rotator 31 is disposed to be able to rotate about the optical axis of the illumination optical system 4. The optical path rotator 31 is driven by a driver 32 to rotate. In a case of using the Dove prism as the optical path rotator 31, when the Dove prism is rotated about the optical axis of the illumination optical system 4 by θ°, the optical path on a light emitting side of the Dove prism (on the sample S side) is rotated about the optical axis of the illumination optical system 4 by 2×θ°) with respect to the optical path on a light incident side of the Dove prism (on the light source 3 side). Due to this, the incident plane of the excitation light L1 for the sample S is rotated about the Z-direction by 2×θ°), and the periodic direction of the interference fringes L2 is rotated about the Z-direction by 2×θ°. For example, in a case of changing the periodic direction of the interference fringes L2 by 90°, the driver 32 causes the optical path rotator 31 to rotate about the optical axis of the illumination optical system 4 by 45°. In this way, the optical path rotator 31 is included in the fringe direction changer that changes the direction of the interference fringes with respect to the sample.

The λ/2 wave plate 30 is disposed to be able to rotate about the optical axis of the illumination optical system 4. The λ/2 wave plate 30 rotates interlocking with the optical path rotator 31. The λ/2 wave plate 30 rotates by an angle that is defined on the basis of a rotation angle of the optical path rotator 31. For example, the λ/2 wave plate 30 is fixed to (for example, integrated with) the optical path rotator 31, and rotates together with the optical path rotator 31. In this case, the λ/2 wave plate 30 rotates by the same angle as the rotation angle of the optical path rotator 31.

When the λ/2 wave plate 30 is rotated about the optical axis of the illumination optical system 4 by θ°, the polarization direction of the excitation light L1 is rotated about the optical axis of the illumination optical system 4 by 2×θ°) with respect to the polarization direction on the light incident side (light source 3 side). Due to this, the polarization state of the excitation light L1 at the time of being incident on the sample S becomes S-polarization.

The optical path rotator 31 in FIG. 13 is also included in an image rotator. The image rotator causes an image of the sample S (for example, an image of fluorescence from the sample S) to rotate about the optical axis of the detection optical system 5 with respect to the detectors 6a. That is, the fringe direction changer and the image rotator include the optical path rotator 31 as the same member (optical member). The optical path rotator is disposed at a position on which fluorescence is incident on the optical path of the illumination optical system 4. The image rotator causes the image of fluorescence to rotate with the optical path rotator 31. The optical path rotator 31 adjusts the periodic direction of the interference fringes L2 with respect to the arrangement direction of the detectors 6a of the detection device 6. In a case of using the Dove prism as the optical path rotator 31, when the Dove prism is rotated about the optical axis of the illumination optical system 4 by θ°, the periodic direction of the interference fringes L2 is rotated about the Z-direction by 2×θ°. The optical path of the fluorescence L3 from the sample S is then rotated by −2×θ° on the light emitting side (detection device 6 side) with respect to the light incident side (sample S side) of the Dove prism.

When the Dove prism is rotated, the optical path of light traveling toward the sample S via the Dove prism is rotated, and the periodic direction of the interference fringes L2 with respect to the sample S is changed. The optical path of the light traveling from the sample S toward the detection device 6 via the Dove prism is rotated in the opposite direction of the optical path of the light traveling toward the sample S by the same angle. Thus, in a case of projecting images of the detectors 6a (for example, line detectors) of the detection device 6 on the sample plane Sa via the detection optical system 5, the direction in which the detectors 6a are arranged always matches the periodic direction of the interference fringes even in a case in which the periodic direction of the interference fringes is changed by the Dove prism. Thus, the detection device 6 can detect the fluorescence L3 before and after the periodic direction of the interference fringes L2 is changed. The image processor 7 generates the image through the processing described in the first embodiment to the fourth embodiment on the basis of the detection result of the detection device 6.

In the microscope 1 according to the first embodiment, the driver 22 causes the mask 15 to rotate to change the periodic direction of the interference fringes L2, but the periodic direction of the interference fringes L2 may be changed by the optical path rotator 31 (for example, the Dove prism) described above. The fringe direction changer that changes the periodic direction of the interference fringes L2 may have a form different from both of the driver 22 and the optical path rotator 31. For example, the stage 2 may be disposed to be able to rotate about the Z-direction, and the direction of the interference fringes L2 with respect to the sample S may be changed by rotation of the stage 2. In this case, the stage 2 is included in the fringe direction changer that changes the direction of the interference fringes L2 with respect to the sample S.

Figure 14:
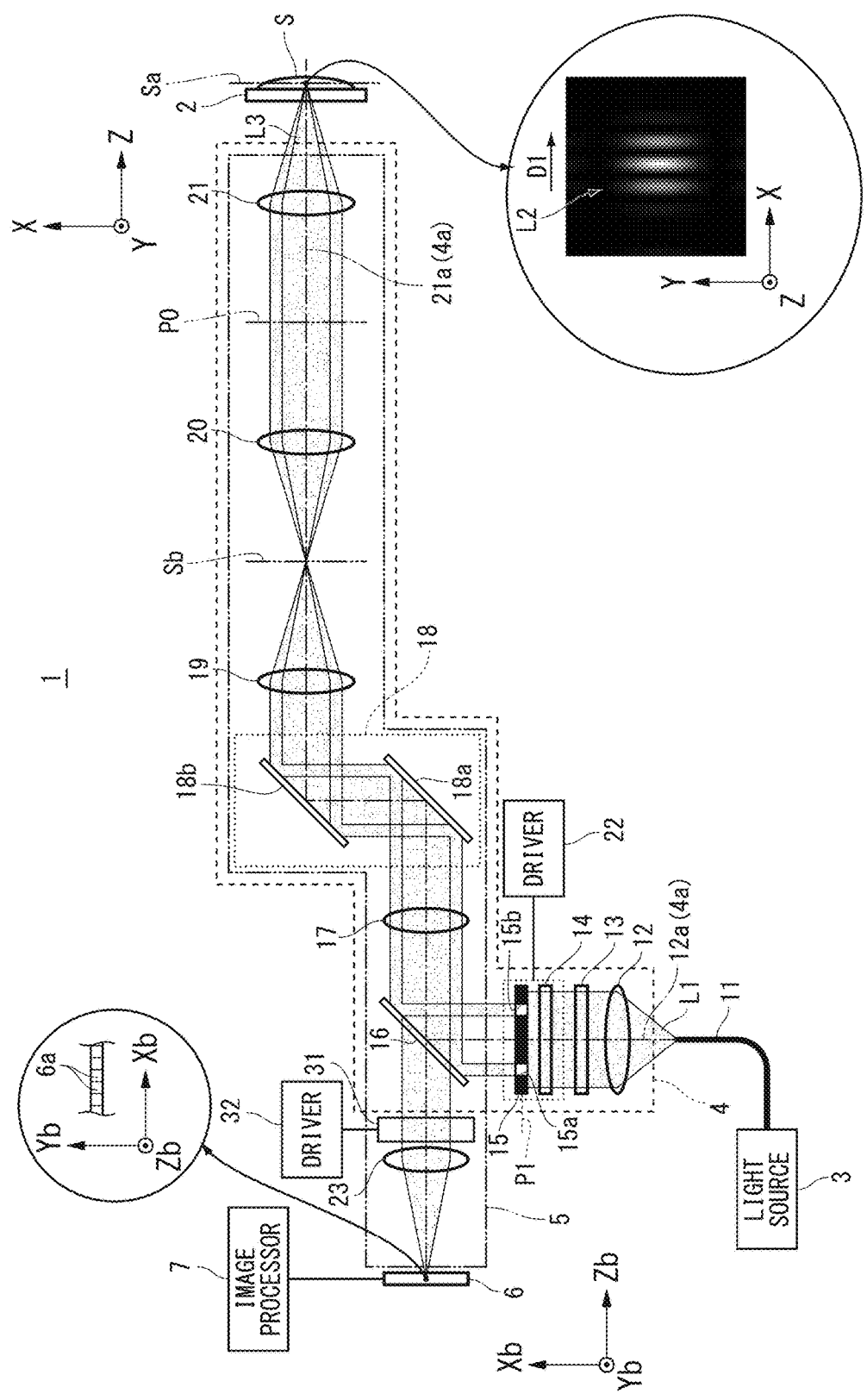
FIG. 14 is a diagram illustrating the microscope according to the fifth embodiment.

The microscope 1 illustrated in FIG. 14 is different from that in FIG. 13 in the position at which the optical path rotator 31 is disposed. In FIG. 14, the fringe direction changer is the same as that in the first embodiment and includes the mask 15 and the driver 22. The optical path rotator 31 serves as both of the fringe direction changer and the image rotator in FIG. 13 but is disposed separately from the fringe direction changer in FIG. 14. In FIG. 14, the optical path rotator 31 is disposed at a position not overlapping with the optical path of the illumination optical system 4 on the optical path of the detection optical system 5. The optical path rotator 31 is disposed at a position on which the excitation light L1 is not incident but the fluorescence L3 is incident. The optical path rotator 31 is disposed on the optical path between the dichroic mirror 16 and the detection device 6.

In the microscope 1, the periodic direction of the interference fringes L2 is changed when the driver 22 causes the mask 15 and the polarizer 14 to rotate. The driver 32 causes the optical path rotator 31 to rotate by an angle that is defined on the basis of rotation angles of the mask 15 and the polarizer 14. In the microscope 1, the driver 32 causes the optical path rotator 31 to rotate to cause a direction of an image projected on the detection device 6 to match the direction in which the detectors 6a are arranged.

Sixth Embodiment

Figure 15:
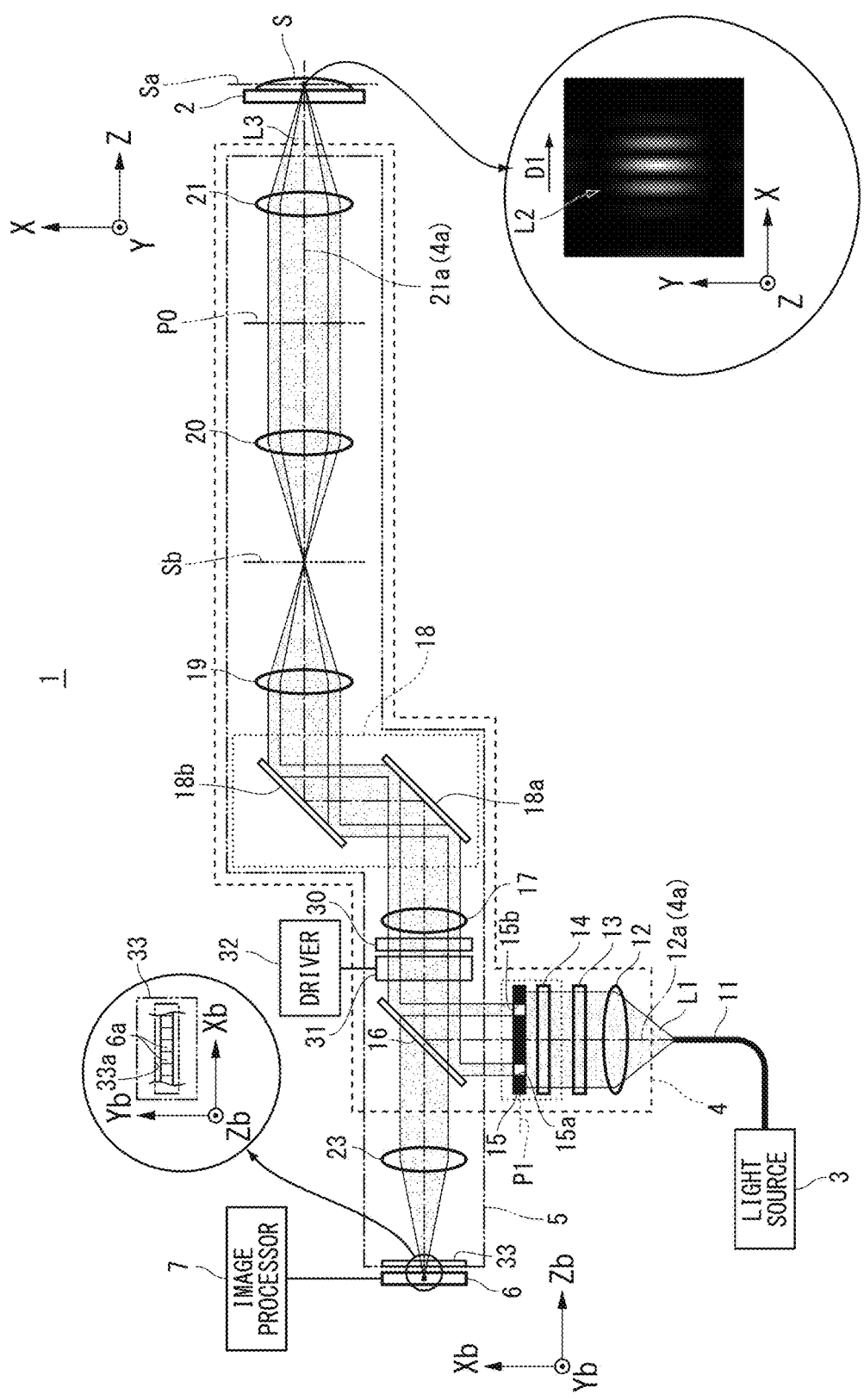
FIG. 15 is a diagram illustrating a microscope according to a sixth embodiment.

The following describes a sixth embodiment. In the present embodiment, a configuration similar to that in the embodiments described above is denoted by the same reference numeral, and description thereof is omitted or simplified as appropriate. FIG. 15 is a diagram illustrating the microscope according to the sixth embodiment. In the present embodiment, the microscope 1 includes a light shielding member 33. The light shielding member 33 is disposed at a position that is optically conjugate to the sample plane Sa or in the vicinity thereof. In FIG. 15, the detection device 6 is disposed at a position that is optically conjugate to the sample plane Sa, and the light shielding member 33 is disposed in the vicinity of the detection device 6. The light shielding member 33 may be disposed at a position that is conjugate to the sample plane Sa or in the vicinity thereof.

The light shielding member 33 has an opening 33a through which the fluorescence L3 passes and blocks the fluorescence L3 around the opening 33a. The opening 33a extends in the arrangement direction (Xb-direction) of the detectors 6a in the detection device 6. The opening 33a is, for example, a slit having a rectangular shape. The light shielding member 33 is disposed so that a long side of the opening 33a becomes substantially parallel with the arrangement direction of the detectors 6a. One or both of dimensions and a shape of the opening 33a of the light shielding member 33 may be variable. For example, the light shielding member 33 may be a mechanical diaphragm that can change a light shielding region, a spatial light modulator (SLM), or the like. One or both of the dimensions and the shape of the opening 33a may be fixed.

The detection device 6 detects the fluorescence L3 passed through the opening 33a of the light shielding member 33. The image processor 7 generates an image on the basis of a detection result of the detection device 6. The image processor 7 may perform any of the pieces of processing described in the first embodiment to the fourth embodiment. Herein, the following describes a case in which the phase of the PSFs of the interference fringes L2 is shifted through image processing.

In the present embodiment, image data $I(x, r_s)$ corresponding to the detection result of the detection device 6 is represented by the following expression (28).

$$I(x, r_s) = \int_{-\infty}^{\infty} dy \, PH_y(y)\{PSF_{det}(r) \overset{r}{*} (Obj(r + r_s)\text{ill}(r))\} \quad \text{Expression (28)}$$

$$= \{(PH_y(y_s) \overset{y_s}{*} PSF_{det}(x + x_s, y_s))\text{ill}(x_s, y_s)\}^{x_s, y_s}_{*}$$

$$Obj(x_s, y_s)$$

$I(x, r_s)$ is three-dimensional data having detector coordinates x corresponding to the position of the detector 6a in the detection device 6 and the scan coordinates $(x_s, y_s)$ as independent variables. In the expression (28), $PH_y(y_s)$ represents a pinhole function representing influence of the light shielding member 33. $PH_y(y_s)$ is represented by the following expression (29).

$$PH(y_s) = \begin{cases} 1, & |y_s| \le D_y \\ 0, & |y_s| > D_y \end{cases} \quad \text{Expression (29)}$$

Figure 17:
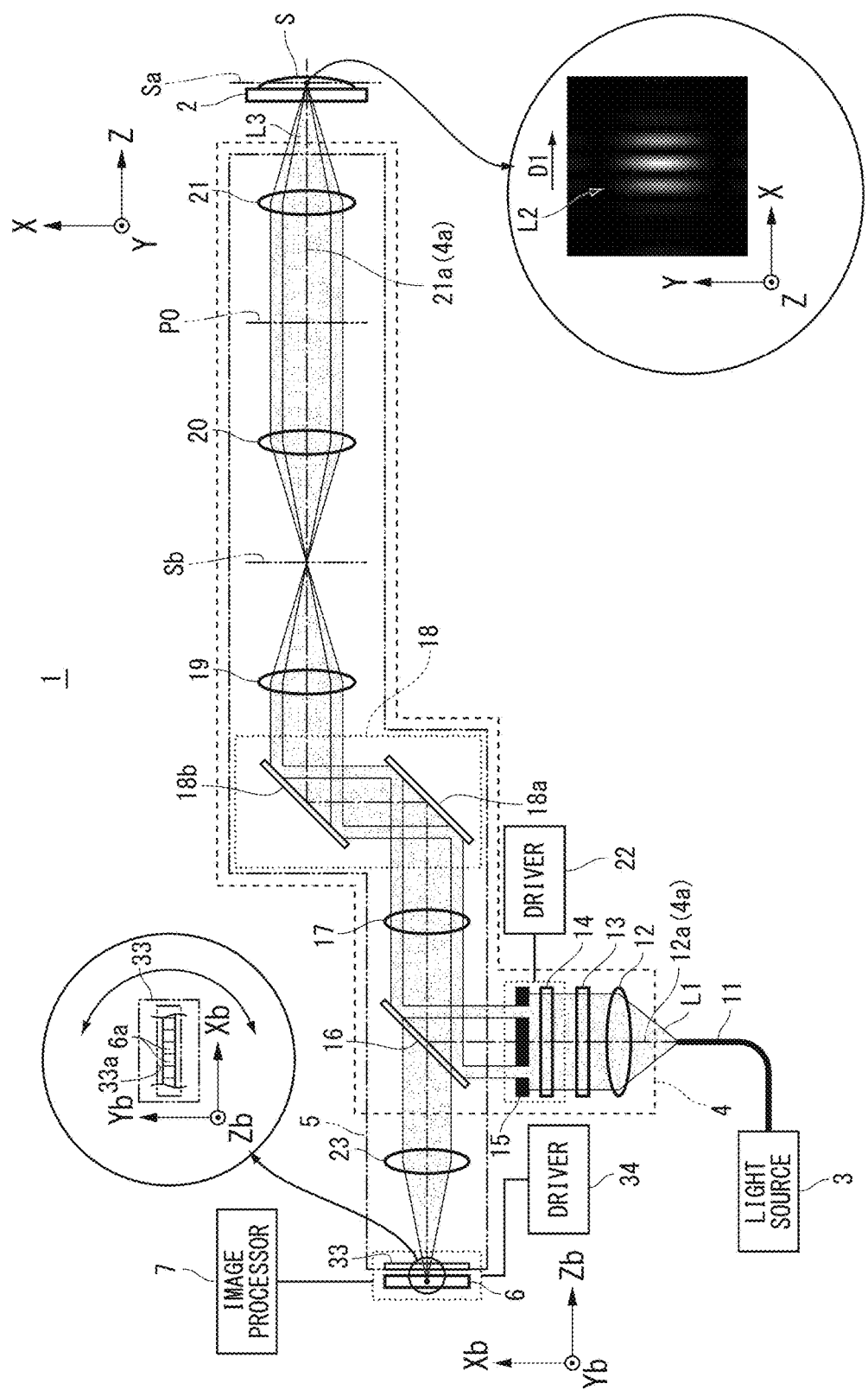
FIG. 17 is a diagram illustrating a microscope according to a seventh embodiment.

In the expression (29), $D_y$ is a half of the width of the opening 33a of the light shielding member 33 in the Yb-direction (refer to FIG. 17). That is, the width of the opening 33a of the light shielding member 33 in the Yb-direction (refer to FIG. 17) is assumed to be $2D_y$.

The processing performed by the image processor 7 described in the present embodiment can also be applied to the case in which the light shielding member 33 is not disposed as illustrated in FIG. 13. In the case in which the light shielding member 33 is not disposed, $PH_y(y_s)=1$ may be established for the entire range of $y_s$ in accordance with the fact that $D_y$ is infinite. In the case in which the light shielding member 33 is not disposed, the width in the Yb-direction of the optical path of the fluorescence L3 at the time of being incident on the detector 6a corresponds to the dimension in the Yb-direction of the detector 6a, and a half value of the dimension in the Yb-direction of the detector 6a may be used as a value of $D_y$.

By performing Fourier transformation on x, $x_s$, and $y_s$ in the expression (28) described above, the following expression (30) is obtained. In the expression (30), $\widetilde{PH}_y(k_{ys})$ represents Fourier transformation of $PH_y(y_s)$. $k_y$ represents an integration variable of convolution.

$$\tilde{I}(k_x, k_{x_s}, k_{y_s}) = \{(\widetilde{PH}_y(k_{y_s})OTF_{det}(k_x, k_{y_s})) \overset{k_{y_s}}{*} \widetilde{\text{ill}}(k_x - \quad \text{Expression (30)}$$

$$k_{x_s}, k_{y_s})\}\widetilde{obj}(k_{x_s}, k_{y_s})$$

$$= \{\int_{-\infty}^{\infty} dk_y (\widetilde{PH}_y(k_y)OTF_{det}(k_x, k_y)\widetilde{\text{ill}}(k_x -$$

$$k_{x_s}, k_y - k_{y_s}))\}\widetilde{obj}(k_{x_s}, k_{y_s})$$

In this case, for convenience of explanation, an illumination shape is assumed to be represented by the expression (2) described above, and the periodic direction of the interference fringes L2 is assumed to be the X-direction. $\text{ill}\sim(k_x - k_{xs}, k_y - k_{ys})$ in the expression (30) is represented by the following expression (31). In the expression (31), φ represents the initial phase of the interference fringes L2.

$$\widetilde{ill}(k_x - k_{x_s}, k_y - k_{y_s}) = \frac{1}{2}OTF_{ill}(k_x - k_{x_s}, k_y - k_{y_s}) +$$ Expression (31)

$$\frac{1}{4}e^{i\phi}OTF_{ill}(k_x - k_{x_s} - k_0, k_y - k_{y_s}) +$$

$$\frac{1}{4}e^{-i\phi}OTF_{ill}(k_x - k_{x_s} + k_0, k_y - k_{y_s})$$

By substituting the expression (31) for the expression (30) to be organized, I~$(k_x, k_{xs}, k_{ys})$ is represented by the following expression (32).

$$\begin{cases} \tilde{I}(k_x, k_{x_s}, k_{y_s}) = \tilde{I}_0(k_x, k_{x_s}, k_{y_s}) + \tilde{I}_{+1}(k_x, k_{x_s}, k_{y_s}) + \\ \tilde{I}_{-1}(k_x, k_{x_s}, k_{y_s}) \\ \tilde{I}_0(k_x, k_{x_s}, k_{y_s}) = \frac{1}{2}\left\{\int_{-\infty}^{\infty} dk_y (\widetilde{PH_y}(k_y)OTF_{det}(k_x, k_y) \right. \\ OTF_{ill}(k_x - k_{x_s}, k_y - k_{y_s}))\}\widetilde{obj}(k_{x_s}, k_{y_s}) \\ \tilde{I}_{+1}(k_x, k_{x_s}, k_{y_s}) = \frac{1}{4}e^{i\phi}\left\{\int_{-\infty}^{\infty} dk_y (\widetilde{PH_y}(k_y)OTF_{det}(k_x, k_y) \right. \\ OTF_{ill}(k_x - k_{x_s} - k_0, k_y - k_{y_s}))\}\widetilde{obj}(k_{x_s}, k_{y_s}) \\ \tilde{I}_{-1}(k_x, k_{x_s}, k_{y_s}) = \frac{1}{4}e^{-i\phi}\left\{\int_{-\infty}^{\infty} dk_y (\widetilde{PH_y}(k_y)OTF_{det}(k_x, k_y) \right. \\ OTF_{ill}(k_x - k_{x_s} + k_0, k_y - k_{y_s}))\}\widetilde{obj}(k_{x_s}, k_{y_s}) \end{cases}$$ Expression (32)

In the expression (32), I~$_0$ $(k_x, k_{xs}, k_{ys})$ corresponds to the 0th-order component described in the third embodiment, I~$_{+1}(k_x, k_{xs}, k_{ys})$ corresponds to the +1st-order component, and I~$_{-1}(k_x, k_{xs}, k_{ys})$ corresponds to the −1st-order component. Regions in which I~$_0(k_x, k_{xs}, k_{ys})$, I~$_{+1}(k_x, k_{xs}, k_{ys})$, and I~$_{-1}(k_x, k_{xs}, k_{ys})$ have respective values are different from each other.

Figure 16A:
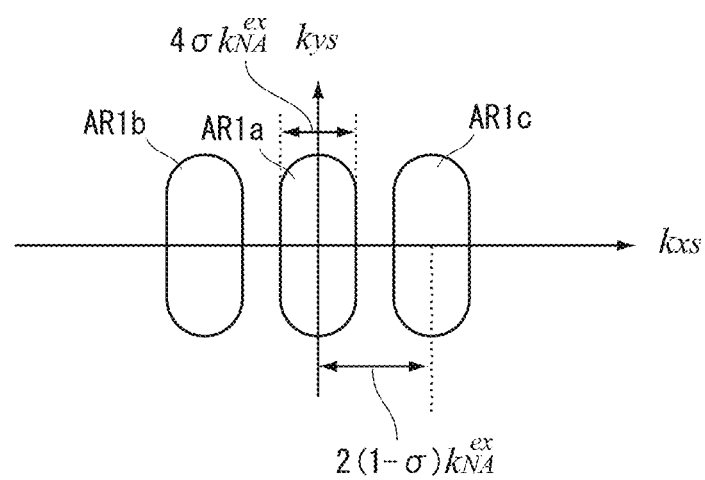
FIGS. 16A and 16B are diagrams illustrating a region of the frequency space used for component separation according to the sixth embodiment.
Figure 16B:
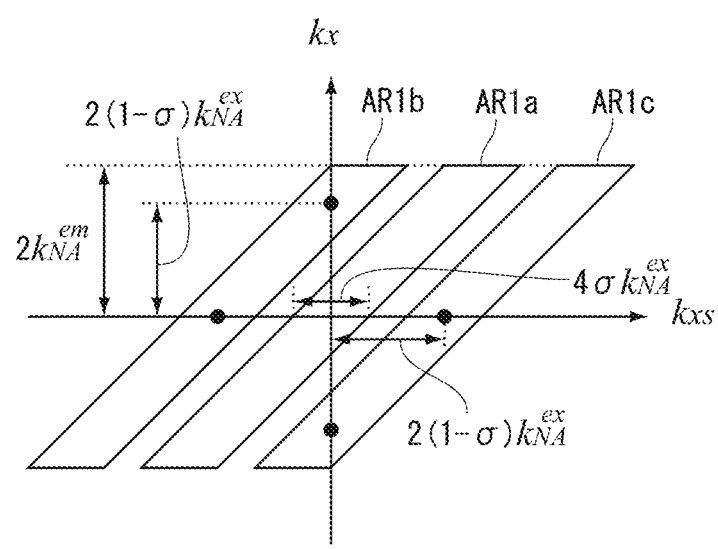

FIGS. 16A and 16B are diagrams illustrating a region of the frequency space used for component separation according to the sixth embodiment. Ranges in the $k_{ys}$-direction of the regions in which the 0th-order component, the +1st-order component, and the −1st-order component have respective values depend on PH$_y$~ and OTF$_{det}$. FIGS. 16A and 16B illustrate the regions in which the components have respective values in a case in which the opening 15a and the opening 15b of the mask 15 (refer to FIGS. 2A to 2C) have a circular shape. In a case in which the opening of the mask 15 has a shape other than the circular shape, it is possible to obtain Fourier transformation of ill, and calculate the range of the region in which each component has a value on the basis of the expression (30). As a method of calculating the range of the region in which each component has a value, analytic calculation, numerical simulation, or the like may be performed.

In FIGS. 16A and 16B, each of the region AR1a of the 0th-order component, the region AR1b of the +1st-order component, and the region AR1c of the −1st-order component is a region having an elliptic shape on the $k_{xs}$-$k_{ys}$ plane. The region AR1a of the 0th-order component, the region AR1b of the +1st-order component, and the region AR1c of the −1st-order component have the same width in the $k_{xs}$-direction on the $k_{xs}$-$k_{ys}$ plane. The width of the region AR1a of the 0th-order component is $4\sigma k_{NA}^{ex}$. The region AR1a of the 0th-order component is a region centered on an origin. Each of the region AR1b of the +1st-order component and the region AR1c of the −1st-order component is a region having the center on the axis of $k_{xs}$. A distance between the center of the region AR1c of the −1st-order component and the origin is $2(1-\sigma)k_{NA}^{ex}$. The region AR1b of the +1st-order component is a region at a position symmetrical to the region AR1c of the −1st-order component with respect to the region AR1a of the 0th-order component.

The image processor 7 extracts each component from I~$(k_x, k_{xs}, k_{ys})$. For example, the image processor 7 extracts data of the region AR1a of the 0th-order component from I~$(k_x, k_{xs}, k_{ys})$ to separate I$_0$~$(k_x, k_{xs}, k_{ys})$ therefrom. The image processor 7 extracts data of the region AR1b of the +1st-order component from I~$(k_x, k_{xs}, k_{ys})$ to separate I$_{+1}$~$(k_x, k_{xs}, k_{ys})$ therefrom. The image processor 7 extracts data of the region AR1c of the −1st-order component from I~$(k_x, k_{xs}, k_{ys})$ to separate I$_{-1}$~$(k_x, k_{xs}, k_{ys})$ therefrom.

The image processor 7 performs inverse Fourier transformation on each of I$_0$~$(k_x, k_{xs}, k_{ys})$, I$_{+1}$~$(k_x, k_{xs}, k_{ys})$ and I$_{-1}$~$(k_x, k_{xs}, k_{ys})$ that are obtained through component separation, and calculates data of each component in the real space. The data obtained by performing inverse Fourier transformation on I$_0$~$(k_x, k_{xs}, k_{ys})$ is represented as I$_0$(x, x$_s$, y$_s$), data obtained by performing inverse Fourier transformation on I$_{+1}$~$(k_x, k_{xs}, k_{ys})$ is represented as I$_{+1}$(x, x$_s$, y$_s$), and data obtained by performing inverse Fourier transformation on I$_{-1}$~$(k_x, k_{xs}, k_{ys})$ is represented as I$_{-1}$(x, x$_s$, y$_s$).

The image processor 7 shifts the phase of the interference fringes in accordance with the detector coordinates so that the effective PSFs of the respective detectors 6a of the detection device 6 are aligned by using at least part of the data of the respective components in the real space obtained as described above. The image processor 7 shifts the phase of the interference fringes L2 by arithmetic operations represented by the following expressions (33) and (34).

$$\begin{cases} I'_0(x, x_s, y_s) = I_0(x, x_s, y_s) \\ I'_{+1}(x, x_s, y_s) = I_{+1}(x, x_s, y_s)e^{i\psi(x)} \\ I'_{-1}(x, x_s, y_s) = I_{-1}(x, x_s, y_s)e^{-i\psi(x)} \end{cases}$$ Expression (33)

$$I'(x, x_s, y_s) = I'_0(x, x_s, y_s) + I'_{+1}(x, x_s, y_s) + I'_{-1}(x, x_s, y_s)$$ Expression (34)

After the phase shift processing, similarly to the third embodiment, the image processor 7 performs correction processing of collecting the positional deviation. After the correction processing, the image processor 7 generates a super resolution image by adding up images of the respective detectors.

Seventh Embodiment

The following describes a seventh embodiment. In the present embodiment, a configuration similar to that in the embodiments described above is denoted by the same reference numeral, and description thereof is omitted or simplified as appropriate. FIG. 17 is a diagram illustrating the microscope according to the seventh embodiment. In the present embodiment, the microscope 1 includes the driver 22 and a driver 34. The driver 22 is the same as that in the first embodiment. The driver 22 causes the mask 15 to rotate to change the periodic direction of the interference fringes L2. The driver 22 is included in the fringe direction changer that changes the direction of the interference fringes L2 with respect to the sample S.

In the present embodiment, the detection device 6 can rotate about the Zb-direction. The driver 34 causes the detection device 6 to rotate about the Zb-direction. The driver 34 causes the detection device 6 to rotate so that the arrangement direction of the detectors 6a in the detection device 6 corresponds to the periodic direction of the interference fringes L2. For example, in a case in which the driver 22 causes the mask 15 to rotate by 90°, the periodic direction of the interference fringes L2 is changed by 90°, so that the driver 34 causes the detection device 6 to rotate by 90°.

The driver 34 causes the light shielding member 33 to rotate so that relative positions of the detection device 6 and the light shielding member 33 are maintained. For example, the light shielding member 33 is integrated with the detection device 6, and the driver 34 causes the light shielding member 33 and the detection device 6 to integrally rotate.

The microscope 1 may include the optical path rotator 31 illustrated in FIG. 14 instead of causing the detection device 6 to rotate. The microscope 1 does not necessarily include the light shielding member 33 as illustrated in FIG. 13.

Eighth Embodiment

Figure 18:
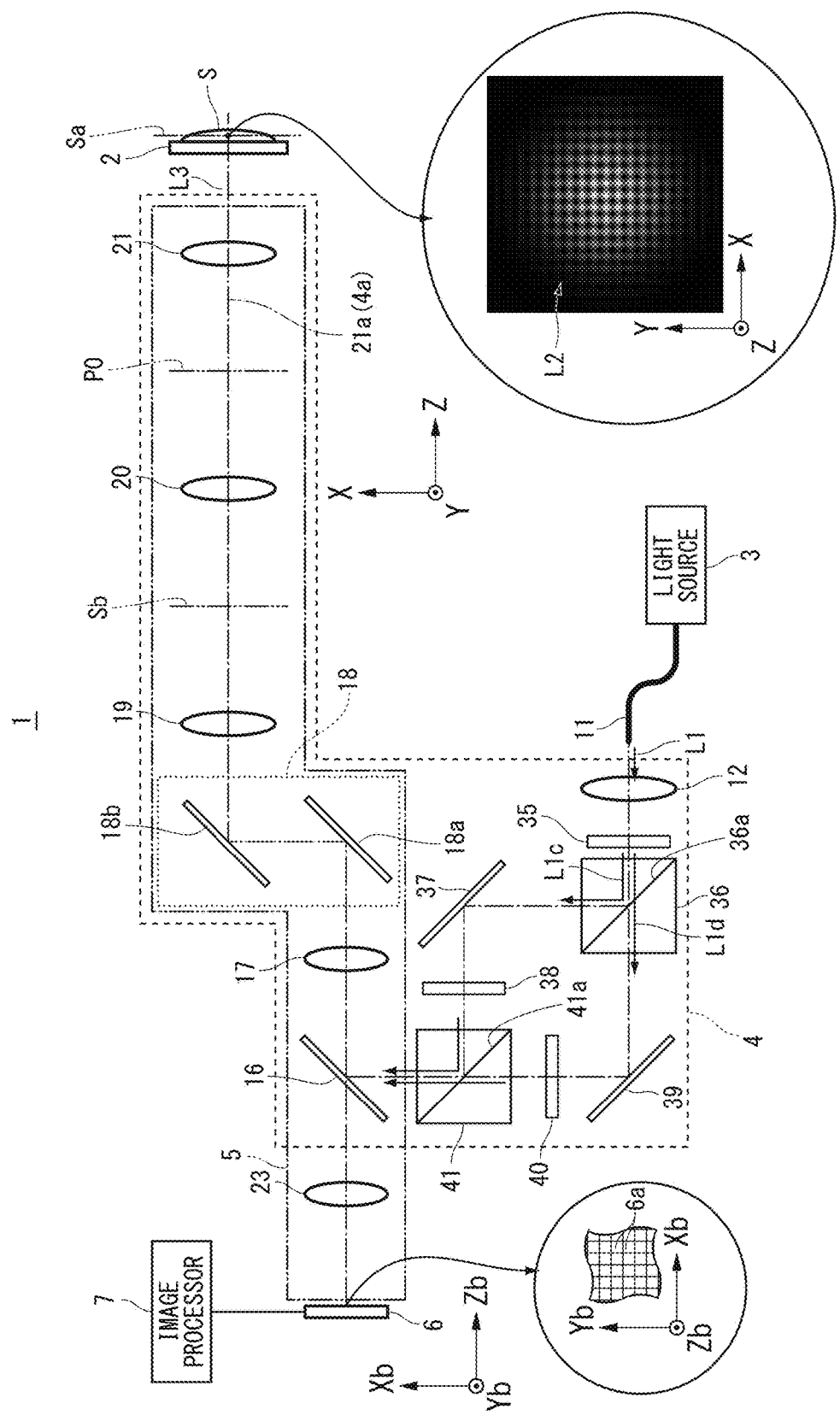
FIG. 18 is a diagram illustrating a microscope according to an eighth embodiment.

The following describes an eighth embodiment. In the present embodiment, a configuration similar to that in the embodiments described above is denoted by the same reference numeral, and description thereof is omitted or simplified as appropriate. FIG. 18 is a diagram illustrating the microscope according to the eighth embodiment. In the embodiment described above, exemplified is a case in which the illumination pupil is divided into two poles (two regions) on the pupil plane P0 (refer to FIG. 2C), but the illumination pupil may have another form. The following describes a form in which the illumination pupil is divided into four poles (four regions) on the pupil plane.

The illumination optical system 4 according to the present embodiment includes the collimator lens 12, a λ/2 wave plate 35, a polarized light separating element 36, a mirror 37, a mask 38 (opening member), a mirror 39, a mask (opening member), and a polarized light separating element 41 on the light emitting side of the optical fiber 11. The configuration from the dichroic mirror 16 to the objective lens 21 of the illumination optical system 4 is the same as that in the first embodiment.

The excitation light L1 emitted from the optical fiber is converted into substantially parallel light by the collimator lens 12 and is incident on the λ/2 wave plate 35. The excitation light L1 passed through the λ/2 wave plate includes excitation light L1c as linearly polarized light in a first direction and excitation light L1d as linearly polarized light in a second direction. A direction of an optical axis (a fast axis, a slow axis) of the λ/2 wave plate 35 is set so that a ratio between an amount of the excitation light L1c and an amount of the excitation light L1d becomes a predetermined ratio.

The excitation light L1 (the excitation light L1c and the excitation light L1d) passed through the λ/2 wave plate 35 is incident on the polarized light separating element 36. The polarized light separating element 36 includes a polarized light separation film 36a that is inclined with respect to the optical axis 12a of the collimator lens 12. The polarized light separation film 36a has a characteristic of reflecting the linearly polarized light in the first direction and transmitting the linearly polarized light in the second direction. The polarized light separating element 36 is, for example, a polarized beam splitter prism (PBS prism). The linearly polarized light in the first direction described above is S-polarized light with respect to the polarized light separation film 36a. The linearly polarized light in the second direction described above is P-polarized light with respect to the polarized light separation film 36a.

The excitation light L1c as S-polarized light with respect to the polarized light separation film 36a is reflected by the polarized light separation film 36a and is incident on the mask 38 via the mirror 37. The excitation light L1d as P-polarized light with respect to the polarized light separation film 36a is transmitted through the polarized light separation film 36a and is incident on the mask 40 via the mirror 39. Each of the mask 38 and the mask 40 is a light flux splitter that splits the excitation light that excites a fluorescent substance into a plurality of light fluxes. The mask 38 and the mask 40 will be described later with reference to FIGS. 19A and 19B.

Each of the excitation light L1c passed through the mask 38 and the excitation light L1d passed through the mask 40 is incident on the polarized light separating element 41. The polarized light separating element 41 includes a polarized light separation film 41a that is inclined with respect to the optical path of the excitation light L1c and the optical path of the excitation light L1d. The polarized light separation film 41a has a characteristic of reflecting the linearly polarized light in the first direction and transmitting the linearly polarized light in the second direction. The polarized light separating element 41 is, for example, a polarized beam splitter prism (PBS prism). The linearly polarized light in the first direction described above is S-polarized light with respect to the polarized light separation film 41a. The linearly polarized light in the second direction described above is P-polarized light with respect to the polarized light separation film 41a.

The excitation light L1c is S-polarized light with respect to the polarized light separation film 41a and is reflected by the polarized light separation film 41a to be incident on the dichroic mirror 16. The excitation light L1d is P-polarized light with respect to the polarized light separation film 41a and is transmitted through the polarized light separation film 41a to be incident on the dichroic mirror 16. One or both of the polarized light separating element 36 and the polarized light separating element 41 are not necessarily the PBS prism. One or both of the polarized light separating element 36 and the polarized light separating element 41 may be a photonic crystal and the like having different characteristics of reflection and transmission for TE-polarized light and TM-polarized light.

Figure 19A:
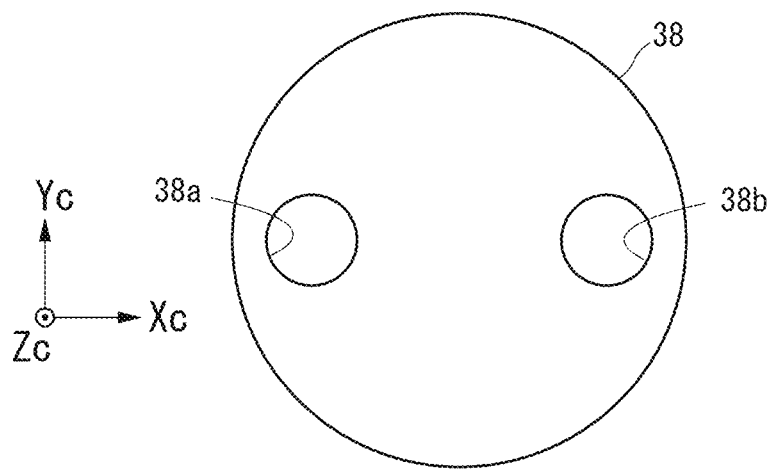
FIGS. 19A to 19C are diagrams illustrating a mask and a polarization state of excitation light according to the eighth embodiment.
Figure 19B:
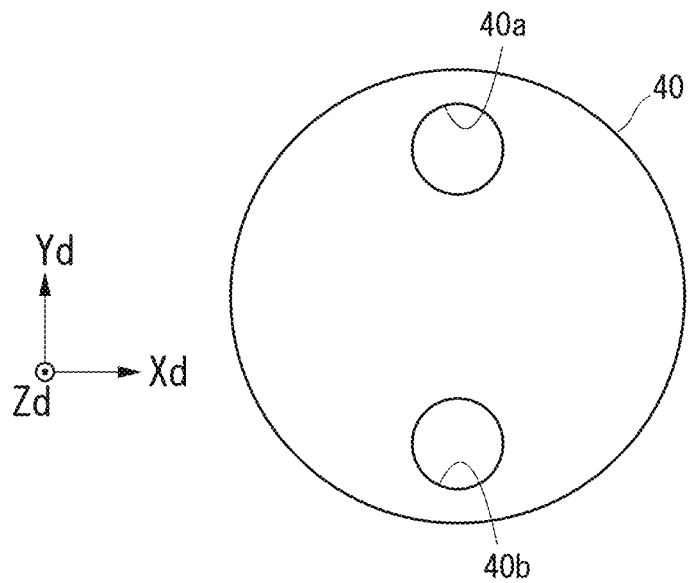

FIGS. 19A and 19B are diagrams illustrating the mask and the polarization state of the excitation light according to the eighth embodiment. In FIG. 19A, the Xc-direction, the Yc-direction, and the Zc-direction are directions respectively corresponding to the X-direction, the Y-direction, and the Z-direction on the sample plane Sa (refer to FIG. 18). The mask 38 has an opening 38a and an opening 38b. The mask 38 is disposed on a pupil plane conjugate plane, or within a range distant therefrom by 100 mm or less. The opening 38a and the opening 38b are arranged in the Xc-direction. Each of the opening 38a and the opening 38b has a circular shape, for example, but may have a shape other than the circular shape.

In FIG. 19B, the Xd-direction, the Yd-direction, and the Zd-direction are directions respectively corresponding to the X-direction, the Y-direction, and the Z-direction on the sample plane Sa (refer to FIG. 18). The mask 40 is disposed on the pupil plane conjugate plane, or within a range distant therefrom by 100 mm or less. The mask 38 or the mask 40 may be disposed on the pupil plane, or within a range distant therefrom by 100 mm or less. The mask 40 has an opening 40a and an opening 40b. The opening 40a and the opening 40b are arranged in the Yd-direction. Each of the opening 40a and the opening 40b has a circular shape, for example, but may have a shape other than the circular shape.

Figure 19C:
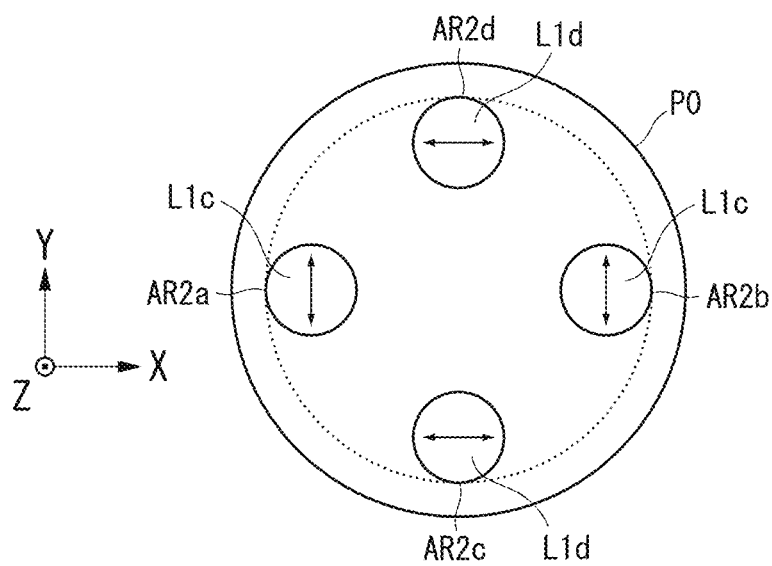

In FIG. 19C, the reference numeral AR2a denotes a region on which the excitation light L1c passed through the opening 38a of the mask 38 is incident on the pupil plane P0 of the objective lens 21. The reference numeral AR2b denotes a region on which the excitation light L1c passed through the opening 38b of the mask 38 is incident on the pupil plane P0. Each of arrows in the region AR2a and the region AR2b indicates a polarization direction of the excitation light L1c that is incident thereon. The region AR2a and the region AR2b are arranged in the X-direction.

Each of the excitation light L1c incident on the region AR2a and the excitation light L1c incident on the region AR2b is linearly polarized light in the Y-direction. The excitation light L1c incident on the region AR2a and the excitation light L1c incident on the region AR2b have the same polarization direction and interfere with each other on the sample plane Sa (refer to FIG. 18). Due to this interference, the interference fringes the periodic direction of which is the X-direction is formed on the sample plane Sa. The incident plane of the excitation light L1c with respect to the sample plane Sa is the XZ-plane, and the excitation light L1c is incident on the sample S as S-polarized light.

In FIG. 19C, the reference numeral AR2c denotes a region on which the excitation light L1d passed through the opening 40a of the mask 40 is incident on the pupil plane P0. The reference numeral AR2d denotes a region on which the excitation light L1d passed through the opening 40b of the mask 40 is incident on the pupil plane P0. Each of arrows in the region AR2c and the region AR2d indicates the polarization direction of the excitation light L1d that is incident thereon. The region AR2c and the region AR2d are arranged in the Y-direction.

Each of the excitation light L1d incident on the region AR2c and the excitation light L1d incident on the region AR2d is linearly polarized light in the X-direction. The excitation light L1d incident on the region AR2c and the excitation light L1d incident on the region AR2d have the same polarization direction and interfere with each other on the sample plane Sa (refer to FIG. 18). Due to this interference, the interference fringes the periodic direction of which is the Y-direction is formed on the sample plane Sa. The incident plane of the excitation light L1d with respect to the sample plane Sa is the YZ-plane, and the excitation light L1d is incident on the sample S as S-polarized light.

Returning to the description of FIG. 18, the interference fringes L2 are formed on the sample plane Sa by combining the interference fringes generated by interference of the excitation light L1c and the interference fringes generated by interference of the excitation light L1d. Polarization directions of the excitation light L1c and the excitation light L1d are substantially orthogonal to each other, so that interference between the excitation light L1c and the excitation light L1d is suppressed.

The detection device 6 detects the fluorescence L3 from the sample S via the detection optical system 5. As described in the first embodiment, the detection device 6 is an image sensor in which the detectors 6a are arranged in two directions, that is, the Xb-direction and the Yb-direction. The image processor 7 generates an image on the basis of a detection result of the detection device 6. Herein, the following describes a case of shifting the phase of the PSFs of the interference fringes L2 through image processing.

Figure 20A:
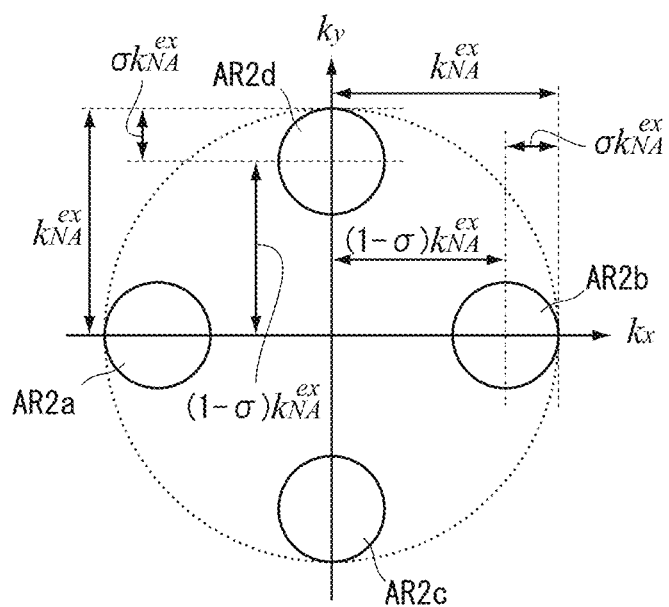
FIGS. 20A and 20B are diagrams illustrating interference fringes and a region of the frequency space used for component separation according to the eighth embodiment.
Figure 20B:
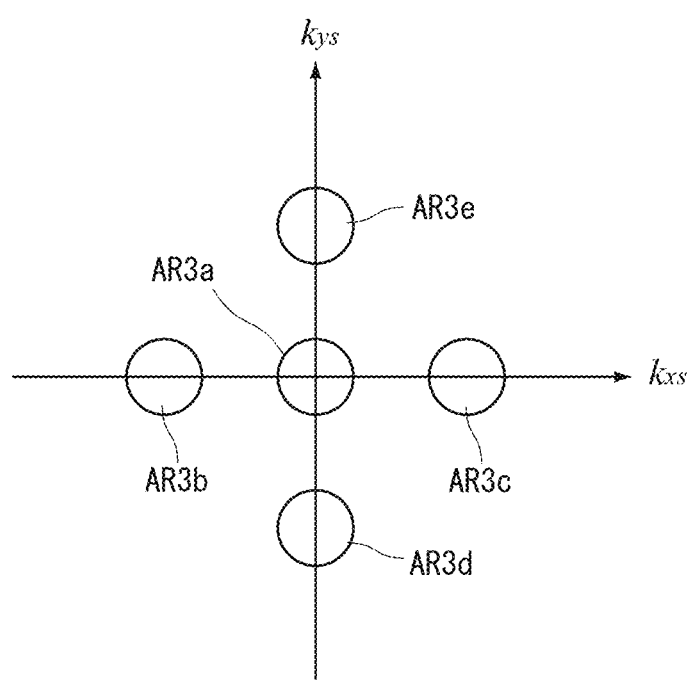

FIGS. 20A and 20B are diagrams illustrating the pupil conjugate plane and the region of the frequency space used for component separation according to the eighth embodiment. In FIG. 20A, the pupil conjugate plane P1 is represented in a wave coordinate space. $k_{NA}^{ex}$ (a circle drawn by a dotted line) illustrated in FIG. 20A represents a pupil radius of the objective lens 21. Each of the region AR2a and the region AR2b on which the excitation light L1c is incident and the region AR2c and the region AR2d on which the excitation light L1d is incident is assumed to have a circular shape herein, but the shape thereof is not limited to the circular shape. A radius of each of the regions from the region AR2a to the region AR2d is $\sigma k_{NA}^{ex}$. A distance between the center of each of the regions from the region AR2a to the region AR2d and the optical axis 21a of the objective lens 21 is $(1-\sigma)k_{NA}^{ex}$. A distance between the center of the region AR2a and the center of the region AR2b is $2(1-\sigma)k_{NA}^{ex}$, for example, but the distance is not limited to this value. A distance between the center of the region AR2c and the center of the region AR2d is $2(1-\sigma)k_{NA}^{ex}$, for example, but the distance is not limited to this value.

The electric field intensity ill(r) on the sample plane Sa is represented by the following expression (35). In the expression (35), each of $k_0x$ and $k_0y$ is a wave vector of the interference fringes L2. $k_0x$ is represented as $k_0x=(k_0, 0)$. $k_0y$ is represented as $k_0y=(0, k_0)$. $k_0$ as a component of $k_0x$ and $k_0y$ is represented as $k_0=2(1-\sigma)k_{NA}^{ex}$.

$$\text{ill}(r) = PSF_{ill}(r)\frac{2 + \cos 2\pi k_{0x} \cdot r + \cos 2\pi k_{0y} \cdot r}{2} \quad \text{Expression (35)}$$

In the present embodiment, the illumination pupil has four poles, and the interference fringes the periodic direction of which is the X-direction and the interference fringes the periodic direction of which is the Y-direction are added up. The image data $I(r, r_s)$ obtained by the detection device 6 is represented by the following expression (36).

$$I(r,r_s)=PSF_{det}(r)^{x,y}*\{Obj(r+r_s)ill(r)\} \quad \text{Expression (36)}$$

The image processor 7 performs four-dimensional Fourier transformation on r and $r_s$ of $I(r, r_s)$ in the expression (36) as represented by the following expression (37).

$$\tilde{I}(k, k_s) = \mathcal{F}_{r,r_s}[I(r, r_s)] \quad \text{Expression (37)}$$
$$= OTF_{det}(k)\widetilde{ill}(k-k_s)\widetilde{Obj}(k_s)$$
$$= OTF_{det}(k)\left(\frac{1}{2}OTF_{ill}(k-k_s) + \frac{1}{4}e^{i\phi_x}OTF_{ill}(k-k_s-k_{0x}) + \frac{1}{4}e^{-i\phi_x}OTF_{ill}(k-k_s-k_{0x}) + \frac{1}{4}e^{i\phi_y}OTF_{ill}(k-k_s-k_{0y}) + \frac{1}{4}e^{-i\phi_y}OTF_{ill}(k-k_s+k_{0y})\right)\widetilde{Obj}(k_s)$$

In the expression (37), $OTF_{det}$ is Fourier transformation of $PSF_{det}$, and represents the OTF of the detection optical system 5. ill~ represents Fourier transformation of ill. $OTF_{ill}$ represents Fourier transformation of $PSF_{ill}$. $\phi_x$ and $\phi_y$ represent the initial phase in the X-direction of the interference fringes L2 and the initial phase in the Y-direction of the interference fringes L2, respectively. Obj~ represents Fourier transformation of Obj. The expression (37) is a sum of five terms as represented by the following expression (38).

$$\tilde{I}(k,k_s)=\tilde{I}_0(k,k_s)+\tilde{I}_{+1,x}(k,k_s)+\tilde{I}_{-1,x}(k,k_s)+\tilde{I}_{+1,y}(k,k_s)+\tilde{I}_{-1,y}(k,k_s) \quad \text{Expression (38)}$$

Respective terms on the right side of the expression (38) are represented by the following expression (39).

$$\begin{cases} \tilde{I}_0(k, k_s) = \frac{1}{2} OTF_{det}(k) OTF_{ill}(k - k_s)\widetilde{Obj}(k_s) \\ \tilde{I}_{+1,x}(k, k_s) = \frac{1}{4} e^{i\phi_x} OTF_{det}(k) OTF_{ill}(k - k_s - k_{0x})\widetilde{Obj}(k_s) \\ \tilde{I}_{-1,x}(k, k_s) = \frac{1}{4} e^{-i\phi_x} OTF_{det}(k) OTF_{ill}(k - k_s + k_{0x})\widetilde{Obj}(k_s) \\ \tilde{I}_{+1,y}(k, k_s) = \frac{1}{4} e^{i\phi_y} OTF_{det}(k) OTF_{ill}(k - k_s - k_{0y})\widetilde{Obj}(k_s) \\ \tilde{I}_{-1,y}(k, k_s) = \frac{1}{4} e^{-i\phi_y} OTF_{det}(k) OTF_{ill}(k - k_s + k_{0y})\widetilde{Obj}(k_s) \end{cases}$$

Expression (39)

In this case, $I_0{\sim}(k, k_s)$ is referred to as the 0th-order component, $I{\sim}_{+1,x}(k, k_s)$ is referred to as the +1st-order component in the X-direction, and $I{\sim}_{-1,x}(k, k_s)$ is referred to as the −1st-order component in the X-direction. $I{\sim}_{+1,y}(k, k_s)$ is referred to as the +1st-order component in the Y-direction, and $I{\sim}_{-1,y}(k, k_s)$ is referred to as the −1st-order component in the Y-direction. In FIG. 20B, the reference numeral AR3*a* denotes a region in which data of the 0th-order component is present (hereinafter, referred to as a region of the 0th-order component). The reference numeral AR3*b* denotes a region in which data of the +1st-order component in the X-direction is present (hereinafter, referred to as a region of the +1st-order component in the X-direction). The reference numeral AR3*c* denotes a region in which data of the −1st-order component in the X-direction is present (hereinafter, referred to as a region of the −1st-order component in the X-direction). The reference numeral AR3*d* denotes a region in which data of the +1st-order component in the Y-direction is present (hereinafter, referred to as a region of the +1st-order component in the Y-direction). The reference numeral AR3*e* denotes a region in which data of the −1st-order component in the Y-direction is present (hereinafter, referred to as a region of the −1st-order component in the Y-direction).

The region AR3*a* of the 0th-order component is represented by the following expression (40).

$|k-k_s| \leq 2\sigma k_{NA}^{ex}$ and $|k| \leq 2k_{NA}^{em}$     Expression (40)

The region AR3*b* of the +1st-order component in the X-direction is represented by the following expression (41).

$|k-k_s-k_0| \leq 2\sigma k_{NA}^{ex}$ and $|k| \leq 2k_{NA}^{em}$     Expression (41)

The region AR3*c* of the −1st-order component in the X-direction is represented by the following expression (42).

$|k-k_s+k_{0x}| \leq 2\sigma k_{NA}^{ex}$ and $|k| \leq 2k_{NA}^{em}$     Expression (42)

The region AR3*d* of the +1st-order component in the Y-direction is represented by the following expression (43).

$|k-k_s+k_{0y}| \leq 2\sigma k_{NA}^{ex}$ and $|k| \leq 2k_{NA}^{em}$     Expression (43)

The region AR3*e* of the −1st-order component in the Y-direction is represented by the following expression (44).

$|k-k_s+k_{0y}| \leq 2\sigma k_{NA}^{ex}$ and $|k| \leq 2k_{NA}^{em}$     Expression (44)

The image processor 7 extracts, by filtering, each component from $I{\sim}(k, k_s)$ that is obtained through Fourier transformation. For example, the image processor 7 extracts data in a region satisfying the expression (40) described above from $I{\sim}(k, k_s)$ as the 0th-order component. The image processor 7 extracts data in a region satisfying the expression (41) described above from $I{\sim}(k, k_s)$ as the +1st-order component in the X-direction. The image processor 7 extracts data in a region satisfying the expression (42) described above from $I{\sim}(k, k_s)$ as the −1st-order component in the X-direction. The image processor 7 extracts data in a region satisfying the expression (43) described above from $I{\sim}(k, k_s)$ as the +1st-order component in the Y-direction. The image processor 7 extracts data in a region satisfying the expression (44) described above from $I{\sim}(k, k_s)$ as the −1st-order component in the Y-direction.

The image processor 7 calculates the data of each component in the real space by performing inverse Fourier transformation on each extracted component. In this case, the 0th-order component in the real space is represented as $I_0(r, r_s)$, the +1st-order component in the X-direction in the real space is represented as $I_{+1,x}(r, r_s)$, and the −1st-order component in the X-direction in the real space is represented as $I_{-1,x}(r, r_s)$. The +1st-order component in the Y-direction in the real space is represented as $I_{+1,y}(r, r_s)$, and the −1st-order component in the Y-direction in the real space is represented as $I_{-1,y}(r, r_s)$.

By using at least part of the data of each component in the real space that is obtained as described above, the image processor 7 shifts the phase of the interference fringes in accordance with the detector coordinates so that the effective PSFs of the respective detectors 6*a* of the detection device 6 are aligned. Through an arithmetic operation represented by the following expression (45), the image processor 7 shifts the phase of each of the +1st-order component in the X-direction, the −1st-order component in the X-direction, the +1st-order component in the Y-direction, and the −1st-order component in the Y-direction in the real space.

$$\begin{cases} I'_0(r, r_s) = I_0(r, r_s) \\ I'_{+1,x}(r, r_s) = I_{+1,x}(r, r_s)e^{i\psi_x(r)} \\ I'_{-1,x}(r, r_s) = I_{-1,x}(r, r_s)e^{-i\psi_x(r)} \\ I'_{+1,y}(r, r_s) = I_{+1,y}(r, r_s)e^{i\psi_y(r)} \\ I'_{-1,y}(r, r_s) = I_{-1,y}(r, r_s)e^{-i\psi_y(r)} \end{cases}$$

Expression (45)

In the expression (45), $\psi_x(r)$ represents the phase shift amount for each of the +1st-order component and the −1st-order component in the X-direction. $\psi_y(r)$ represents the phase shift amount for each of the +1st-order component and the −1st-order component in the Y-direction. The phase shift amount described above is, for example, set so that a peak position of a function obtained as a product of $PSF_{det}(r+r_s)$ and $PSF_{ill}(r_s)$ matches the peak position of the interference fringes L2.

After the phase shift processing for each component, the image processor 7 adds up the respective components as represented by the following expression (46).

$I'(r,r_s) = I'_0(r,r_s) + I'_{+1,x}(r,r_s) + I'_{-1,x}(r,r_s) + I'_{+1,y}(r,r_y) + I'_{-1,y}(r,r_s)$     Expression (46)

Through the phase shift processing described above, it is possible to obtain data in which the effective PSFs of the respective detectors 6*a* of the detection device 6 are substantially aligned. After the phase shift processing, the image processor 7 performs correction processing of correcting the positional deviation for each of the detectors 6*a*. The image processor 7 then generates a super resolution image by adding up pieces of data subjected to the correction processing.

The region used for component separation is not limited to the regions represented by the expression (41) to the expression (44) described above. The region used for component separation may be larger or smaller than the regions represented by the expression (41) to the expression (44) described above. At least one of the opening 38a and the opening 38b of the mask 38 and the opening 40a and the opening 40b of the mask 40 does not necessarily have a circular shape. The region used for component separation can be obtained by numerical simulation, theoretical calculation, and the like in both of a case in which the opening of the mask has a circular shape and a case in which the opening of the mask has a shape other than the circular shape.

The processing performed by the image processor 7 may be any of the pieces of processing described in the first embodiment to the fourth embodiment. For example, in a case of applying deconvolution in the frequency space as described in the fourth embodiment, although the three components are used in the expression (27), five components including the 0th-order component, the +1st-order component in the X-direction, the −1st-order component in the X-direction, the +1st-order component in the Y-direction, and the −1st-order component in the Y-direction may be used in the present embodiment.

Ninth Embodiment

Figure 21:
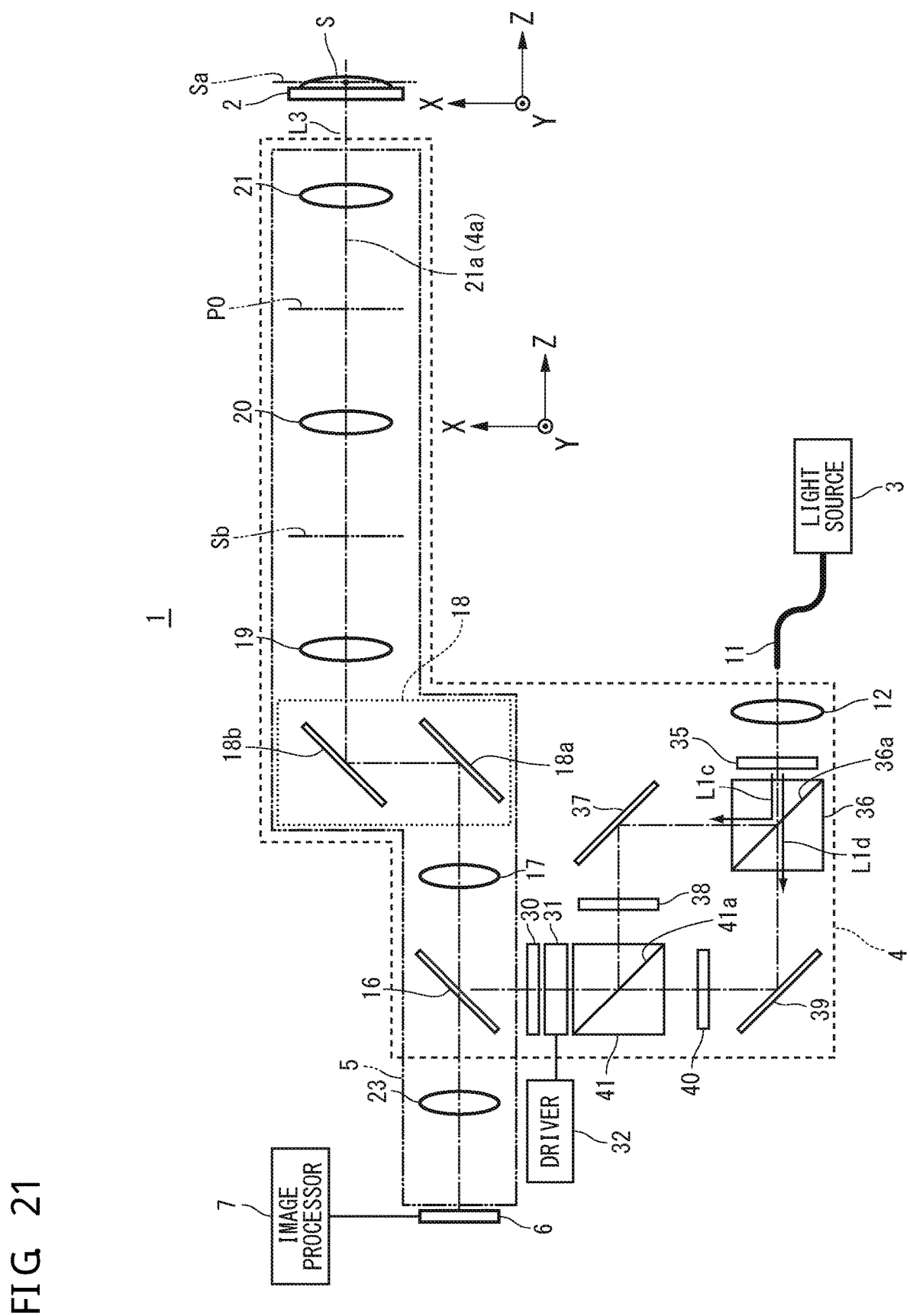
FIG. 21 is a diagram illustrating a microscope according to a ninth embodiment.

The following describes a ninth embodiment. In the present embodiment, a configuration similar to that in the embodiments described above is denoted by the same reference numeral, and description thereof is omitted or simplified as appropriate. FIG. 21 is a diagram illustrating the microscope according to the ninth embodiment. In the present embodiment, the microscope 1 includes the λ/2 wave plate 30 and the optical path rotator 31 described above with reference to FIG. 13. The optical path rotator 31 is driven by the driver 32 to rotate about the optical axis of the illumination optical system 4. When the optical path rotator 31 is rotated, each of the optical path of the excitation light L1c and the optical path of the excitation light L1d rotates about the optical axis of the illumination optical system 4. As a result, the periodic direction of the interference fringes L2 formed on the sample plane Sa is rotated about the Z-direction.

Figure 22A:
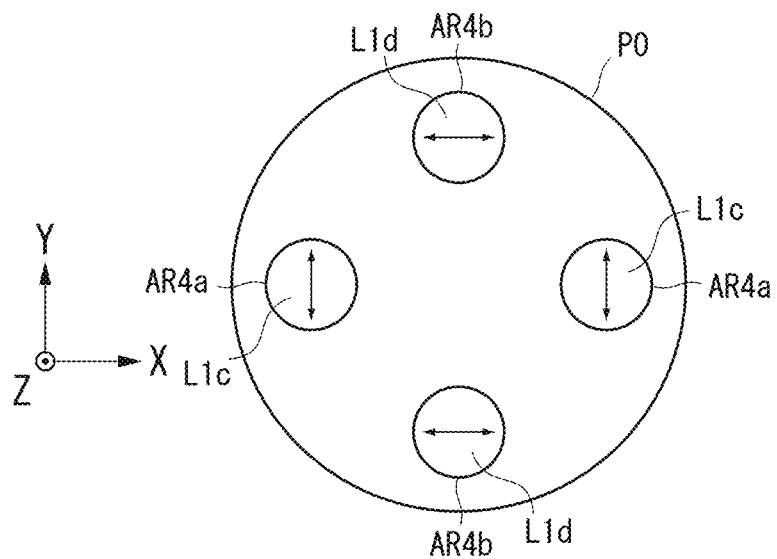
FIGS. 22A and 22B are diagrams illustrating a polarization state of excitation light according to the ninth embodiment.
Figure 22B:
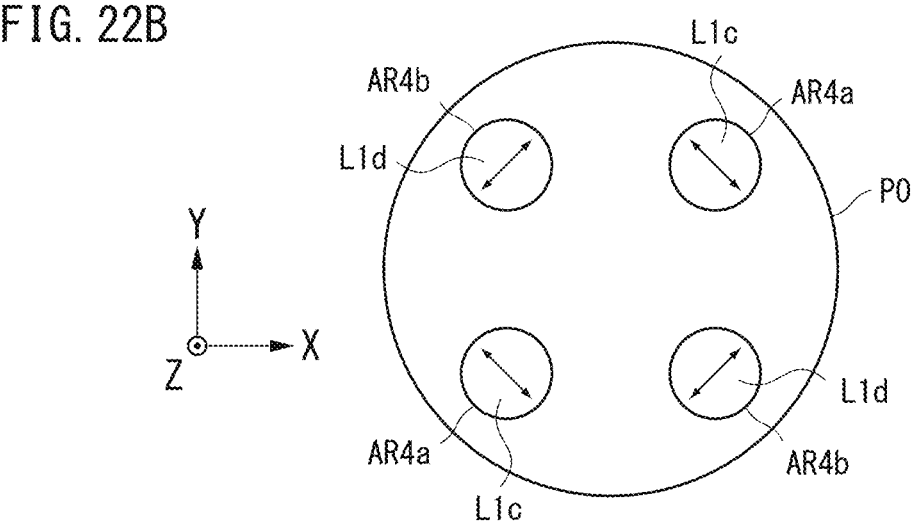

FIGS. 22A and 22B are diagrams illustrating the polarization state of the excitation light according to the ninth embodiment. In FIG. 22A, regions AR4a on which the excitation light L1c is incident on the pupil plane P0 are arranged in the X-direction. A region AR4b and a region AR4b on which the excitation light L1d is incident on the pupil plane P0 are arranged in the Y-direction.

FIG. 22B corresponds to a state in which the Dove prism (the optical path rotator 31 in FIG. 21) and the λ/2 wave plate 30 are rotated by 22.5° from the state in FIG. 22A. In FIG. 22B, the regions AR4a on which the excitation light L1c is incident on the pupil plane P0 are arranged in a direction rotated from the X-direction by 45°. In this state, the periodic direction of the interference fringes of the excitation light L1c on the sample plane Sa is a direction rotated from the X-direction by 45°. The regions AR4b on which the excitation light L1d is incident on the pupil plane P0 are arranged in a direction rotated from the Y-direction by 45°. In this state, the periodic direction of the interference fringes of the excitation light L1d on the sample plane Sa is a direction rotated from the Y-direction by 45°.

Returning to the description of FIG. 21, in the present embodiment, the detection device 6 detects the fluorescence L3 from the sample S before and after the periodic direction of the interference fringes L2 is changed. The image processor 7 generates an image on the basis of a detection result of the detection device 6 before the periodic direction of the interference fringes L2 is changed and a detection result of the detection device 6 after the periodic direction of the interference fringes L2 is changed. As described above with reference to FIG. 14, the optical path rotator 31 may be disposed on the optical path between the dichroic mirror 16 and the detection device 6.

Tenth Embodiment

The following describes a tenth embodiment. In the present embodiment, a configuration similar to that in the embodiments described above is denoted by the same reference numeral, and description thereof is omitted or simplified as appropriate. In the ninth embodiment, the microscope 1 changes the periodic direction of the interference fringes L2 with the optical path rotator 31, but the fringe direction changer that changes the periodic direction of the interference fringes L2 may have an aspect different from that of the optical path rotator 31.

Figure 23:
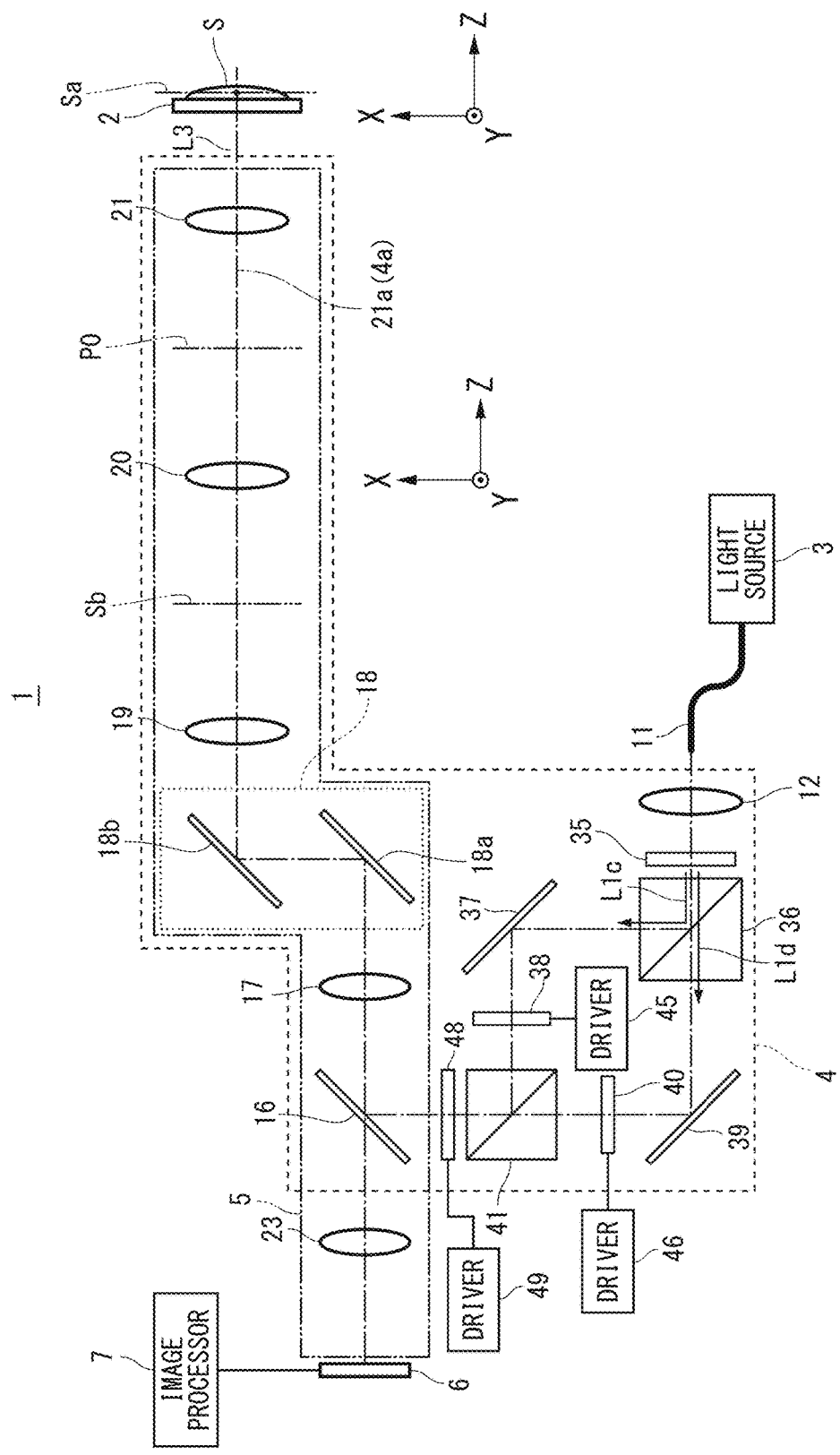
FIG. 23 is a diagram illustrating a microscope according to a tenth embodiment.
Figure 24A:
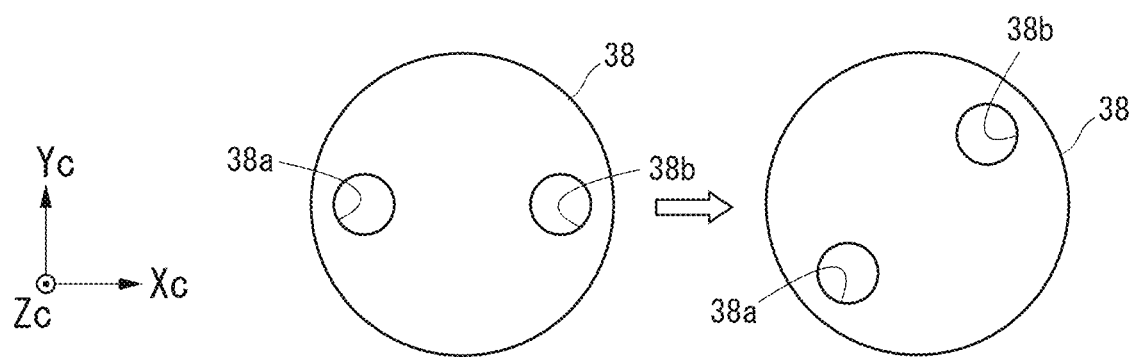
FIGS. 24A and 24B are diagrams illustrating a mask according to the tenth embodiment.
Figure 24B:
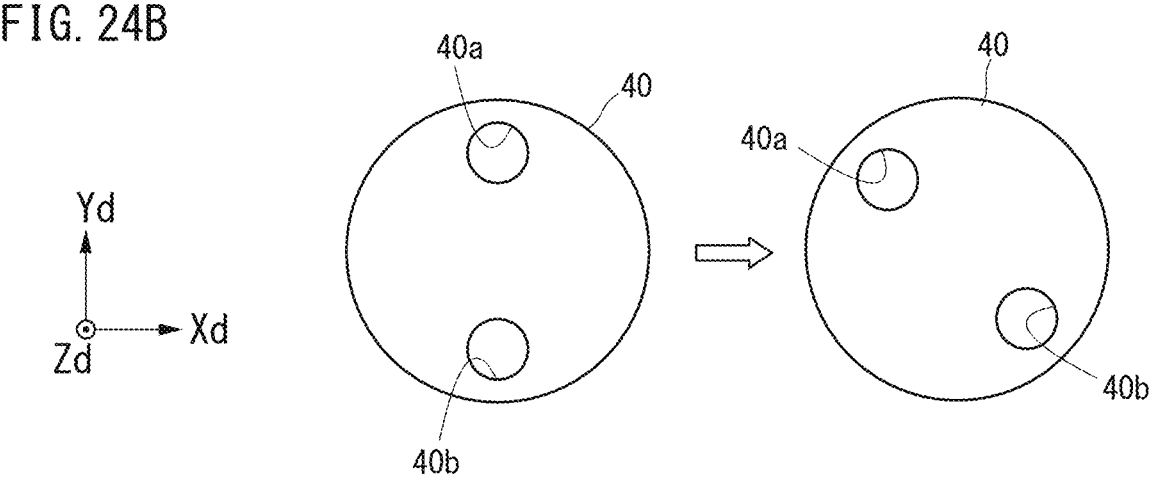

FIG. 23 is a diagram illustrating the microscope according to the tenth embodiment. FIGS. 24A and 24B are diagrams illustrating the mask according to the tenth embodiment. In the present embodiment, the microscope 1 includes a driver 45 and a driver 46. The mask 38 can rotate about the optical axis of the excitation light L1c. The mask 38 is driven by the driver 45 to rotate (refer to FIG. 24A). In FIG. 24A, the mask 38 is rotated clockwise by 45°.

The mask 40 can rotate about the optical axis of the excitation light L1d. The mask 40 is driven by the driver 46 to rotate (refer to FIG. 24B). The driver 46 causes the mask 40 to rotate by the same angle as the angle of rotation of the mask 38 rotated by the driver 45. In FIG. 24B, the mask 40 is rotated clockwise by 45°. Due to this, the periodic direction of the interference fringes L2 on the sample plane Sa is rotated about the Z-direction by 45°.

A λ/2 wave plate 48 is disposed on the optical path between the polarized light separating element 41 and the dichroic mirror 16. The λ/2 wave plate 48 is driven by a driver 49 to rotate about the optical axis of the illumination optical system 4. The λ/2 wave plate 48 and the driver 49 adjust each of the excitation light L1c and the excitation light L1d to be incident on the sample S as S-polarized light.

Eleventh Embodiment

Figure 25:
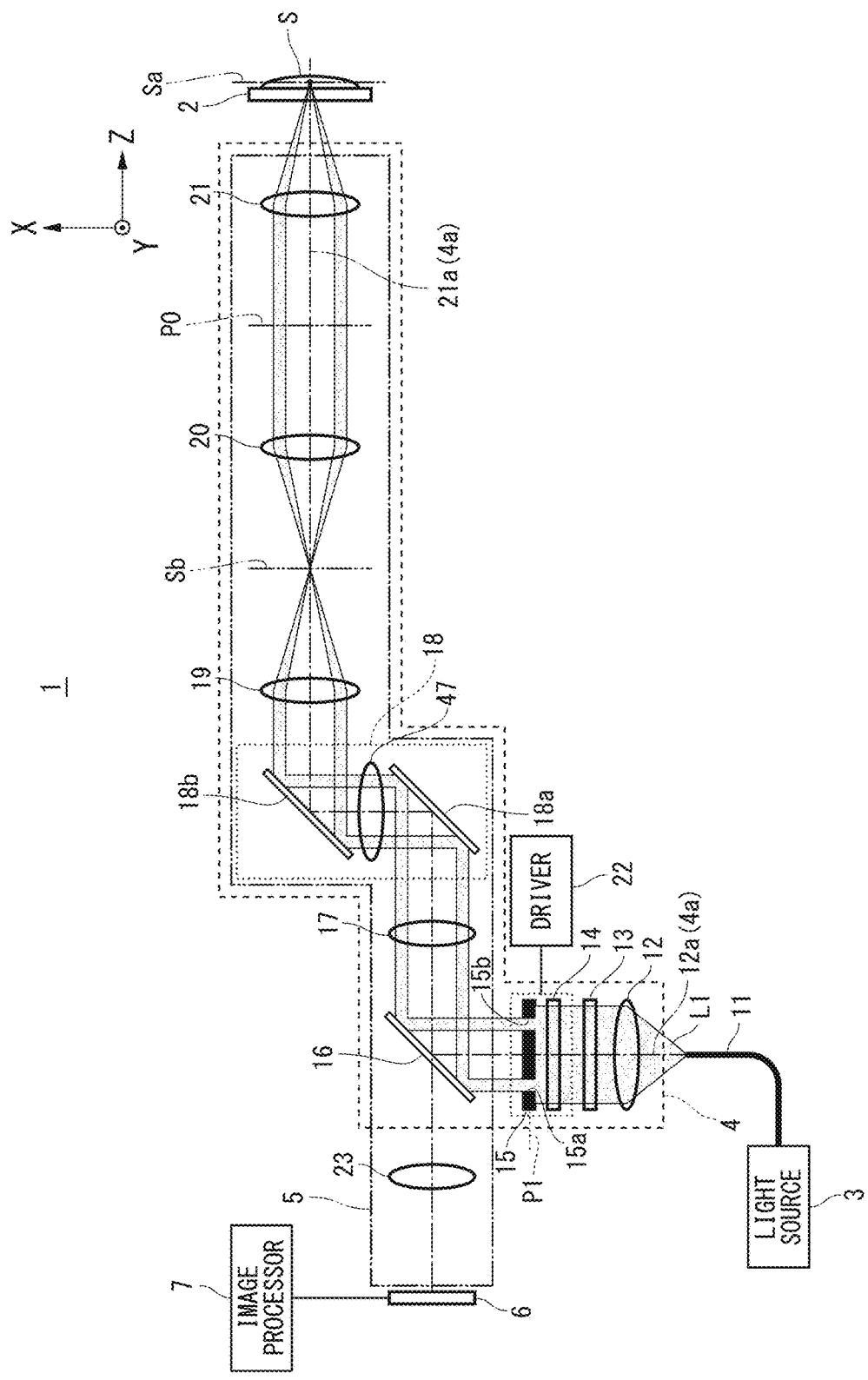
FIG. 25 is a diagram illustrating a microscope according to an eleventh embodiment.

The following describes an eleventh embodiment. In the present embodiment, a configuration similar to that in the embodiments described above is denoted by the same reference numeral, and description thereof is omitted or simplified as appropriate. FIG. 25 is a diagram illustrating the microscope according to the eleventh embodiment. In the present embodiment, the microscope 1 includes a relay optical system 47. The relay optical system 47 is part of the illumination optical system 4 and is part of the detection optical system 5. The relay optical system 47 is disposed on the optical path between the deflecting mirror 18a and the deflecting mirror 18b in the scanning part 18. The deflecting mirror 18a is disposed at substantially the same position as that of a first pupil conjugate plane that is optically conjugate to the pupil plane P0 of the objective lens 21. The relay optical system 47 is disposed so that a second pupil conjugate plane that is optically conjugate to the first pupil conjugate plane described above is formed between the deflecting mirror 18b and the lens 19. The deflecting mirror 18b is disposed at substantially the same position as that of the second pupil conjugate plane described above.

The scanning part 18 is not limited to the form described above. For example, the stage 2 may include a Y-stage that moves in the Y-direction with respect to the objective lens 21, and the scanning part 18 may include the Y-stage in place of the deflecting mirror 18b. In this case, the scanning part 18 may scan the sample S in the X-direction with the excitation light L1 by the deflecting mirror 18a and scan the sample S in the Y-direction with the excitation light L1 by moving the Y-stage. In this case, the deflecting mirror 18a may be disposed at substantially the same position as that of the pupil conjugate plane that is optically conjugate to the pupil plane P0 of the objective lens 21.

The stage 2 may include an X-stage that moves in the X-direction with respect to the objective lens 21, and the scanning part 18 may include the X-stage in place of the deflecting mirror 18a. In this case, the scanning part 18 may scan the sample S in the X-direction with the excitation light L1 by moving the X-stage described above, and scan the sample S in the Y-direction with the excitation light L1 by the deflecting mirror 18b. In this case, the deflecting mirror 18b may be disposed at substantially the same position as that of the pupil conjugate plane that is optically conjugate to the pupil plane P0 of the objective lens 21.

The stage 2 may include the X-stage that moves in the X-direction with respect to the objective lens 21 and the Y-stage that moves in the Y-direction with respect to the objective lens 21, and the scanning part 18 may include the X-stage and the Y-stage described above. In this case, the scanning part 18 may scan the sample S in the X-direction with the excitation light L1 by moving the X-stage described above, and scan the sample S in the Y-direction with the excitation light L1 by moving the Y-stage described above.

In the embodiment described above, the scanning direction in which the sample S is scanned with the interference fringes includes two directions, that is, the X-direction and the Y-direction, and the illumination optical system 4 two-dimensionally scans the sample S with the interference fringes. The scanning direction in which the sample S is scanned with the interference fringes may include three directions, that is, the X-direction, the Y-direction, and the Z-direction. For example, the microscope 1 may perform 2D processing of scanning the sample S in the X-direction and the Y-direction with the interference fringes to acquire a 2D image, and repeat the 2D processing while changing the position in the Z-direction at which the interference fringes are generated to three-dimensionally scan the sample S with the interference fringes. By three-dimensionally scanning the sample S with the interference fringes, the microscope 1 may acquire a plurality of 2D images the positions of which in the Z-direction are different, and generate a 3D image (for example, a Z-stack). In a case of three-dimensionally scanning the sample S with the interference fringes, the illumination optical system 4 may perform scanning in the X-direction and the Y-direction, and scanning in the Z-direction may be performed by moving the stage 2. The illumination optical system 4 may three-dimensionally scan the sample S with the interference fringes.

Modifications

The following describes modifications. A configuration similar to that in the embodiments described above is denoted by the same reference numeral, and description thereof is omitted or simplified as appropriate. FIGS. 26A to 26C and FIGS. 27A and 27B are diagrams illustrating the illumination pupil according to modifications.

Figure 26A:
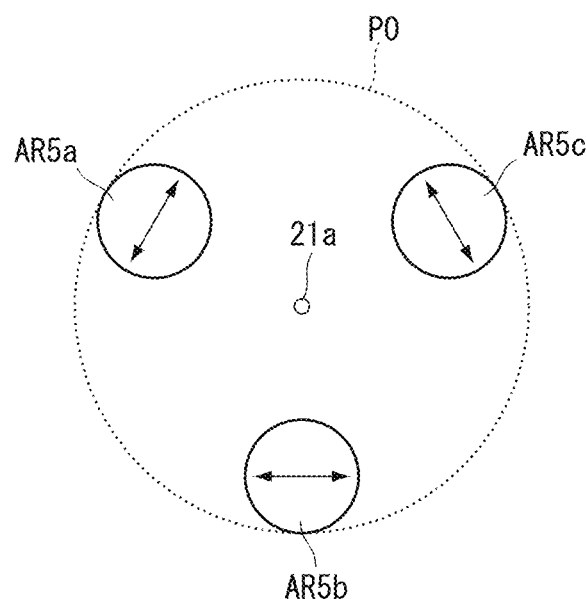
FIGS. 26A to 26C are diagrams illustrating an illumination pupil according to a modification.

The illumination pupil has two poles in FIGS. 2A to 2C, four poles in FIGS. 20A and 20B, and three poles in FIG. 26A. Each of the reference numeral AR5a to the reference numeral AR5c denotes a region on which the excitation light is incident on the pupil plane P0. In this case, formed are first interference fringes of the excitation light incident on the region AR5a and the excitation light incident on the region AR5b, second interference fringes of the excitation light incident on the region AR5b and the excitation light incident on the region AR5c, and third interference fringes of the excitation light incident on the region AR5c and the excitation light incident on the region AR5a. On the sample plane Sa, the interference fringes are formed by combining the first interference fringes, the second interference fringes, and the third interference fringes described above. In these sets of interference fringes, each of the periodic direction of the first interference fringes, the periodic direction of the second interference fringes, and the periodic direction of the third interference fringes is the periodic direction, and there are three periodic directions, so that the super resolution effect can be obtained in the three directions. The illumination pupil may have five or more poles.

Figure 26B:
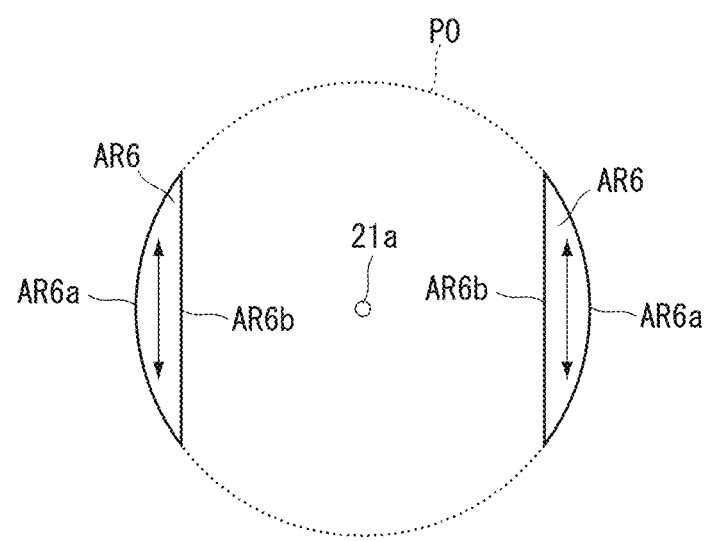
Figure 26C:
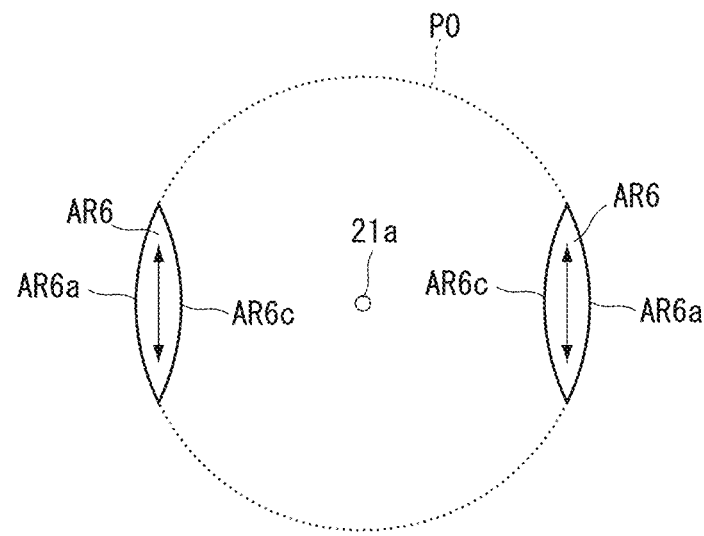

The illumination pupil has a circular shape in FIGS. 2A to 2C, for example, but may have any other shape. In FIG. 26B and FIG. 26C, the reference numeral AR6 denotes a region on which the excitation light is incident. The region AR6 in FIG. 26B is a region surrounded by a circle AR6a as part of a circle centered on the optical axis 21a of the objective lens 21 and a straight line AR6b connecting both ends of the circular arc AR6a. The region AR6 in FIG. 26C is a region surrounded by a circular arc as part of the circle centered on the optical axis 21a of the objective lens 21 and a curved line AR6c symmetrical to the circular arc AR6a.

In a case of the illumination pupil having the shape illustrated in FIG. 26B or FIG. 26C, resolving power in a direction in which the interference fringes are not formed is improved, and sectioning is also improved as compared with a case of the illumination pupil having a circular shape. In a case of the illumination pupil having the shape illustrated in FIG. 26B, resolving power in a direction in which the interference fringes are not formed is improved, and sectioning is also improved as compared with a case of the illumination pupil having the shape illustrated in FIG. 26C. In a case of the illumination pupil having the shape illustrated in FIG. 26C, resolving power in a direction in which the interference fringes are formed is improved as compared with a case of the illumination pupil having the shape illustrated in FIG. 26B.

Figure 27A:
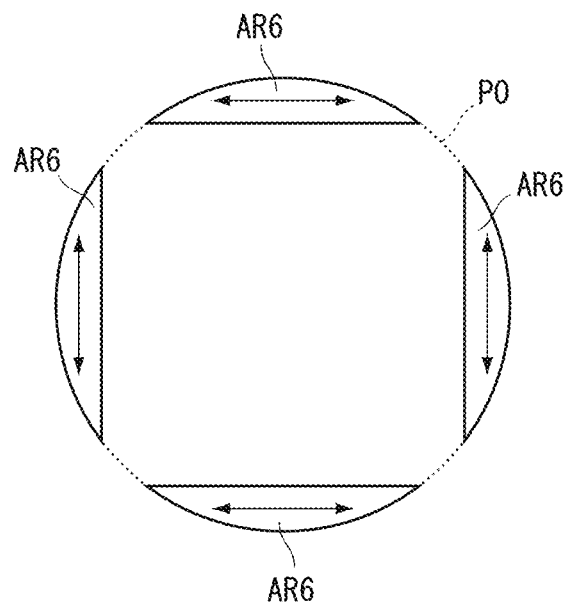
FIGS. 27A and 27B are diagrams illustrating the illumination pupil according to a modification.
Figure 27B:
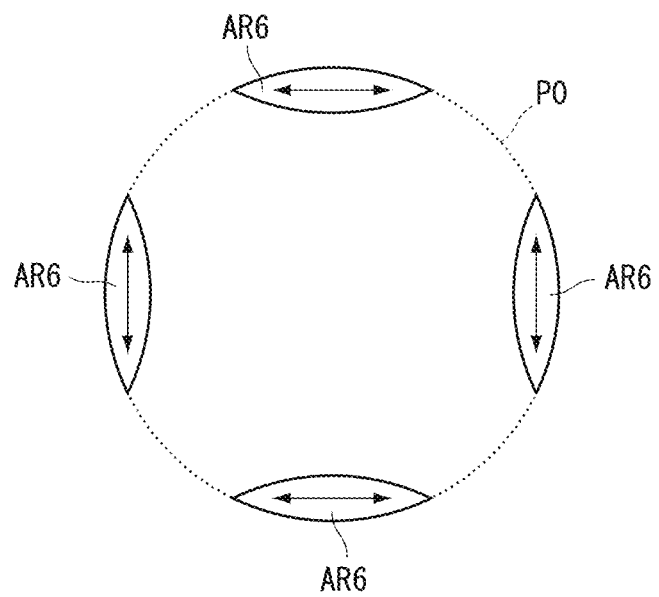

In FIG. 27A, the illumination pupil has a form obtained by causing the illumination pupil having the shape illustrated in FIG. 26B to have four poles. In FIG. 27B, the illumination pupil has a form obtained by causing the illumination pupil having the shape illustrated in FIG. 26C to have four poles. Also in a case of the illumination pupil having a shape other than the circular shape, the number of a plurality of regions (the number of poles) on which the excitation light is incident is set to be an optional number equal to or larger than 2. A shape of one of the regions on which the excitation light is incident on the pupil plane P0 may have a shape different from the shape of the other regions. Dimensions of one of the regions on which the excitation light is incident on the pupil plane P0 may be different from dimensions of the other regions. The regions on which the excitation light is incident on the pupil plane P0 may be disposed asymmetrical to each other with respect to the optical axis 21a of the objective lens 21.

The shape, the dimensions, and the arrangement of each pole of the illumination pupil can be implemented by designing the shape, the dimensions, and the arrangement of the opening of the mask 15 illustrated in FIGS. 2A to 2C, for example. The mask 15 may be a mechanical diaphragm that can change a light shielding region, a spatial light modulator (SLM), or the like.

Figure 28:
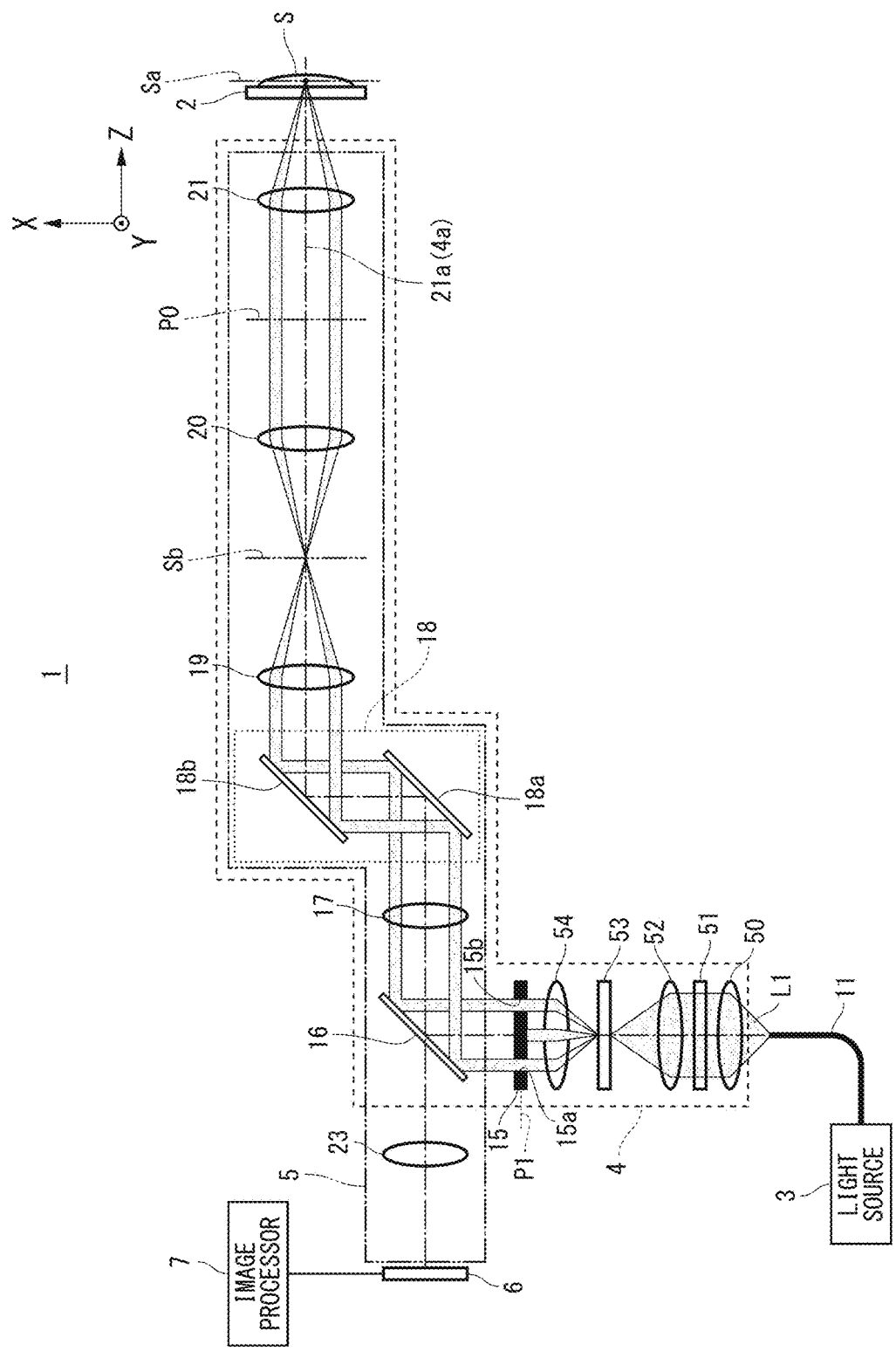
FIG. 28 is a diagram illustrating a microscope according to a modification.

FIG. 28 is a diagram illustrating the microscope according to a modification. In FIG. 28, the illumination optical system 4 includes a collimator lens 50, a λ/2 wave plate 51, a lens 52, a diffraction grating 53, a lens 54, and the mask 15 in this order from the optical fiber 11 toward the dichroic mirror 16. The collimator lens 50 converts the excitation light L1 from the optical fiber 11 into substantially parallel light. The λ/2 wave plate 51 adjusts the polarization state of the excitation light L1 at the time of being incident on the sample S. The lens 52 concentrates the excitation light L1 to the diffraction grating 53.

The diffraction grating 53 causes the excitation light L1 to branch into a plurality of light fluxes by diffraction. The diffraction grating 53 is a light flux splitter that splits the excitation light that excites a fluorescent substance into a plurality of light fluxes. The diffraction grating 53 is disposed at a focal point of the lens 52, or within a range distant from the focal point by 1 mm or less. That is, the diffraction grating 53 is disposed on a plane that is conjugate to the sample plane Sa, or within a range distant therefrom by 1 mm or less. The light fluxes described above include 0th-order diffracted light, +1st-order diffracted light, and −1st-order diffracted light. The lens 54 converts each of the 0th-order diffracted light, the +1st-order diffracted light, and the −1st-order diffracted light into substantially parallel light. The mask 15 is disposed so that the 0th-order diffracted light is blocked, and at least part of the +1-order diffracted light and at least part of the −1st-order diffracted light pass therethrough. In such a form, the amount of the excitation light L1 transmitted through the mask 15 can be increased. The diffraction grating 53 may be designed so that the 0th-order diffracted light is not generated. A configuration not including the mask 15 may also be employed.

Figure 29:
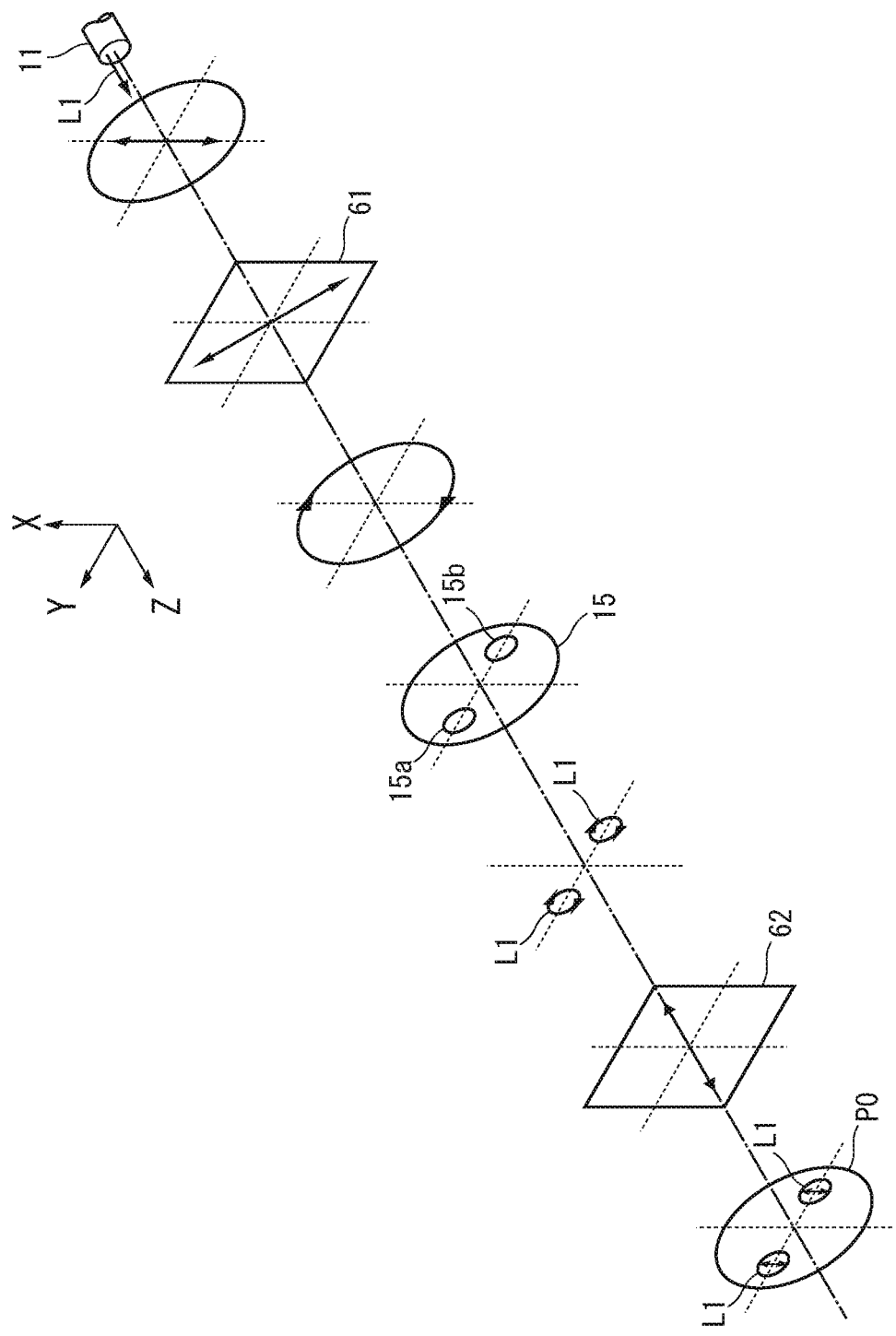
FIG. 29 is a diagram illustrating a polarization adjuster according to a modification.
Figure 30:
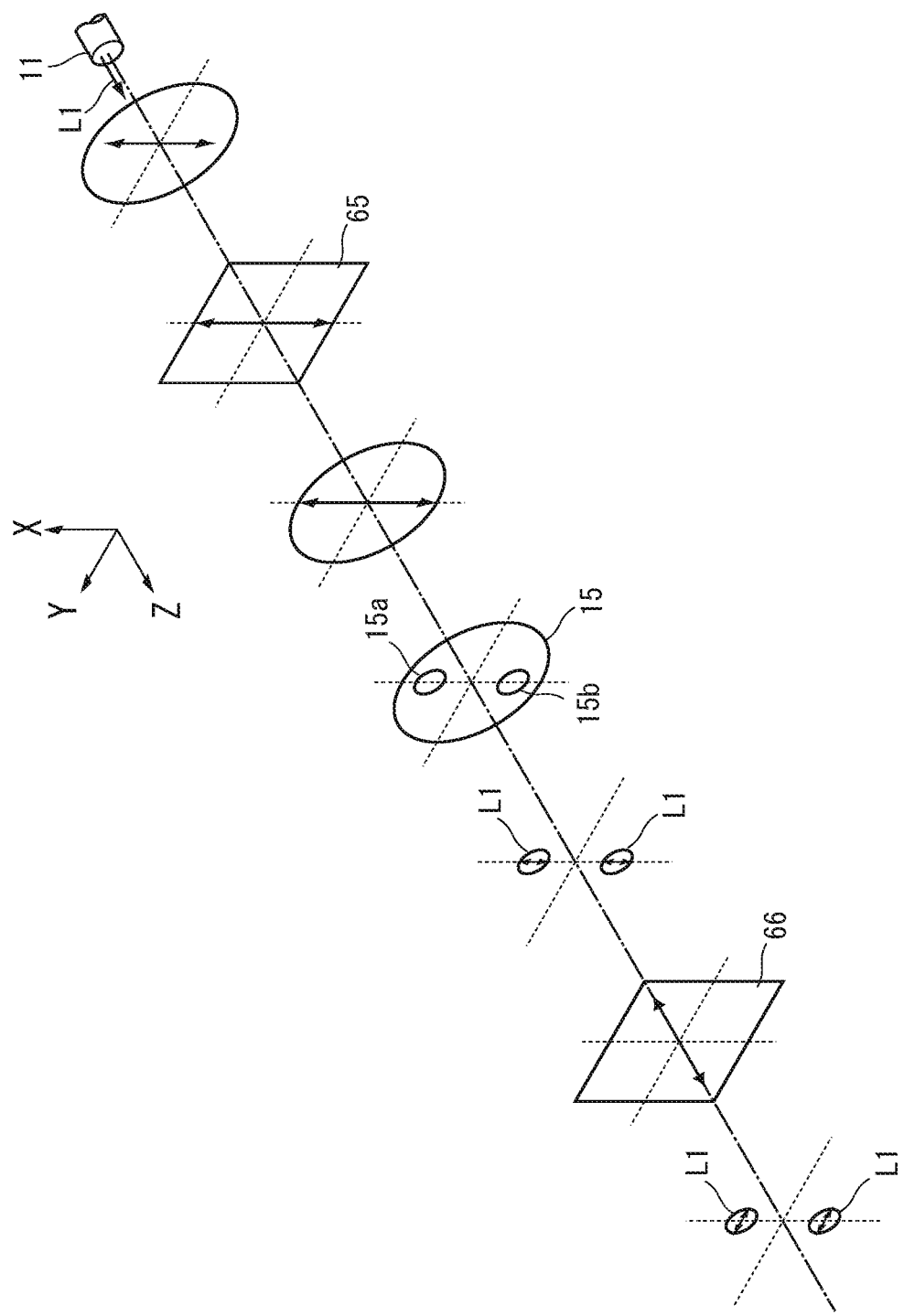
FIG. 30 is a diagram illustrating the polarization adjuster according to a modification.

FIG. 29 and FIG. 30 are diagrams illustrating the polarization adjuster according to modifications. The optical path of the illumination optical system 4 is bent due to a reflection member such as the dichroic mirror 16 illustrated in FIG. 1, but the illumination optical system 4 is illustrated in FIG. 29 and FIG. 30 while being exploded to cause the optical axis 4a to be a straight line. In FIG. 29 and FIG. 30, the Z-direction is a direction parallel with the optical axis 4a, and each of the X-direction and the Y-direction is a direction perpendicular to the optical axis 4a.

In FIG. 29, the illumination optical system 4 includes a λ/4 wave plate 61, the mask 15, and a λ/4 wave plate 62. The excitation light L1 emitted from the optical fiber 11 is linearly polarized light substantially in the X-direction and is incident on the λ/4 wave plate 61. A polarizer (for example, a polarizing plate) having a transmission axis in the X-direction may be disposed on the optical path between the optical fiber 11 and the λ/4 wave plate 61.

The fast axis of the λ/4 wave plate 61 is set in a direction obtained by rotating the X-direction counterclockwise by 45° when viewed from the +Z side. The excitation light L1 passed through the λ/4 wave plate 61 becomes circularly polarized light and is incident on the mask 15. The excitation light L1 passed through the opening 15a and the opening 15b of the mask 15 is circularly polarized light and is incident on the λ/4 wave plate 62. The fast axis of the λ/4 wave plate 62 is set in a direction obtained by rotating the X-direction clockwise by 45° when viewed from the +Z side. The excitation light L1 passed through the λ/4 wave plate 62 becomes linearly polarized light in the X-direction and is emitted to the sample.

As described in the first embodiment, the mask 15 is disposed to be able to rotate about the optical axis 4a. When the mask 15 rotates, the periodic direction of the interference fringes is changed. For example, in the state of FIG. 29, the opening 15a and the opening 15b of the mask are arranged in the Y-direction, and the periodic direction of the interference fringes is the Y-direction. When the mask 15 is rotated by 90° from the state of FIG. 29, the periodic direction of the interference fringes is rotated by 90° to become the X-direction.

The λ/4 wave plate 62 can rotate about the optical axis 4a. The λ/4 wave plate 62 is disposed to rotate by the same angle as that of the mask 15. For example, the λ/4 wave plate 62 is integrated with the mask 15 and rotates integrally with the mask 15. For example, the λ/4 wave plate 62 rotates by 90° when the mask 15 rotates by 90°, and the fast axis of the λ/4 wave plate 62 becomes parallel with the fast axis of the λ/4 wave plate 61. In this case, the excitation light L1 passed through the λ/4 wave plate 62 becomes linearly polarized light in the Y-direction. The incident plane of the excitation light L1 with respect to the sample plane is parallel with the periodic direction of the interference fringes, and the excitation light L1 at the time of being incident on the sample plane is linearly polarized light perpendicular to the periodic direction of the interference fringes, so that the excitation light L1 is emitted to the sample plane in a state of S-polarized light.

In this way, the λ/4 wave plate 62 is included in the polarization adjuster that adjusts the polarization state of the excitation light at the time of being incident on the sample. Such a polarization adjuster can reduce loss of the amount of the excitation light L1 as compared with the aspect described above with reference to FIG. 1.

In FIG. 30, the illumination optical system 4 includes a polarizer 65, the mask 15, and a λ/2 wave plate 66. The excitation light L1 emitted from the optical fiber 11 is linearly polarized light substantially in the X-direction and is incident on the polarizer 65. A transmission axis of the polarizer 65 is set in the X-direction. The excitation light L1 passed through the polarizer 65 is linearly polarized light in the X-direction and is incident on the mask 15. The excitation light L1 passed through the opening 15a and the opening 15b of the mask 15 is linearly polarized light in the X-direction and is incident on the λ/2 wave plate 66. The fast axis of the λ/2 wave plate 66 is set in a direction obtained by rotating the X-direction clockwise by 45° when viewed from the +Z side. The excitation light L1 passed through the λ/2 wave plate 66 becomes linearly polarized light in the Y-direction and is emitted to the sample.

As described in the first embodiment, the mask 15 is disposed to be able to rotate about the optical axis 4a. When the mask 15 rotates, the periodic direction of the interference fringes is changed. For example, in the state of FIG. 30, the opening 15a and the opening 15b of the mask are arranged in the X-direction, and the periodic direction of the interference fringes is the X-direction. When the mask 15 rotates by 90° from the state of FIG. 29, the periodic direction of the interference fringes is rotated by 90° to become the Y-direction.

The λ/2 wave plate 66 can rotate about the optical axis 4a. The λ/2 wave plate 66 is disposed to rotate by a half angle of the rotation angle of the mask 15. For example, when the mask 15 rotates by 90°, the λ/2 wave plate 66 rotates by 45°.

In this case, the excitation light L1 passed through the λ/2 wave plate 66 becomes linearly polarized light in the X-direction. The incident plane of the excitation light L1 with respect to the sample plane is parallel with the periodic direction of the interference fringes, and the excitation light L1 at the time of being incident on the sample plane is linearly polarized light perpendicular to the periodic direction of the interference fringes, so that the excitation light L1 is emitted to the sample plane in a state of S-polarized light. In this way, the λ/2 wave plate 66 is included in the polarization adjuster that adjusts the polarization state of the excitation light at the time of being incident on the sample. Such a polarization adjuster can reduce loss of the amount of the excitation light L1 as compared with the aspect described above with reference to FIG. 1.

In the microscope 1 according to the embodiment, the detection device 6 may include an image sensor, and include an image rotator that causes an image of the sample S to rotate about the optical axis of the detection optical system 5. In a case of rotating a fringe direction, a fringe period can be caused to match the position of the detector by rotating the image of the sample S.

In the embodiment described above, the image processor includes a computer system, for example. The image processor 7 reads out an image processing program stored in a storage and performs various kinds of processing in accordance with the image processing program. The image processing program causes a computer to generate an image on the basis of a detection result of the detection device 6. The detection result of the detection device 6 described above is obtained by splitting light from a light source into a plurality of light fluxes, scanning the sample in a plurality of directions with the interference fringes that are generated by interference of at least part of the light fluxes, and detecting light from the sample by a detection device including a plurality of detectors via a detection optical system on which the light from the sample is incident.

A technical scope of the present invention is not limited to the aspect described above in the embodiments. One or more of requirements described above in the embodiments may be omitted. The requirements described above in the embodiments can be combined as appropriate. As long as being allowed by the law, all documents cited in the embodiments described above are incorporated herein as part of the description.

DESCRIPTION OF REFERENCE SIGNS

1 Microscope
3 Light source
4 Illumination optical system
5 Detection optical system
6 Detection device
6a Plurality of detectors
7 Image processor
L2 Interference fringes

What is claimed is:

1. A microscope comprising:
an illumination optical system that includes a light flux splitter that splits light from a light source into a plurality of light fluxes, and scans a sample in a plurality of directions with interference fringes generated by interference of at least part of the light fluxes split by the light flux splitter;
a detection optical system on which light from the sample is incident;
a detection device that includes a plurality of detectors that detect the light from the sample via the detection optical system; and
an image processor that generates a first image using detection results of two or more of the detectors of the detection device, wherein
the image processor generates the first image by correcting a second image obtained from at least one detector among the two or more of the detectors on the basis of a position of the at least one detector, a period of the interference fringes, and a phase of the interference fringes.

2. The microscope according to claim 1, wherein the interference fringes include three or more bright parts in a periodic direction of the interference fringes.

3. The microscope according to claim 1, wherein
the illumination optical system includes an objective lens,
the light flux splitter includes an opening member having a plurality of openings, and
the opening member is disposed on a pupil plane of the objective lens, in the vicinity of the pupil plane, on a pupil conjugate plane, or in the vicinity of the pupil conjugate plane.

4. The microscope according to claim 1, wherein
the light flux splitter includes a diffraction grating, and
the diffraction grating is disposed at a position that is conjugate to the sample or in the vicinity of the position.

5. The microscope according to claim 1, wherein the detection device includes a line sensor in which the detectors are arranged in one direction.

6. The microscope according to claim 1, wherein the detection device includes an image sensor in which the detectors are arranged in two directions.

7. The microscope according to claim 1, comprising:
a fringe direction changer that changes a direction of the interference fringes with respect to the sample.

8. The microscope according to claim 1, comprising:
an image rotator that causes an image of the sample to rotate about an optical axis of the detection optical system with respect to the detectors.

9. The microscope according to claim 8, wherein the image rotator is disposed on an optical path not overlapping with the illumination optical system in the detection optical system.

10. The microscope according to claim 8, comprising a fringe direction changer that changes a direction of the interference fringes with respect to the sample, wherein the fringe direction changer and the image rotator are constituted of a same member.

11. The microscope according to claim 1, comprising:
a polarization adjuster that adjusts a polarization state of the light at the time of being incident on the sample.

12. The microscope according to claim 1, wherein the microscope is configured to set positions of the detectors on the basis of magnification of the detection optical system and the period of the interference fringes.

13. The microscope according to claim 1, wherein the microscope is configured to select the two or more of the detectors, the detection results of which are used by the image processor to generate the first image, from among the detectors on the basis of magnification of the detection optical system.

14. The microscope according to claim 1, wherein the image processor converts detection results of at least some of the detectors into data in a frequency space.

15. The microscope according to claim 14, wherein the image processor converts detection results of at least some of the detectors into the data in the frequency space by Fourier transformation.

16. The microscope according to claim 14, wherein the image processor generates the first image by performing filtering on the data in the frequency space.

17. The microscope according to claim 14, wherein the image processor generates the first image by separating the data in the frequency space into a plurality of regions of the frequency space.

18. The microscope according to claim 17, wherein the image processor separates the data in the frequency space into a plurality of regions of the frequency space on the basis of light intensity distribution of the interference fringes.

19. The microscope according to claim 17, wherein the regions are set not to overlap with each other.

20. The microscope according to claim 17, wherein the image processor generates the first image by converting a phase of at least part of data obtained through the separation.

21. The microscope according to claim 20, wherein the image processor determines a conversion amount of the phase on the basis of light intensity distribution of the interference fringes and a position of the detector.

22. The microscope according to claim 1, wherein the image processor performs deconvolution on data obtained from the detection device to generate the first image.

23. The microscope according to claim 22, wherein the image processor performs the deconvolution on data obtained from the at least one detector on the basis of the position of the at least one detector and light intensity distribution of the interference fringes.

24. An observation method comprising:
splitting light from a light source into a plurality of light fluxes, and scanning a sample in a plurality of directions with interference fringes generated by interference of at least part of the light fluxes;
detecting light from the sample by a detection device including a plurality of detectors via a detection optical system on which light from the sample is incident; and
generating a first image using detection results of two or more of the detectors of the detection device, wherein the first image is generated by correcting a second image obtained from at least one detector among the two or more of the detectors on the basis of a position of the at least one detector, a period of the interference fringes, and a phase of the interference fringes.

* * * * *